United States Patent [19]

Hilligoss et al.

[11] Patent Number: 5,025,466
[45] Date of Patent: Jun. 18, 1991

[54] TELEPHONE TEST INSTRUMENT

[75] Inventors: William R. Hilligoss; Lawrence D. Hillogoss, both of Ashland, Oreg.; David Van Winkle, Simi Valley, Calif.; Myron C. Butler, Edmond, Okla.

[73] Assignee: Communications Manufacturing Company, Los Angeles, Calif.

[21] Appl. No.: 493,101

[22] Filed: Mar. 13, 1990

[51] Int. Cl.$^5$ .................... H04M 1/02; H04M 1/24; H04M 19/00
[52] U.S. Cl. .......................................... 379/1; 379/21
[58] Field of Search ................. 379/21, 1, 413, 27, 379/29

[56] References Cited

U.S. PATENT DOCUMENTS

| | | | |
|---|---|---|---|
| 3,673,329 | 6/1972 | Weld et al. | 179/3 |
| 3,778,556 | 12/1973 | Mees et al. | 179/90 K |
| 3,792,205 | 2/1974 | O'Dea | 179/175 |
| 3,928,723 | 12/1975 | Kai | 179/1 FS |
| 4,119,810 | 10/1978 | Marin et al. | 179/90 K |
| 4,194,098 | 3/1980 | Carlson | 179/173 |
| 4,656,651 | 4/1987 | Evans et al. | 379/1 |
| 4,682,346 | 7/1987 | Faith et al. | 379/22 |
| 4,691,336 | 9/1987 | Durston | 379/21 |
| 4,707,848 | 11/1987 | Durston et al. | 379/1 |
| 4,926,458 | 5/1990 | Reger et al. | 379/27 |

OTHER PUBLICATIONS

CMC publication entitled "CMC 7900 Butt-In II Test Set" published at least one year prior to Jan. 1990, labeled Exhibit 1.
Harris Corporation publication introducing the test set with a built-in amplified speaker published at least one year prior to Jan. 1990, labeled Exhibit 2.
AT&T publication entitled "Craft Access Terminal" dated Jun. 1985 and labeled Exhibit 3.
Telephony publication entitled "Powerful new tool makes field craft more self-reliant", dated Sep. 2, 1985 and labeled Exhibit 4.
Telephone Engineer & Management article entitled "Tiny terminal ties telco team" dated Jul. 1, 1986 and labeled Exhibit 5.
Necsy catalog page entitled "Operating Instructions" dated 2/20/1988 and labeled Exhibit 6.
Ziad Inc. publication entitled "The PHD TM Telecommunicator-More Than Just An Educated Guess" dated Jun. 1985 and labeled Exhibit 7.
Ziad Inc. publication entitled "Introducing Line Master TM", published at least one year prior to Jan. 1990 and labeled Exhibit 8.
Nicollet Technologies, Inc. entitled "Introducing the DigiSmart TM 4000-R" dated 1987 and labeled Exhibit 9.

*Primary Examiner*—Stafford D. Schreyer
*Attorney, Agent, or Firm*—Laney, Dougherty, Hessin & Beavers

[57] ABSTRACT

A telephone test instrument permits voice communications with and monitoring of a telephone circuit to be tested. The instrument includes a microprocessor used in controlling various functions of the instrument. The microprocessor and other circuits of the instrument are energized from a connected telephone circuit and/or an internal energy supply which is automatically recharged from the telephone circuit. The microprocessor continually checks the voltage of the internal energy supply and automatically turns off a loudspeaker of the instrument, or prevents it from being turned on, if the voltage is too low. The instrument includes circuitry which, in combination with the microprocessor, measures loop current or line voltage while the instrument is connected for making voice communications with the telephone circuit. When the loudspeaker within the instrument is energized, the earpiece receiver remains active. A belt hook connected to a housing of the instrument can connect an electrical ground through a switch in the instrument to the telephone circuit for providing a ground start. The instrument also includes a "crow-bar" circuit which effectively open-circuits the instrument from a connected telephone circuit if too high of a loop current flows.

44 Claims, 18 Drawing Sheets

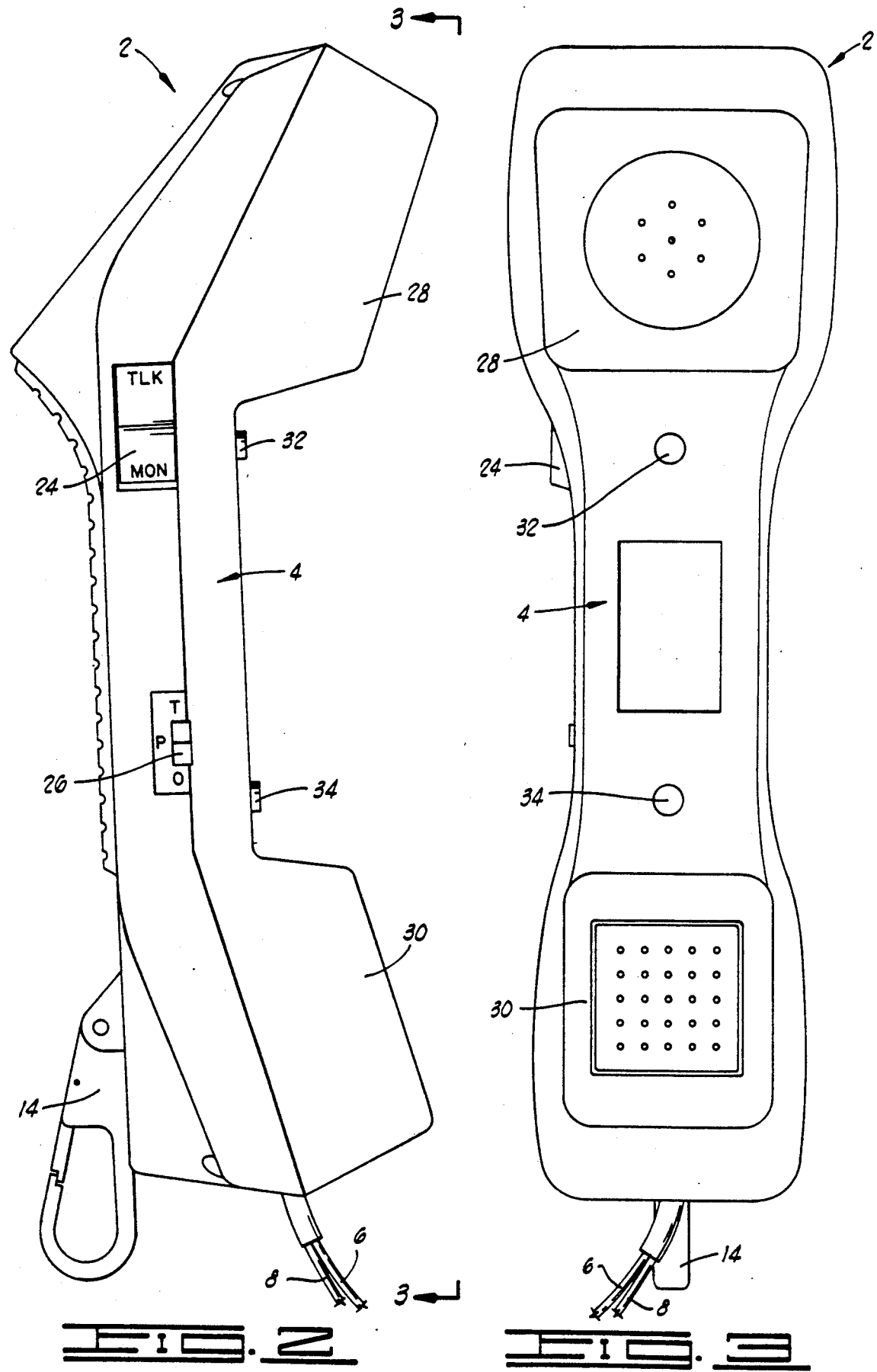

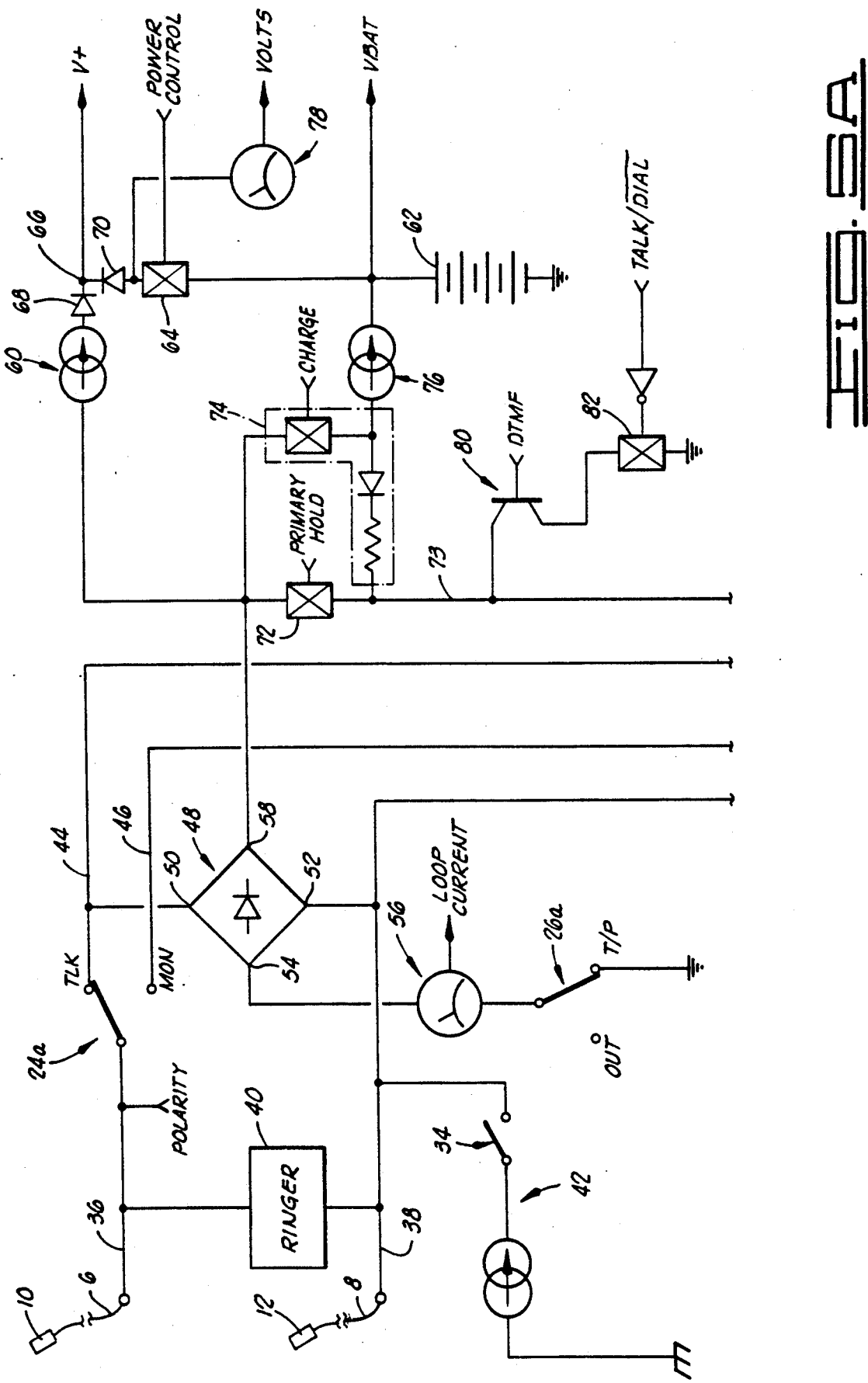

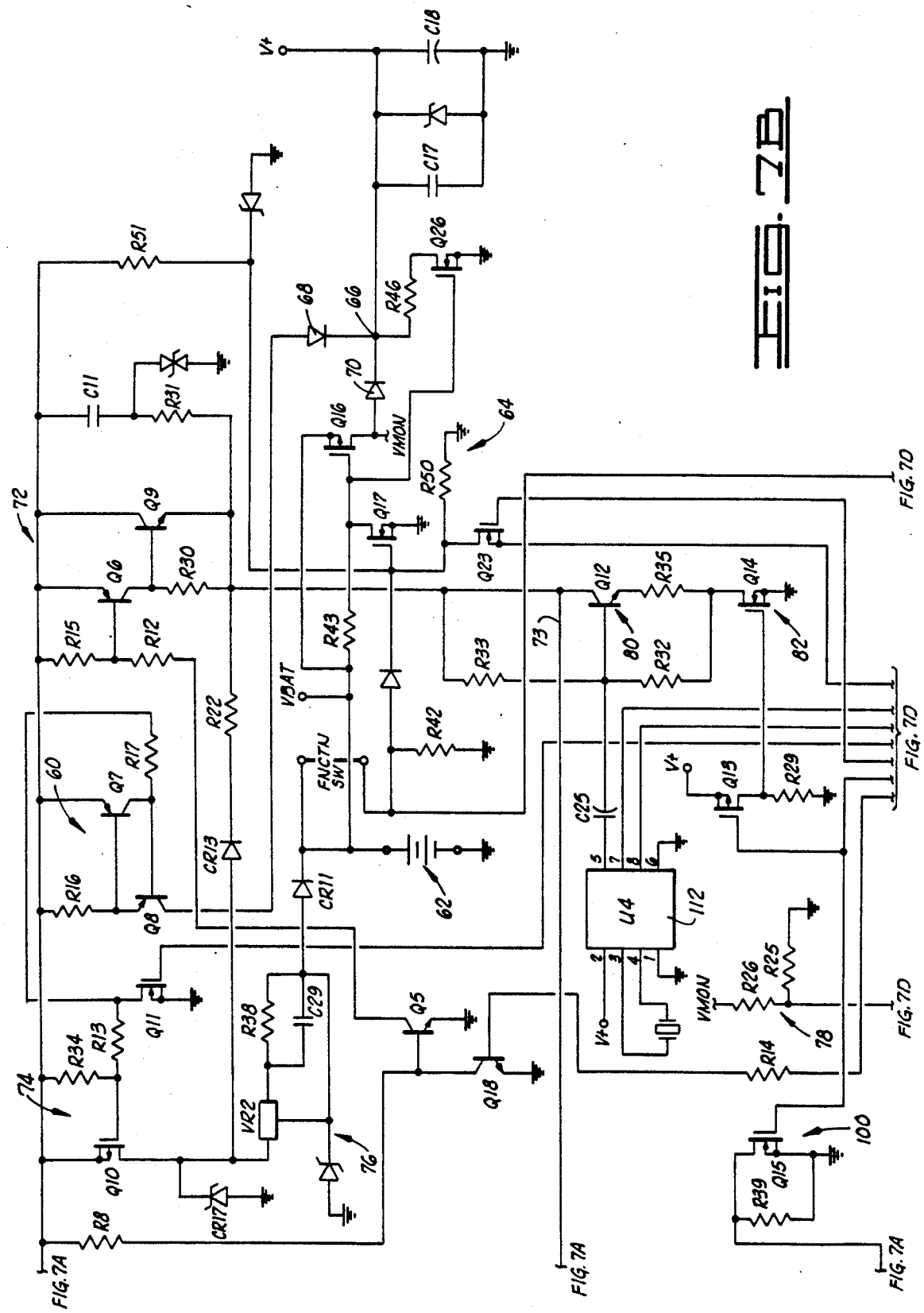

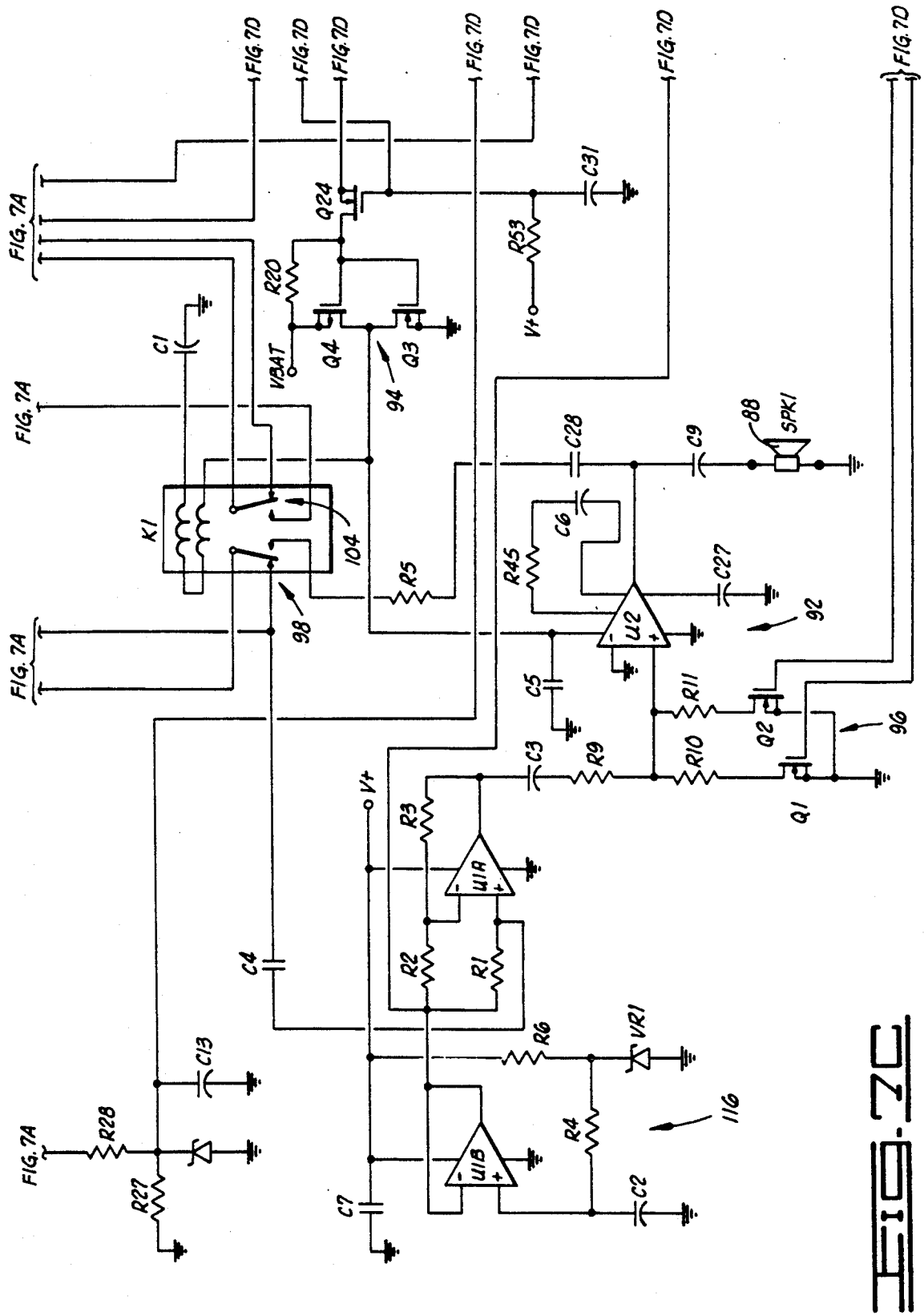

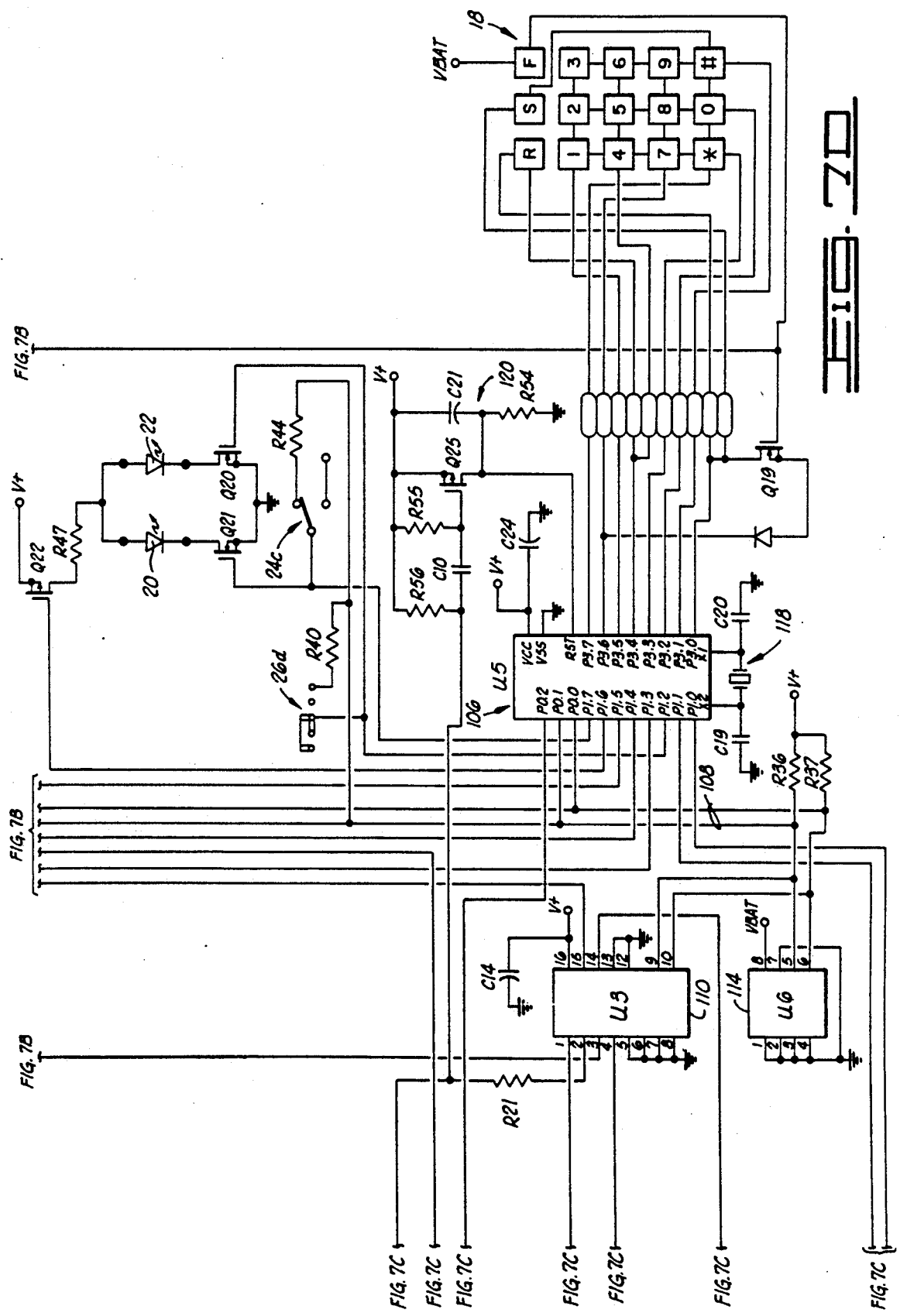

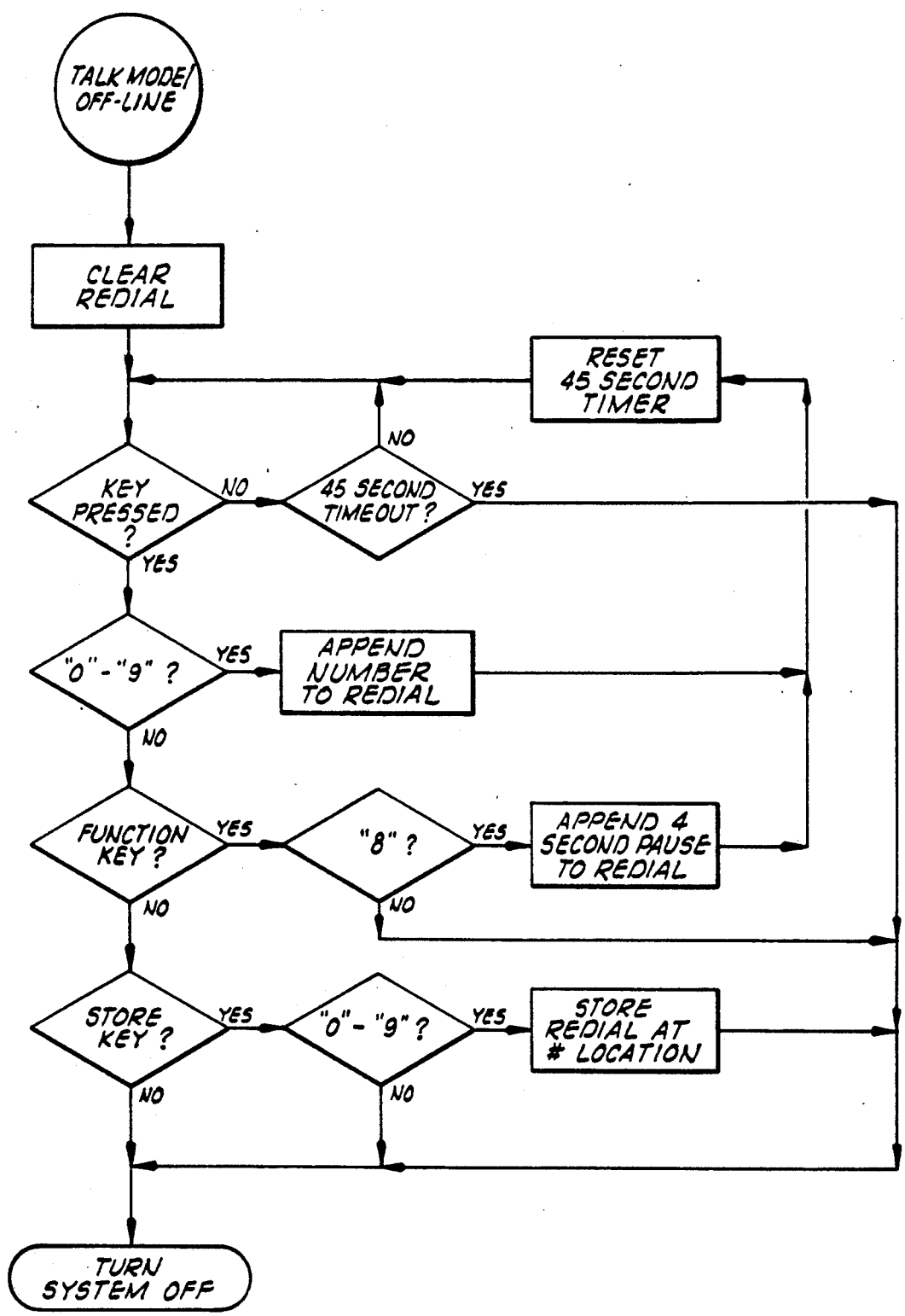
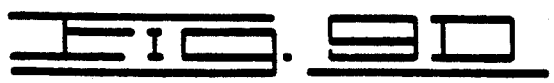

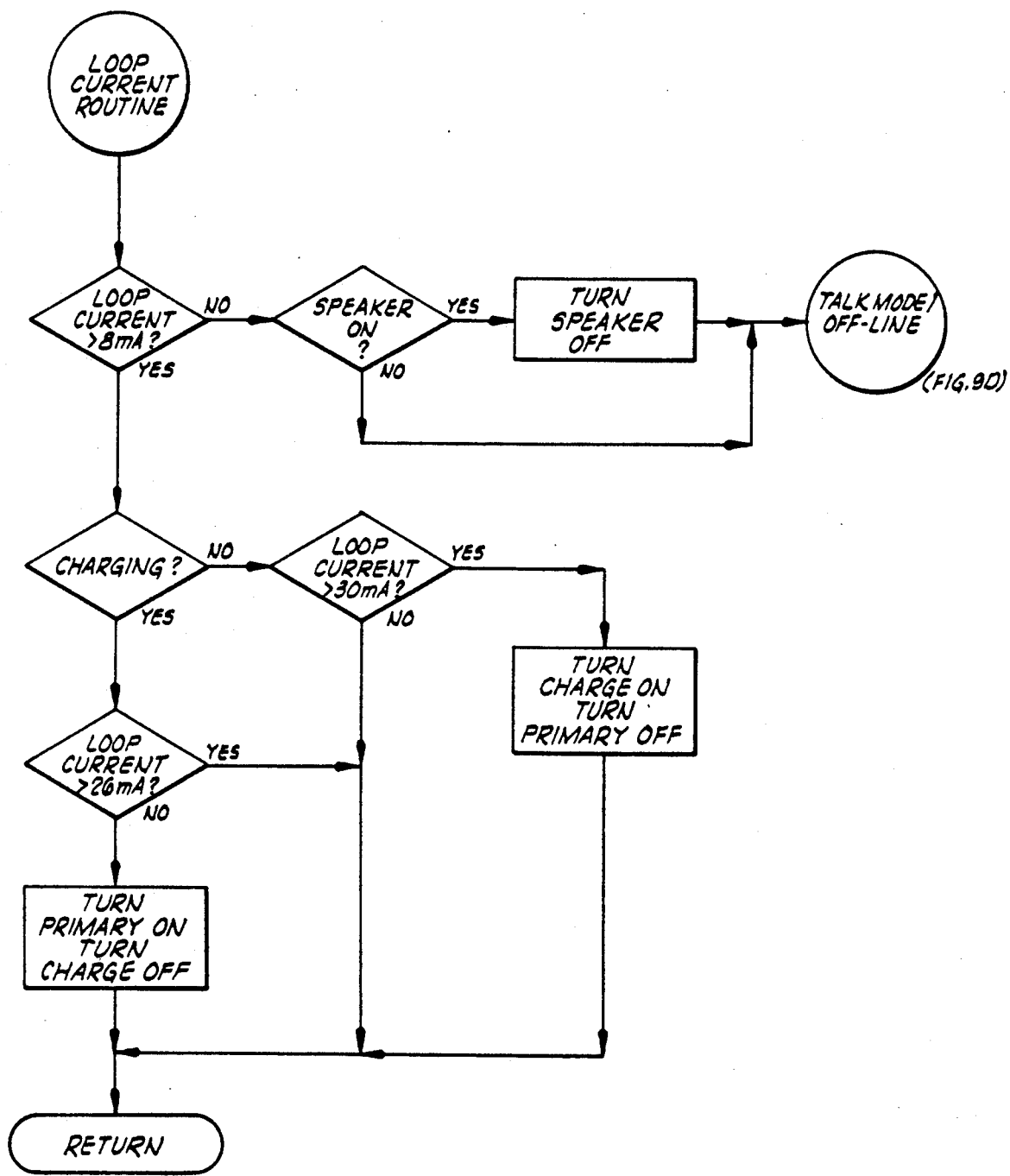
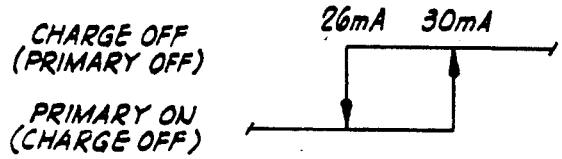
Fig. 9E

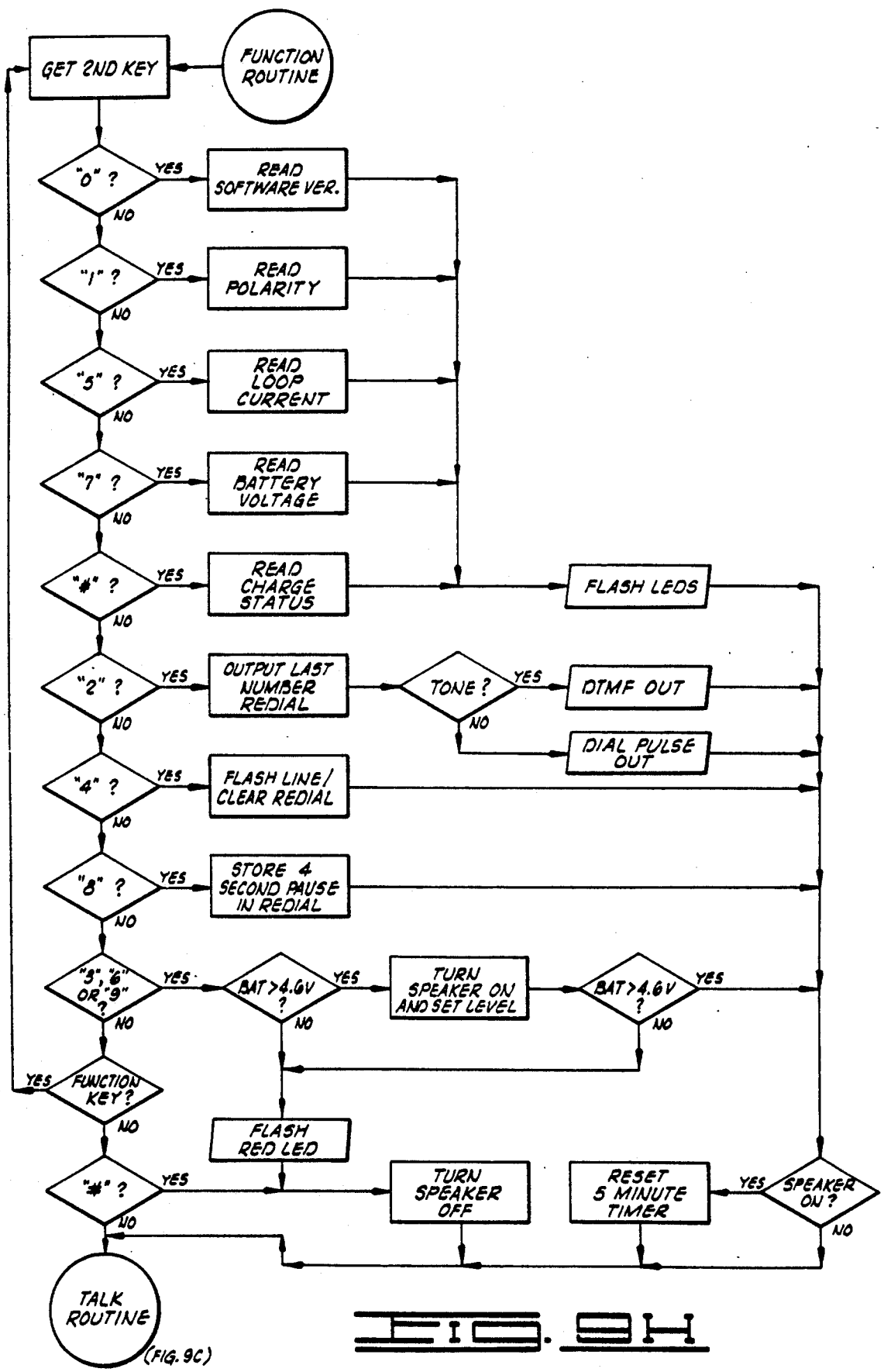

TELEPHONE TEST INSTRUMENT

BACKGROUND OF THE INVENTION

This invention relates generally to a telephone test instrument and more particularly, but not by way of limitation, to a telephone technician's hand-set used in testing subscriber loops of a telephone network.

A conventional telephone instrument through which telephone calls are made is referred to as a telephone subscriber set. A subscriber set at a home or business, for example, is connected to a local switching center of the telephone network through wires which extend between the location of the subscriber set and the location of the local switching center. The two wires to which the subscriber set connects are designated tip and ring lines, and the circuit defined from the local switching center to the subscriber set through the two wires is referred to as a subscriber loop.

When the subscriber who has the set reports a problem with the telephone circuit, a telephone technician can go to locations along the subscriber loop and connect a portable telephone test instrument, sometimes called a butt-set, across the two wires. Such a test instrument of the type to which we are referring has at least the capability of transmitting voice signals onto and receiving voice signals from the connected loop. typically such an instrument can selectably monitor or seize the circuit, dial into a seized circuit and conduct voice communications. Specific types of such test instruments have various other capabilities. Although such various test instruments exist, there is the need for an improved instrument having other and improved features.

SUMMARY OF THE INVENTION

The present invention meets the aforementioned need by providing a novel and improved telephone test instrument. The present invention is controlled by a programmed data processor. This permits operations of the instrument to be varied by software changes rather than hardware changes. The present invention uses energy from the telephone circuit, but it also has a rechargeable internal energy supply which provides energy above the level taken from the telephone circuit. The rechargeable energy supply recharges off energy from the telephone circuit. The present invention also has the capability of testing loop current flowing in the subscriber loop without having to disconnect a voice communication circuit of the instrument from the subscriber loop. The present invention also can perform a ground start on the subscriber loop using an external belt hook of the instrument so that an additional connector lead is not needed. An instrument of the present invention also includes a loudspeaker in addition to a receiver and transmitter of the voice communication circuit. During operation of the loudspeaker, the receiver remains active. The loudspeaker is automatically turned off or prevented from being turned on if the voltage of the internal energy supply, which is automatically continually (periodically) checked by the data processor, is too low. An instrument of the present invention includes an overcurrent protection circuit using a positive temperature coefficient resettable fuse and a triac across which the instrument operating circuit of the instrument is connected in parallel. Any particular instrument constructed in accordance with the present invention need not include all of the aforementioned features as indicated by the following combinations defining the present invention.

The present invention provides a telephone test instrument, comprising: a housing adapted to be hand-held by a telephone technician; a receiver disposed in the housing; a transmitter disposed in the housing; and circuit means, disposed in the housing and within which the receiver and transmitter are connected, for establishing communication with a telephone circuit, the circuit means including a microprocessor.

The present invention provides a telephone test instrument, comprising means for connecting the test instrument to a telephone circuit; a rechargeable energy supply; and means, connected to the means for connecting and to the rechargeable energy supply, for recharging the energy supply from the telephone circuit.

The present invention provides a telephone test instrument, comprising: means for connecting the test instrument to a telephone circuit; an internal energy supply; means, connected to the means for connecting, for energizing the instrument from the telephone circuit with a current up to a predetermined current load; and means, connected to the energy supply, for connecting the energy supply to energize the instrument with additional current in response to the instrument requiring current above the predetermined current load.

The present invention provides a telephone test instrument, comprising means for connecting the test instrument to a telephone circuit; an internal energy supply; means for measuring a voltage produced by the energy supply; and means, responsive to the means for measuring, for signaling the voltage measurement without an alphabetical or numerical display.

The present invention provides a telephone test instrument, comprising: means for connecting the test instrument to a telephone circuit; an internal energy supply; a voice communication circuit operable in either a monitor mode or a talk mode; voice communication circuit switch means for selectably connecting the voice communication circuit to the means for connecting in either the monitor mode or the talk mode; energy supply switch means for selectably connecting the energy supply to provide energy to the instrument; and a data processor connected to the voice communication circuit switch means and the energy supply switch means and programmed for operating the energy supply switch means to connect the energy supply to provide energy to the instrument in response to the voice communication circuit switch means connecting the voice communication circuit to the means for connecting in the talk mode.

The present invention provides a telephone test instrument, comprising: a receiver; a transmitter; means for connecting the receiver and the transmitter to a telephone circuit; and means for measuring loop current through the test instrument, the means for measuring connected to the means for connecting so that loop current is measured while the receiver and transmitter are connected to the telephone circuit. This telephone test instrument in a preferred embodiment further comprises means, responsive to the means for measuring loop current, for signaling a loop current measurement without an alphabetical or numerical display.

The present invention provides a telephone test instrument, comprising a housing; an electrically conductive hook connected to the housing; means, retained by the housing, for connecting the instrument to a telephone circuit; and a switch mounted on the housing, the switch including two terminals, one of the terminals connected to the hook and the other of the terminals connected to the means for connecting so that the telephone circuit is electrically grounded in response to touching the hook to an electrical ground and closing the switch.

The present invention provides a telephone test instrument operable in either a loudspeaker-on mode or a loudspeaker-off mode, comprising: a housing; a receiver disposed in the housing; a loudspeaker disposed in the housing; means for operating the receiver at a base level in response to a signal received by the test instrument over a telephone circuit during the loudspeaker-off mode; means for operating the loudspeaker in response to a signal received by the test instrument over the telephone circuit during the loudspeaker-on mode; and means for operating the receiver at a level not less than the base level during the loudspeaker-on mode.

The present invention provides a telephone test instrument, comprising: a receiver; a transmitter; circuit means for connecting the receiver and transmitter to tip and ring lines of a telephone circuit so that loop current of the telephone circuit flows through the instrument, the circuit means including: a positive temperature coefficient resettable fuse; a triac connected to the fuse so that the fuse and the triac are connected in series across the tip and ring lines of the telephone circuit in response to connection of the instrument to the tip and ring lines; and means, connected to the triac, for activating the triac to be conductive in response to a predetermined magnitude of loop current flowing through the instrument so that the loop current flows through the series connected fuse and triac.

Therefore, from the foregoing, it is a general object of the present invention to provide a novel and improved telephone test instrument. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 2 shows an external side view along line 2—2 shown in FIG. 1.

FIG. 3 shows an external side view of the telephone test instrument along line 3—3 shown in FIG. 2.

FIGS. 5A-5B are a functional block and schematic diagram of an analog section of the preferred embodiment of the telephone test instrument of the present invention.

FIGS. 7A-7D are a schematic circuit diagram of the preferred embodiment of the analog and digital sections of the telephone test instrument of the present invention, excluding at least part of the ringer, ground start and over-current protection circuits.

FIG. 8 is a schematic circuit diagram of the preferred embodiment ringer, ground start and over-current protection circuits not shown in FIGS. 7A-7D.

FIGS. 9A-9H are flow charts of a program for controlling a microprocessor of the preferred embodiment.

DETAILED DESCRIPTION OF THE PREFERRED EMBODIMENT

Figure 1A:
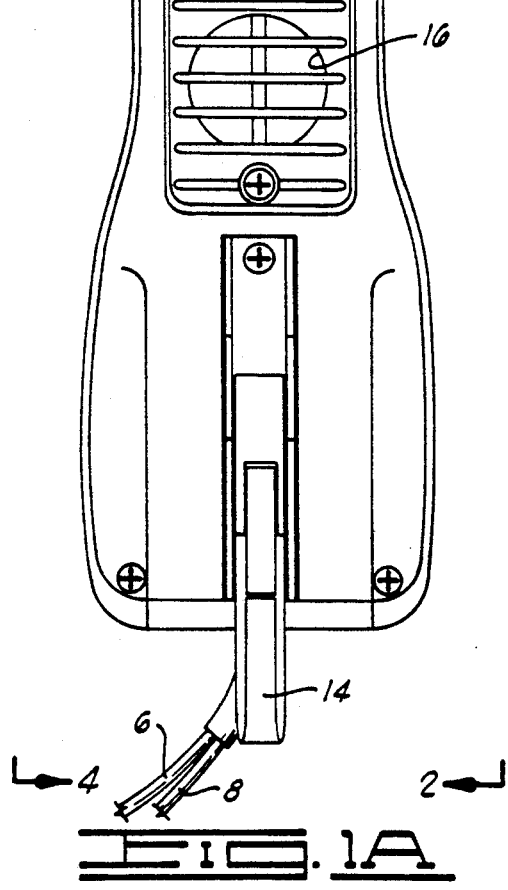
FIGS. 1A-1B show one external side view of a telephone test instrument constructed in accordance with the preferred embodiment of the present invention.

The preferred embodiment of the telephone test instrument of the present invention is a microprocessor-controlled, high-impact plastic, rugged unit for voice frequency transmission and operational tests of trunk circuits and subscriber lines in a telephone network. With appropriate end clips or plugs, this embodiment can be used by either outside plant or central office personnel. Although the present invention is not limited to a telephone test instrument which includes all of these features or those subsequently described, the features of the preferred embodiment will be described with reference to a single instrument because the presently preferred embodiment includes them. This preferred embodiment, having an external appearance and generally identified by the reference numeral 2 in FIGS. 1-4, includes the following features:

An amplifier/speaker with three distinct audio levels provides hands-free listening/monitoring. The speaker is powered by an internal energy supply. If there is sufficient loop current, the energy supply is automatically recharged when the test instrument is connected to a line and the instrument is in the talk mode. During amplifier/speaker operation, an earpiece receiver remains enabled. Amplifier/speaker operation is stopped or prevented if the automatically, continually monitored voltage of the internal energy supply is too low.

A microprocessor provides additional features which are controlled by dual-function keys on a keypad. The microprocessor permits operational variations, such as speed of dialing and percentage of break in pulse dialing and frequency in tone dialing, to be made.

A repertory dialer will store ten 27-digit numbers with dial modes (tone or pulse). A credit card number and a selectable pause time can be stored along with the number to be called. The last number called can be automatically redialed in either tone or pulse mode.

A talk/monitor switch permits talking and monitoring on a connected line.

A tone/pulse/out switch selects either DTMF (Dual Tone Multi-Frequency) or DP (dc Dial Pulse) pulsing. A third position of the switch disconnects non-essential circuits to extend the range of the set for listening/talking only.

A push-button mute switch allows the user to cut off the transmitter to improve reception in noisy locations The call will remain muted as long as the mute switch is depressed. The switch also prevents the called person from hearing the caller's private conversation with someone nearby.

A tone ringer circuit provides an audible ringing signal when the set is in the monitor mode.

A ground start switch provides for originating calls when a ground start condition is required.

A spring-loaded belt hook provides a secure connection to a belt loop or "D" ring for a convenient way to carry or store the test set. The belt hook is used as a reference ground path for the optional ground start function.

In the monitor mode, line voltage can be measured.

In the talk mode, loop current can be measured without changing connections of the test instrument. If the loop current exceeds a predetermined magnitude, a "crow-bar" circuit including a positive temperature coefficient resettable fuse effectively open-circuits to protect the instrument. Over-voltage protection is also provided.

Two light-emitting diodes are used to indicate polarity, loop current, line voltage, program version number and internal energy supply voltage.

The implementation of these features will become apparent through the following description of the preferred embodiment made with reference to the drawings. External features of the preferred embodiment will be described with reference to FIGS. 1-4. An overview of the electrical analog and digital sections of the preferred embodiment will be given with reference to FIGS. 5 and 6. A description of a particular implementation will be with reference to FIGS. 7-9.

External features

The instrument 2 has a housing 4 in the shape shown in FIGS. 1-4 The housing 4 is adapted to be hand-held and portable by a telephone technician in the same manner as other types of telephone test instruments known in the art. The housing 4 is preferably made of a relatively lightweight, durable plastic as known in the art.

Figures 4, 4A:
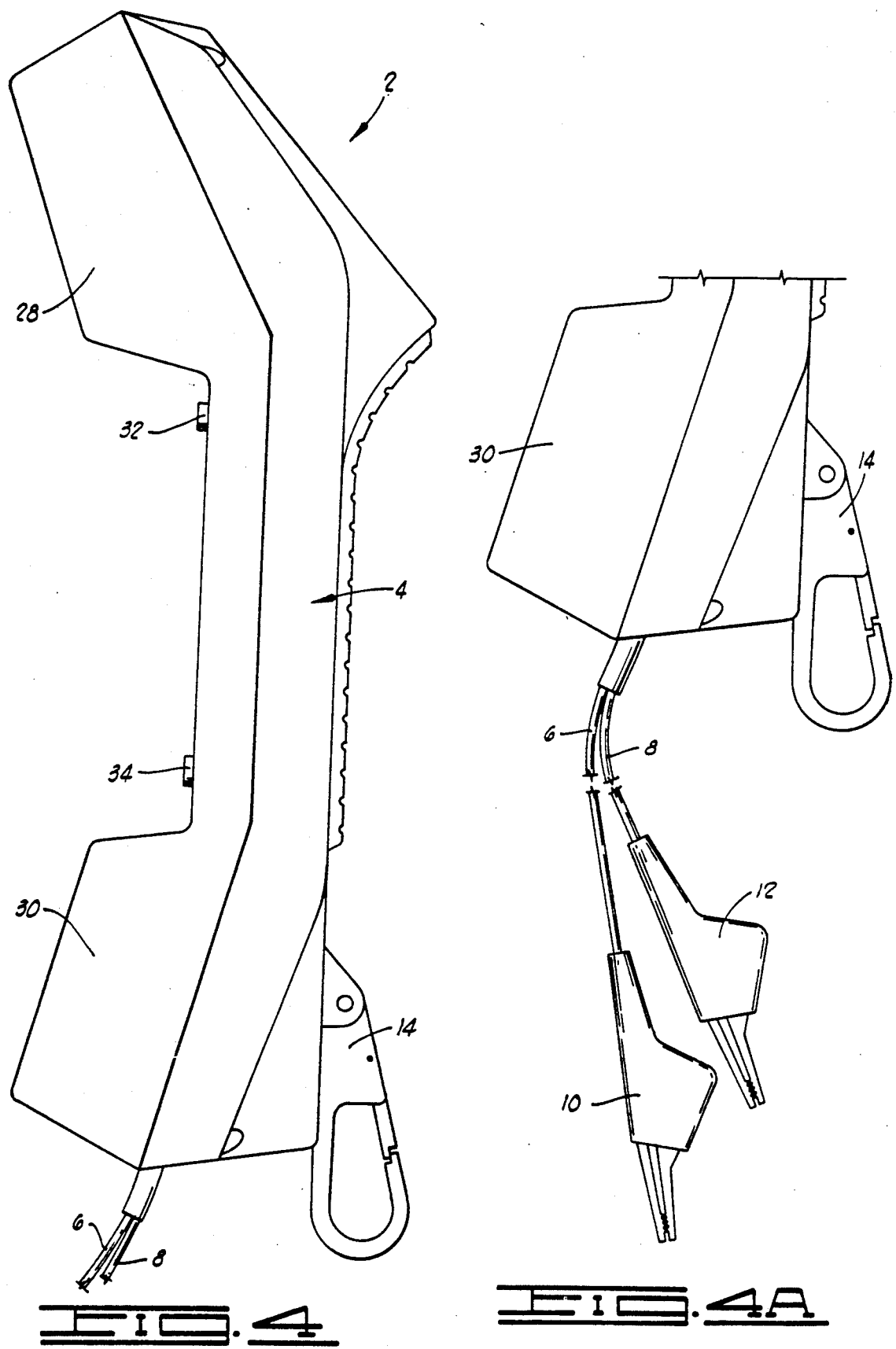
FIG. 4 is an external side view along line 4—4 shown in FIG. 1.
FIG. 4A is a view of connectors by which the telephone test instrument can be connected to a telephone circuit.

Referring to FIG. 1A, two insulated wires 6, 8 extend from the housing 4. The free end of the wire 6 terminates in a connector 10 (FIG. 4A), and the free end of the wire 8 terminates in a connector 12 (FIG. 4A). The connectors 10, 12 are of suitable types for connecting to the two wires of the telephone circuit to be tested by the instrument 2. Specifically, one connector is used to connect to the tip line and the other connector is used to connect to the ring line.

Attached to the housing 4 is an electrically conductive belt hook 14.

Also shown in FIG. 1A is a ribbed portion of the housing 4 in which is formed an opening 16 through which a loudspeaker broadcasts when activated.

Figure 1B:
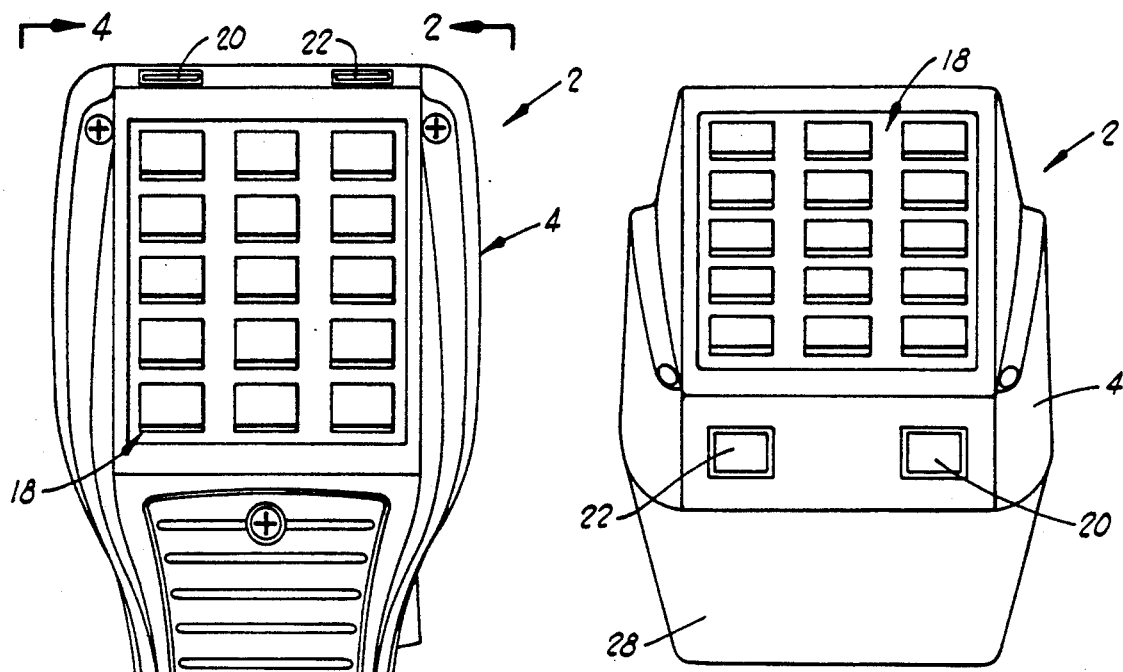

As shown in FIGS. 1A and 1B, a keypad 18 is mounted on the housing 4. Inside the housing 4, the keypad 18 connects to a programmed data processor so that the keypad 18 is the means through which the telephone technician enters data, including external commands, into the processor.

Mounted in the housing 4 above the keypad 18 are two light emitting diodes 20, 22. The processor controls the illumination of the light emitting diodes 20, 22 for indicating polarity, loop current, line voltage, program version number and voltage of an internal energy supply. The current and voltage measurements are signaled by serially flashing the diode 20 and then the diode 22 to specify a 2-digit measurement. Thus, the current and voltage measurements are signaled without having to provide space for an alphabetical or numerical display; however, if desired, such a display could be used.

Figure 1C:
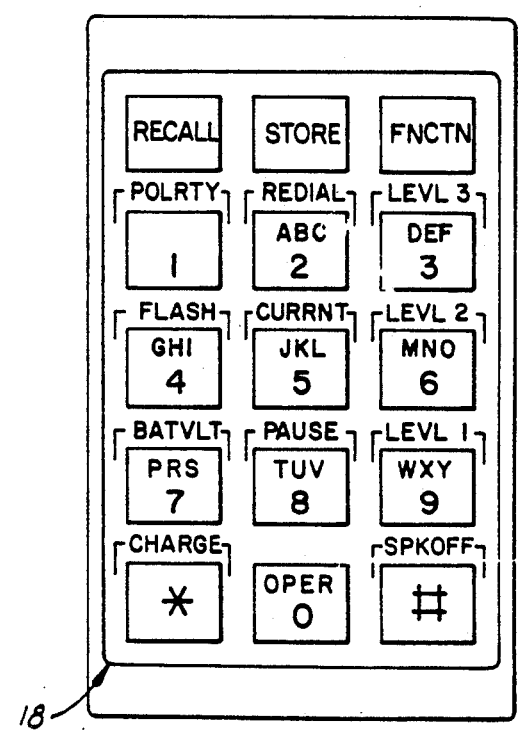
FIG. 1C shows an enlarged view of a keypad portion shown in FIGS. 1A and 1B.

Referring to FIG. 1C, the keypad 18 is shown as including 15 keys. As is apparent from the indicia shown in FIG. 1C as the alphanumeric and symbol labeling integrated with by being permanently marked on the keys and housing, eleven of these keys have two functions. Single functions are performed by keys:

STORE—store a number in memory
RECALL—dial a number previously stored in memory
FNCTN—select mode of the dual function key The dual function keys are used for their respective alphanumeric, * or # functions for which they are marked and also for the following functions which are selected after actuating the FNCTN key:

1/POLRTY—line polarity test
2/REDIAL—redial last number called
3/LEVL 3—activate loudspeaker at amplifier level 3
4/FLASH—precision hook switch or flash provides 220 millisecond off-hook/on-hook interval
5/CURRNT—make loop current measurement in talk mode or loop voltage in monitor mode
6/LEVL 2—activate loudspeaker at amplifier level 2
7/BATVLT—check internal energy supply voltage
8/PAUSE—set a delay interval between series of outpulsed digits (e.g., between a telephone number and credit card number)
9/LEVL 1—activate loudspeaker at amplifier level 1
0—signal software version number
*/CHARGE—indicate through light emitting diodes whether in charge mode to recharge internal energy supply
/SPKOFF—turn off the loudspeaker.

Referring to FIG. 2, mounted on one side of the housing 4 are two manually activated switches. A talk-/monitor switch 24 is a two-position, three-pole rocker switch. A tone/pulse/out (TPO) switch 26 is a three-position, four-section slide switch.

As shown in FIG. 3, the housing 4 has an earpiece section 28 and a mouthpiece section 30. Inside the earpiece section 28 is a receiver, and inside the mouthpiece section 30 is a transmitter. Mounted in between these sections in a handle portion of the housing 4 are two push-button, spring-return switches 32, 34. As subsequently described, the switch 32 controls muting of the transmitter, and the switch 34 controls a ground-start circuit.

Overview of Analog and Digital Sections

Contained within the housing 4 are electrical components and circuits which connect with external components described above and which operate to provide the functions of the preferred embodiment telephone test instrument 2. These components and circuits will be described here in terms of an analog section and a digital section. The analog section is functionally and schematically illustrated in FIGS. 5A-5B, and the digital section is functionally and schematically illustrated in FIG. 6.

Analog Section

The analog section, and the instrument 2 as a whole, are connected to the telephone circuit through the wires 6, 8 shown in FIGS. 1-4. Referring to FIG. 5A, the wire 6 is connected to or is an extension of a tip conductor 36 of the analog section, and the wire 8 is connected to or is an extension of a ring conductor 38 of the analog section. Connected across the conductors 36, 38 is a ringer circuit 40; and connected to the ring conductor 38 is a ground start circuit 42, which includes the switch 34 also shown in FIG. 3. The circuits 40, 42, and an over-current protection circuit not represented in FIG. 5A, will be more particularly described subsequently with reference to FIG. 8.

Figure 5B:
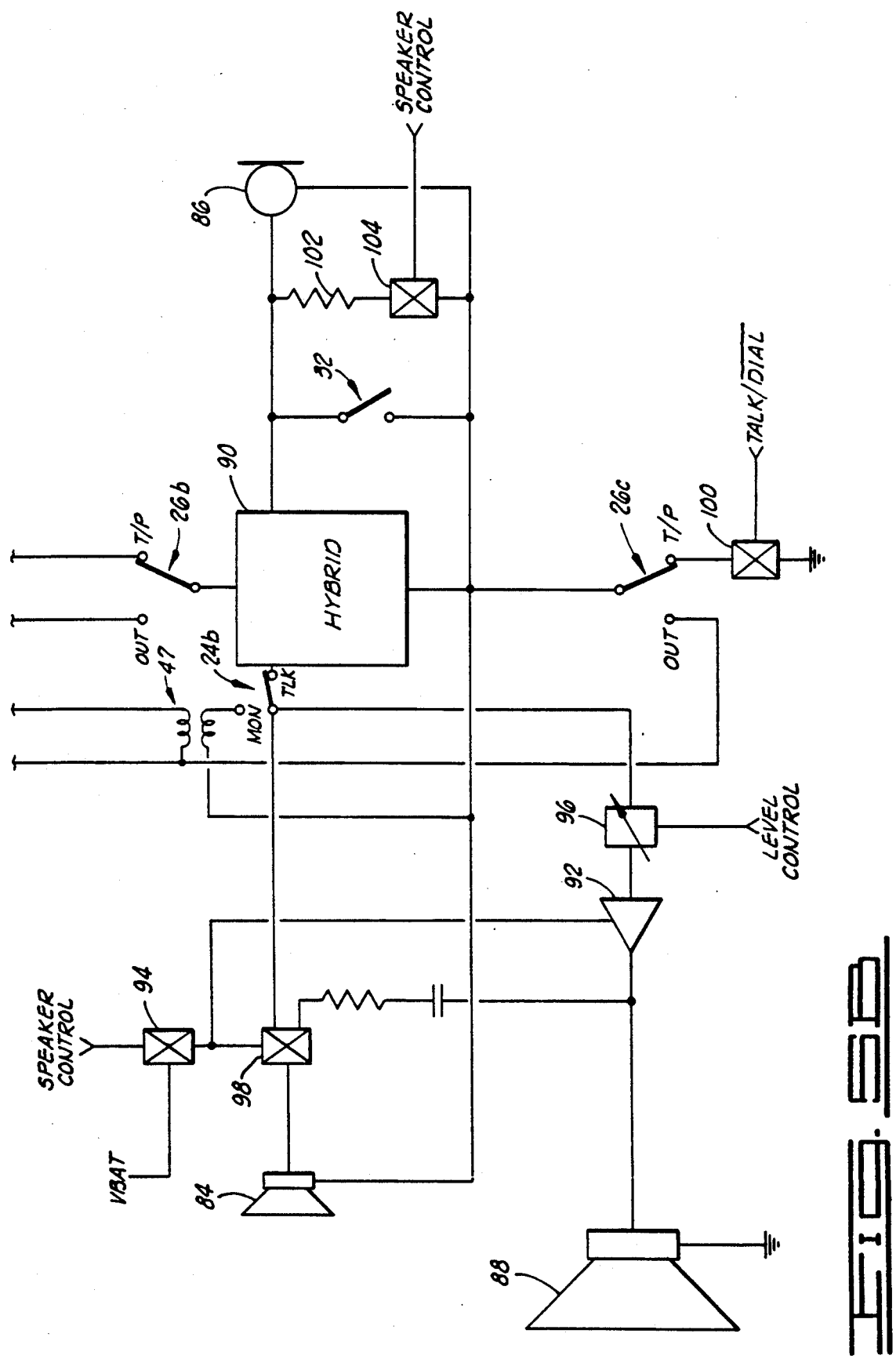
Figure 6:
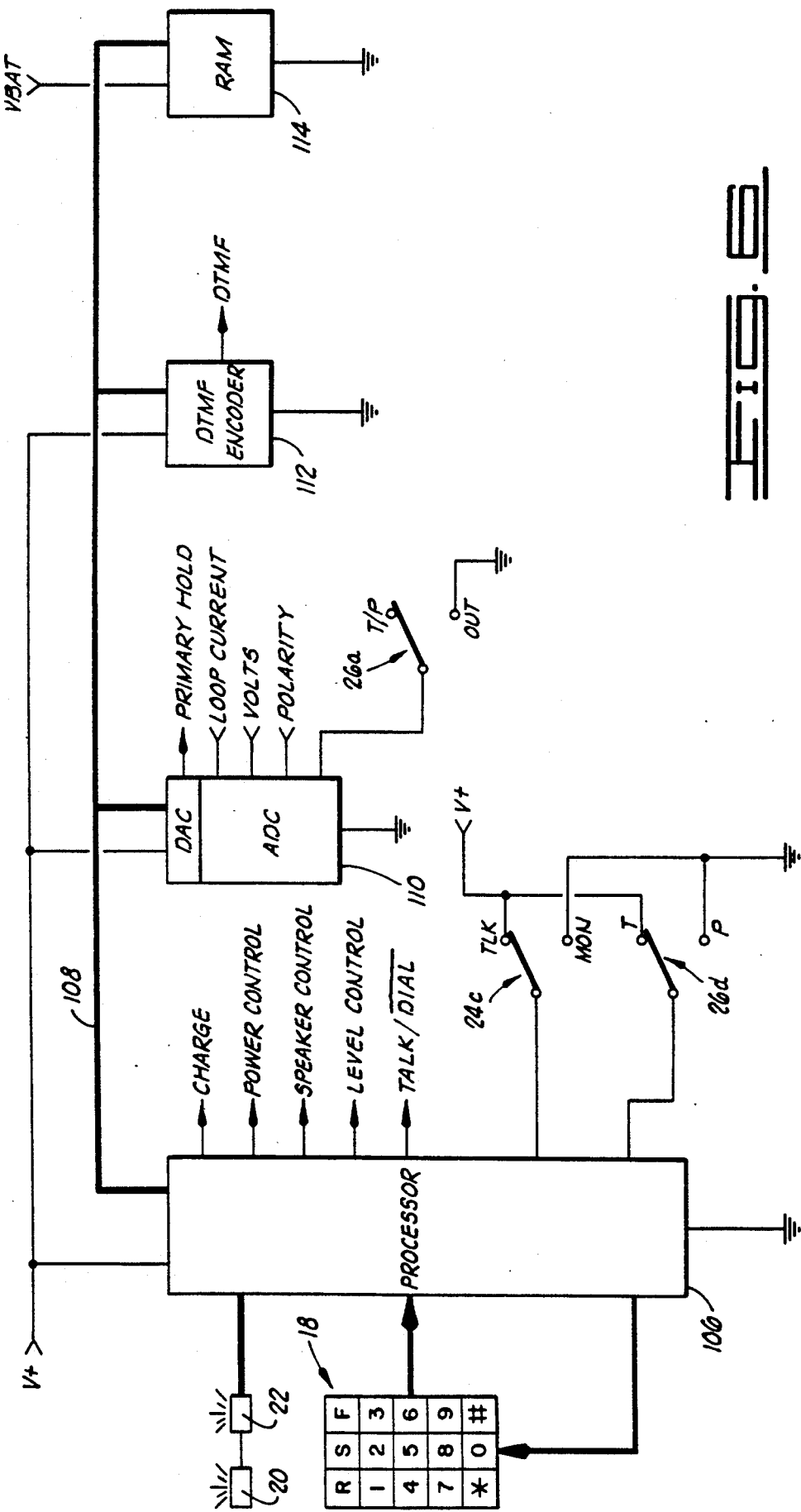
FIG. 6 is a functional block and schematic diagram of a digital section of the preferred embodiment of the telephone test instrument or the present invention.

As indicated by the common labelling in FIGS. 5A and 6, the tip conductor 36 connects into the digital section for permitting polarity and voltage to be tested. The tip conductor 36 also connects through a pole 24a of the talk/monitor switch 24 to either a talk circuit or a monitor circuit via conductors 44, 46 respectively. The talk circuit permits voice communications to be placed on a connected telephone circuit from the transmitter of the instrument 2. Connection to the monitor circuit prevents such transmitted voice communication but permits voice communications to be received from the connected telephone circuit and broadcast through the receiver and loudspeaker of the instrument 2. Such communications are initiated or broadcast through the subsequently described portion of the analog section shown in FIG. 5B. The monitor circuit presents to the telephone circuit a high impedance, such as by a transformer 47 (FIG. 5B).

Forming another part of the means for connecting the test instrument 2 to the telephone circuit is a rectifier bridge 48. A node 50 of the bridge 48 connects to the talk circuit conductor 44, and a node 52 of the bridge 48 connects to the ring conductor 38.

A node 54 of the bridge 48 is connected to a loop current measurement circuit 56 which is also connected to a section 26a of the TPO switch 26 and into the digital section as indicated by the common labeling in FIGS. 5A and 6. The loop current circuit 56 is operative when the instrument 2 is in both the talk mode (via the switch 24) and either the tone or pulse mode (via the switch 26). When operative, the loop current circuit 56 communicates a signal representative of loop current to a programmed data processor for measurement while the circuit 56 and the receiver and the transmitter of the instrument 2 are connected to the telephone circuit.

A node 58 of the bridge 48 connects to the remainder of the circuitry illustrated in FIG. 5A. One of these circuits connects other circuits of the instrument 2 to receive energization from the telephone circuit. This circuit, identified in FIG. 5A by the reference numeral 60, provides up to a predetermined maximum current at a system voltage, V+. Current above the maximum which can be provided through the circuit 60 comes from an internal rechargeable energy supply 62 also disposed in the housing 4. Such current or energy from the energy supply 62 is provided through a circuit 64 which functions as a switch controlled by the data processor of the digital section as indicated by the common labeling of FIGS. 5A and 6. The circuits 60, 64 are connected to a common node 66 through diodes 68, 70. In the particular implementation of the instrument 2 described hereinbelow, the circuits 60, 64 cooperatively operate through the diodes 68, 70 to energize the instrument 2 first from the telephone circuit up to the predetermined maximum current conducted through the circuit 60 and thereafter also from the energy supply 62 connected through the switch circuit 64.

Another circuit connected to the node 58 of the bridge 48 is a primary hold current circuit 72 identified in FIG. 5A. The hold circuit 72 is switchable in response to the data processor. When selected to be conductive, the circuit 72 passes a current through a loop current return conductor 73 to hold the telephone circuit to which the instrument 2 is connected. Control of the circuit 72 by the processor is indicated by the common labeling used in FIGS. 5A and 6.

Also connected to the node 58 is a circuit for providing a recharging current to the rechargeable energy supply 62 from the telephone circuit. This circuit includes a secondary hold current circuit 74 and a current limiting circuit 76. The circuit 74 is switchable in response to the data processor. When appropriately switched, the circuit 74 passes a current for conduction through the conductor 73 to hold the telephone circuit. In the particular implementation described hereinbelow, the circuit 72 and the circuit 74 operate mutually exclusively of each other so that a hold current is passed only by one of these two circuits The voltage of the energy supply 62 can be measured by the data processor through a voltage monitoring circuit 78. As shown connected in FIG. 5A, the voltage monitoring circuit 78 monitors specifically the voltage of the energy supply 62 only when the switching circuit 64 connects the energy supply 62 to the diode 70. In the preferred embodiment, the data processor automatically continually checks the voltage of the supply 62.

Also represented in FIG. 5A is the dialing feature of the instrument 2. This feature permits selectable communication of a telephone number by pulse or by tone in response to the data processor of the digital section. This is accomplished either with a dial pulse signaling circuit implemented through the primary hold current circuit 72, or with a tone signaling circuit 80. The dial pulse signaling circuit is effected by the data processor appropriately modulating the control signal (labeled "PRIMARY HOLD") which operates the circuit 72. The analog section portion of the tone signaling circuit 80 responds to a tone signal (labeled "DTMF") received from the digital section to modulate current through the loop current return conductor 73 when the analog section of the tone signaling circuit 80 is enabled through a switching circuit 82 controlled by the data processor, as indicated by the common labeling in FIGS. 5A and 6. In the particular implementation described hereinbelow with reference to FIGS. 7 and 8, the data processor is connected to the dial pulse signaling circuit and to the tone signaling circuit for alternatively controlling the operation thereof so that, for the dial pulse signaling circuit, the speed of transmitting pulses through the dial pulse signaling circuit and the break between the pulses are variable and further so that, for the tone signaling circuit, the generation of one or two tones and the frequency thereof are variable.

Referring now to FIG. 5B, the remainder of the analog section will be described. This portion of the analog section includes a receiver 84 which is mounted in the earpiece portion 28 of the housing 4. This portion of the analog circuit also includes a transmitter 86 which is disposed in the mouthpiece portion 30 of the housing 4. This portion of the analog section also includes a loudspeaker 88 disposed in the housing 4 so that the loudspeaker 88 broadcasts through the opening 16 in the portion of the housing 4 shown in FIG. 1A.

As illustrated in FIG. 5B, the receiver 84 and the loudspeaker 88 are connected to either the monitor circuit transformer 47 or a conventional hybrid circuit 90 through a pole 24b of the talk/monitor switch 24. The loudspeaker 88 is responsive to the signal received through the pole 24b only if a loudspeaker-driving amplifier 92 is energized. Energization of the amplifier 92 is controlled by the data processor of the digital section through a switching circuit 94 of the analog section shown in FIG. 5B. In the preferred embodiment, the amplifier 92 is de-energized, or not energized, whenever the voltage of the internal energy supply 62 is below a predetermined level as detected during one of the automatic, periodic checks of the voltage made by the data processor. The level of amplification provided by the amplifier 92 is controlled by the data processor through a level or volume control circuit 96 represented in FIG. 5B. The receiver 84 receives either the signal conducted through the switch portion 24b or from the amplifier 92, depending upon the setting of a switching circuit 98 which responds to the setting of the switching circuit 94.

The hybrid circuit 90 is a conventional voice communication interface circuit through which the receiver 84, transmitter 86 and loudspeaker 88 (when energized) are connected to the telephone circuit during normal talk mode operation of the instrument 2. The hybrid circuit 90 is selectably connected to the loop current return conductor 73 and an enabling/ disabling switching circuit 100 through TPO switch sections 26b, 26c when the TPO switch 26 is set either in the tone dialing mode or the pulse dialing mode. When the switch 26 is set in the out mode, the switch sections 26b, 26c connect the hybrid circuit 90 directly to the talk circuit conductor 44 and the ring conductor 38. This latter positioning of the switch 26 is typically used only to permit basic voice communication over a telephone circuit which cannot handle the additional load imposed by the remainder of the circuitry of the instrument 2 (e.g., a circuit beyond the subscriber loop limit or a dry circuit).

The transmitter 86 is connected to the hybrid circuit 90. The mute switch 32 identified in FIG. 3, for example, has its terminals connected across the transmitter 86. A resistor 102 is connectable across the transmitter 86 in response to closure of a switching circuit 104 controlled by the data processor of the digital section.

Digital Section

The digital section of the instrument 2 includes the aforementioned programmed data processor which is identified in FIG. 6 by the reference numeral 106. Referring to FIG. 6, the data processor 106 provides the indicated control signals and receives inputs from a pole 24c of the talk/monitor switch 24 and from a section 26d of the TPO switch 26. Further communications are over a bus 108 which connects the processor 106 with a digital-to-analog converter and analog-to-digital converter circuit (DAC/ADC) 110, a dual tone multiple frequency (DTMF) encoder circuit 112 and a random access memory circuit 114. The processor 106 also communicates with the keypad 18, and it controls the light emitting diodes 20, 22.

The digital-to-analog converter portion of the circuit 110 provides, under control of the processor 106, a modulating signal for operating the primary hold/dial pulse circuit 72. The analog-to-digital converter portion of the circuit 110 receives the signals by which the processor 106 can measure voltage of the energy supply 62, measure loop current, determine the polarity of the conductors 36, 38 to the tip and ring lines of a telephone circuit to which the instrument 2 is connected, and measure the line voltage across the connected tip and ring lines. The analog-to-digital converter portion of the circuit 110 also receives a signal from the section 26a of the TPO switch 26.

The DTMF encoder circuit 112 provides the tone signal to the tone signaling circuit 80 shown in FIG. 5A. The DTMF signal provided by the circuit 112 is generated under control of the processor 106.

The random access memory circuit 114 can be used to store a plurality of 27-digit numbers entered into the processor 106 via the keypad 18. Each of these numbers is enough to accommodate a telephone number, pause time and credit card number.

Particular Implementation

A particular implementation of the circuit more generally depicted in FIGS. 5 and 6 will be described with reference to FIGS. 7-9. Elements shown in FIGS. 7 and 8 corresponding to previously identified elements are referenced with the same numerals (in FIG. 7, the switch 24 is shown in the talk mode position, and the switch 26 is shown in the out mode position). Specific components in FIG. 7 are referred to by their alphanumeric circuit labels. Appendix A contains a list of component values or types correlated to the alphanumeric labels.

Figure 7A:
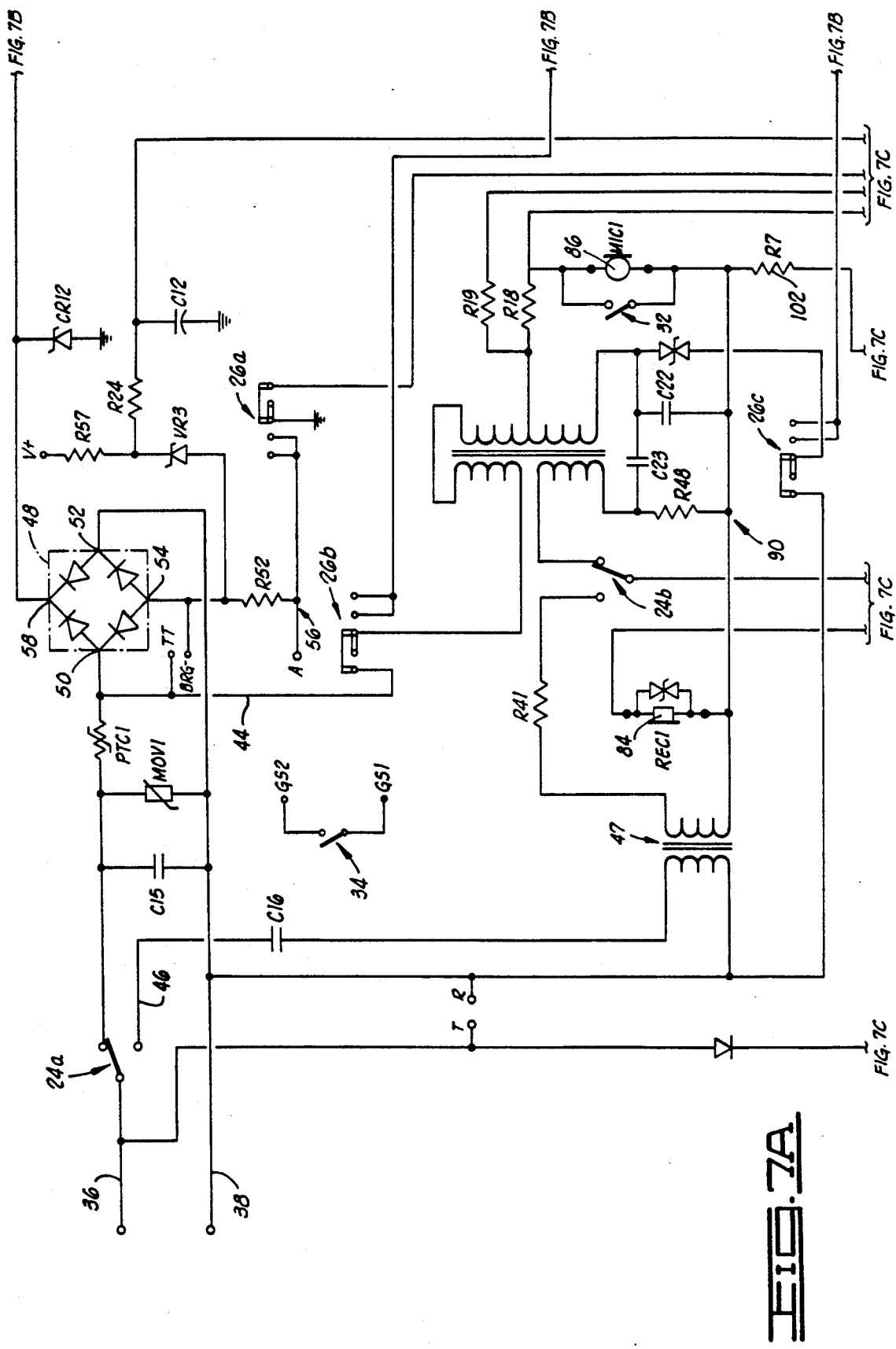
Figure 7A:
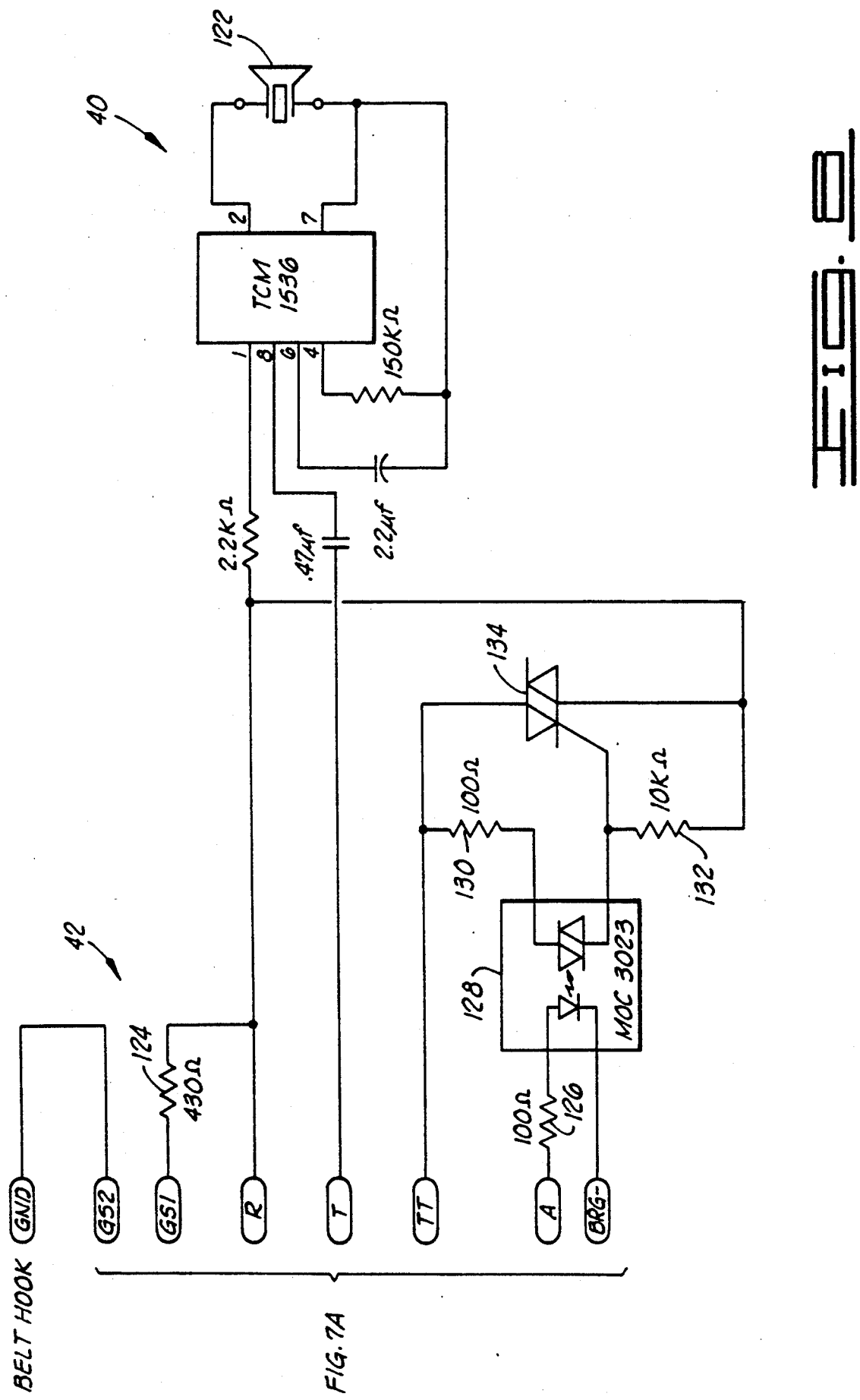

Referring to FIG. 7A, the particular implementation of the means for connecting the instrument 2 to a telephone circuit is the same as shown in FIG. 5A with the addition of filter capacitor C15, over-current protection device PTC1, and over-voltage protection device MOV1. Connected within this circuit is talk/monitor switch pole 24a which is manually actuated to place the instrument 2 in either the talk mode or the monitor mode.

In the talk mode, the transmitter 86 (M1C1) converts sound into electrical signals for transmission through the hybrid circuit 90. This talk circuit is modeled after the Western Electric type 500 telephone set. See also "Lee's ABC Pocket Guide For The Field On Telephone Set Circuits."

In the monitor mode, the talk circuit is disconnected from the telephone circuit, but the receive circuit is connected across the secondary of the transformer 47 as shown in FIG. 7A. The transformer presents a high impedance (greater than 100K) load to the telephone line for performing non-intrusive monitoring.

The data processor 106, particularly implemented by microprocessor U5 (FIG. 7D), determines whether the instrument 2 is operating in the talk mode or the monitor mode by reading the setting of the talk/monitor switch pole 24c. U5 uses P0.1 and P1.7 to read this portion of switch 24.

Also shown in FIG. 7A is the analog portion of the loop current measuring circuit 56. This circuit includes resistor R52 having one end connected to the node 54 of the bridge 48 and having its other end connected to section 26a of the TPO switch. In the out position of the TPO switch 26, the resistor R52 is left floating, but in the tone or pulse positions of the switch 26, the resistor R52 is connected to ground so that loop current can flow through R52.

To provide a sensing voltage in response to the magnitude of loop current flowing through R52, the loop current measuring circuit 56 includes a Zener diode VR3 having its anode connected to R52 and the node 54 of the bridge 48. VR3 has its cathode connected to resistors R57 and R24. The other end of R57 is connected to the system voltage, V+, and the other end of R24 is connected to capacitor C12 and an analog input of DAC/ADC 110 (U3 in FIG. 7D). This analog input is digitized and communicated to the microprocessor U5 wherein the digitized sensed voltage is used to determine the loop current flowing through R52. For the particular implementation of elements listed in Appendix A, the loop current equals (2.5—voltage read by U5)/R52; however, the "crow-bar" circuit described hereinbelow with reference to FIG. 8 prevents the instrument 2 from conducting over 150 milliamperes of loop current in the particular implementation.

When loop current has been measured by the microprocessor U5, its value is signaled without using an alphabetical or numerical display. The loop current value is instead signaled by flashing the light emitting diodes (LEDs) 20, 22 (FIG. 7D). LEDs 20, 22 are controlled by P1.2, P1.6 and P1.7 of U5 through transistors Q20, Q22 and Q21, respectively, shown in FIG. 7D. Q22 is required to disable the LEDs 20, 22 because P1.2 and P1.7 are also used to sense the state of the talk-/monitor switch 24 and the TPO switch 26.

Referring to FIG. 7B, the analog portion of the power management circuitry of the instrument 2 will be described. When the conductors 36, 38 (FIG. 7A) are connected to an active telephone circuit and the switch 24 is in the talk mode position, energy is provided to the instrument 2 from the telephone circuit through transistors Q7, Q8 (FIG. 7B). In the particular implementation, these transistors provide a 5 milliampere constant current source. Activation of these transistors actuates the microprocessor U5 to perform a processor reset and to set P1.5. The setting of P1.5 activates transistor Q17 through transistor Q23. The switching of these two transistors in turn controls transistors Q16, Q26 so that the internal energy supply 62, which in the particular implementation is a rechargeable nickel cadmium battery, is connected to the node 66 through the diode 70. The transistors Q23, Q17, Q16, Q26 are included within the energy supply switch means 64 schematically represented in FIG. 5A.

In the particular implementation, the maximum voltage of the energy supply 62 is less than the voltage at the node 66 when the portions of the instrument 2 being supplied with the system voltage V+ from the node 66 require less than the current which can be provided through the Q7, Q8 energization circuit. When this current is exceeded, the system voltage is pulled down sufficiently so that the diode 70 becomes conductive. Thus, current in excess of that provided from the telephone circuit through Q7, Q8 is provided from the energy supply 62.

The switching circuit 64 is activated not only in response to setting P1.5 of the microprocessor U5, but also in response to closure of the FNCTN switch of the keypad 18. Thus, even when the instrument 2 is being operated in the monitor mode by means of the appropriate setting of the switch 24, pressing the FNCTN key activates the circuit 64 to connect the energy supply 62 to provide system voltage V+ and thereby actuate the microprocessor U5. This causes the microprocessor to reset itself and then set P1.5 to maintain the energy supply 62 connected through the circuit 64.

As previously described with reference to FIG. 5A, the energy supply 62 is rechargeable from the telephone circuit through the secondary hold current circuit 74 and the recharging circuit 76. The secondary or alternate hold circuit 74 includes transistor Q10 which is controlled by transistor Q11 which in turn is controlled through P1.4 of the microprocessor U5. The circuit 74 also includes diode CR13 and resistor R22 connected to Q10 and the loop current return conductor 73.

When Q10 is conductive, the recharging circuit 76 is energized to provide a 10 milliampere recharging current through diode CR11 to the energy supply 62. The 10 milliampere current is provided by VR2 in response to the current and voltage from the telephone circuit.

In the particular implementation, recharging current is applied to the energy supply 62 only when there is sufficient loop current detected in the telephone circuit via monitoring of the loop current flowing through R52 previously described. Whether recharging current is to be enabled or disabled via control of Q11 is determined by the microprocessor U5 operating within its programmed instructions. This programming is such that no recharging is permitted when the detected loop current falls below a predetermined magnitude, such as 26 milliamperes in the particular implementation. This programming also provides, however, for enabling the recharging circuit in response to the loop current having risen above another predetermined magnitude, such as by increasing to above 30 milliamperes in the particular implementation. This is determined by the microprocessor U5 periodically checking the loop current. In the particular implementation, when not charging but detecting the loop current is above 30 milliamperes, Q11 is actuated to make the circuits 74, 76 conductive. When the loop current falls below 26 milliamperes while charging, however, the microprocessor U5 operates Q11 to disable the circuits 74, 76. These circuits remain disabled until the loop current returns to above 30 milliamperes, whereupon the microprocessor U5 again turns the circuits 74, 76 on. These different current levels are used to provide software-implemented hysteresis to prevent an oscillatory switching on and off condition which could occur if a single on/off current magnitude were used as the switching point. This meets requirements set by BELLCORE to prevent "showering," a condition wherein telephone equipment is not sure a circuit has been seized.

Also shown in FIG. 7B is the primary hold current circuit 72. This circuit provides the primary path for loop current through the talk circuit. The circuit 72 includes transistors Q5, Q6 and Q9. Q6 and Q9 act as a switch and are controlled by Q5. Q5 is controlled by the analog output of the DAC/ADC 110 (U3 in FIG. 7D). Additionally, precision dial pulsing is accomplished through the circuit 72 by modulating the base of Q5 with the analog output of DAC/ADC 110 under control of the microprocessor U5. The software controlling U5 can be changed to vary the dial pulsing, such as its speed and the percentage of break between dial pulses.

The instrument 2 can also be operated to provide tone dialing. This includes the DTMF encoder device 112 shown as device U4 in FIG. 7B. Device U4 produces all sixteen valid DTMF tones and eight single frequency tones. The device U4 can also be programmed to output musical tones over a two octave range. U4 operates with an on-chip oscillator running at 3.579545 megahertz and is controlled directly by U5 via the bus 108.

To produce DTMF dialing, the talk circuit must be floating to allow U4, through transistor Q12, to drive the loop current return line 73. This is accomplished with transistors Q14, Q15. Q14, when turned on, provides a loop current path for Q12. Q15, when turned on, provides a loop current path for the talk circuit in FIG. 7A. Both Q14 and Q15 are controlled by P1.3 of U5 and are mutually exclusive because of the signal inversion caused by transistor Q13. As indicated in FIG. 7B, Q12, Q14, Q15 correspond to elements 80, 82, 100, respectively, shown in FIGS. 5A and 5B.

Microprocessor U5 determines whether the test set is to signal using tone (DTMF) or pulse (dial pulse) by reading section 26d of the TPO switch. Microprocessor U5 uses P0.1 and P1.2 to read this section. Additionally, when the TPO switch 26 is set to the out position, the talk circuit of FIG. 7A is placed directly across the tip and ring lines, bypassing any internal circuitry which would present an extra load on the telephone circuit. Going into out mode also automatically turns off the loudspeaker 88 (FIG. 7C) if it is on.

Also shown in FIG. 7B is a voltage divider circuit by which a voltage produced by the energy supply 62 can be measured. This corresponds to the circuit 78 shown in FIG. 5A. Resistors R25, R26 are connected between ground and a monitored voltage, VMON, which tracks the voltage of supply 62 when Q16 is conductive. The junction of R25, R26 is connected to an analog input of the DAC/ADC 110. The sensed analog voltage is digitized and communicated to the microprocessor U5 for conversion to the value of the monitored voltage. This value is communicated via the flashing of the light emitting diodes 20, 22 (e.g., flashing LED 20 to indicate the ones digit and flashing LED 22 to indicate the tenths digit).

Referring to FIG. 7C, a voltage reference circuit 116 provides a voltage reference to the DAC/ADC 110 and to the loudspeaker circuit.

The loudspeaker circuit shown in FIG. 7C includes the loudspeaker 88, the amplifier circuit 92 and the level/volume setting circuit 96. Also shown in FIG. 7C are particular implementations of the control switch 94 and the switching circuits 98, 104. The switches 98, 104 are parts of a relay K1 shown in FIG. 7C.

When the loudspeaker 88 is turned on through control switch 94, K1 is also thereby set. This disconnects the receiver 84 from being driven directly by the talk circuit (i.e., the hybrid 90) and connects the receiver 84 to the output of amplifier device U2 within the circuit 92. This connection is made through R5 and C28 as shown in FIG. 7C. Setting K1 also places resistor R7 (resistor 102 in FIG. 5B) across the transmitter 86.

The power for amplifier device U2 and the switching of relay K1 is controlled by transistors Q3, Q4 of the switching circuit 94. Q3 and Q4 are controlled by P0.2 of the microprocessor U5 and transistor Q24. The power to operate U2 and K1 is derived from the internal energy supply 62. Power is applied to U2 and K1 is set when U5, P0.2 is cleared. Additionally, capacitor C1 is charged to provide power to reset K1. Power is removed from U2 and K1 is reset (C1 is discharged through the set reset coils) when P0.2 of U5 is set.

During operation of the loudspeaker 88, offset voltage from the circuit 116, through resistors R1, R2, is summed with the received signal to compensate for the unipolar energy supply 62.

The received signal is summed with the offset voltage through operational amplifier device U1A, which is configured as a noninverting amplifier with a gain of 2. Additionally, U1A provides a low impedance output to accommodate the input impedance of the circuits 92, 96.

The output of U1A is capacitively coupled through capacitor C3 into a digitally controlled voltage divider comprising resistors R9, R10, R11 and transistors Q1, Q2. R9 is the series resistance in the divider. R10 and R11 can be independently switched to ground through Q1 and Q2, respectively. Q1 and Q2 are controlled by P1.0 and P1.1, respectively, of the microprocessor U5. The output of the digitally-controlled voltage divider provides input to amplifier device U2, which is configured for maximum open loop gain. Three of the four discrete levels of gain which can be obtained through U2 depending upon the states of Q1 and Q2 as controlled by the microprocessor U5 are selected in response to actuation of appropriate keys of the keypad 18 and the state of the talk/monitor switch 24 as will be subsequently described.

To summarize, actuating the control switch 94 energizes the amplifier circuit 92 and operates the switch 98 (and the switch 104) so that the receiver 84 is driven in response to the output signal from the amplifier circuit 92. When the loudspeaker 88 is not energized, the receiver 84 is operated at a base level from the hybrid circuit 90. During loudspeaker operation when the switch 98 connects the receiver 84 to the amplifier circuit 92, the receiver 84 remains active and is operated at a level not less than the base level. Thus, the receiver 84 remains active at all times in both loudspeaker-on and loudspeaker-off modes. In the loudspeaker-on mode, the amplifier circuit 92 also drives the loudspeaker 88. The particular level at which the receiver 84 and the loudspeaker 88 operate is set by the circuit 96. During the loudspeaker-on mode, the resistor 102 (R7) is connected across the transmitter 86.

Referring to FIG. 7D, the programmed data processor 106 is shown implemented by the microprocessor U5. The particular implementation of U5 is known. The interface between U5 and the connected keypad 18 is described in Appendix B hereof. Also connected to U5 are an oscillator circuit 118 and a reset circuit 120. The program contained within the internal program memory of U5 is listed in Appendix C hereof. Flow charts of the program are shown in FIGS. 9A-9H.

Figures 9A, 9C:
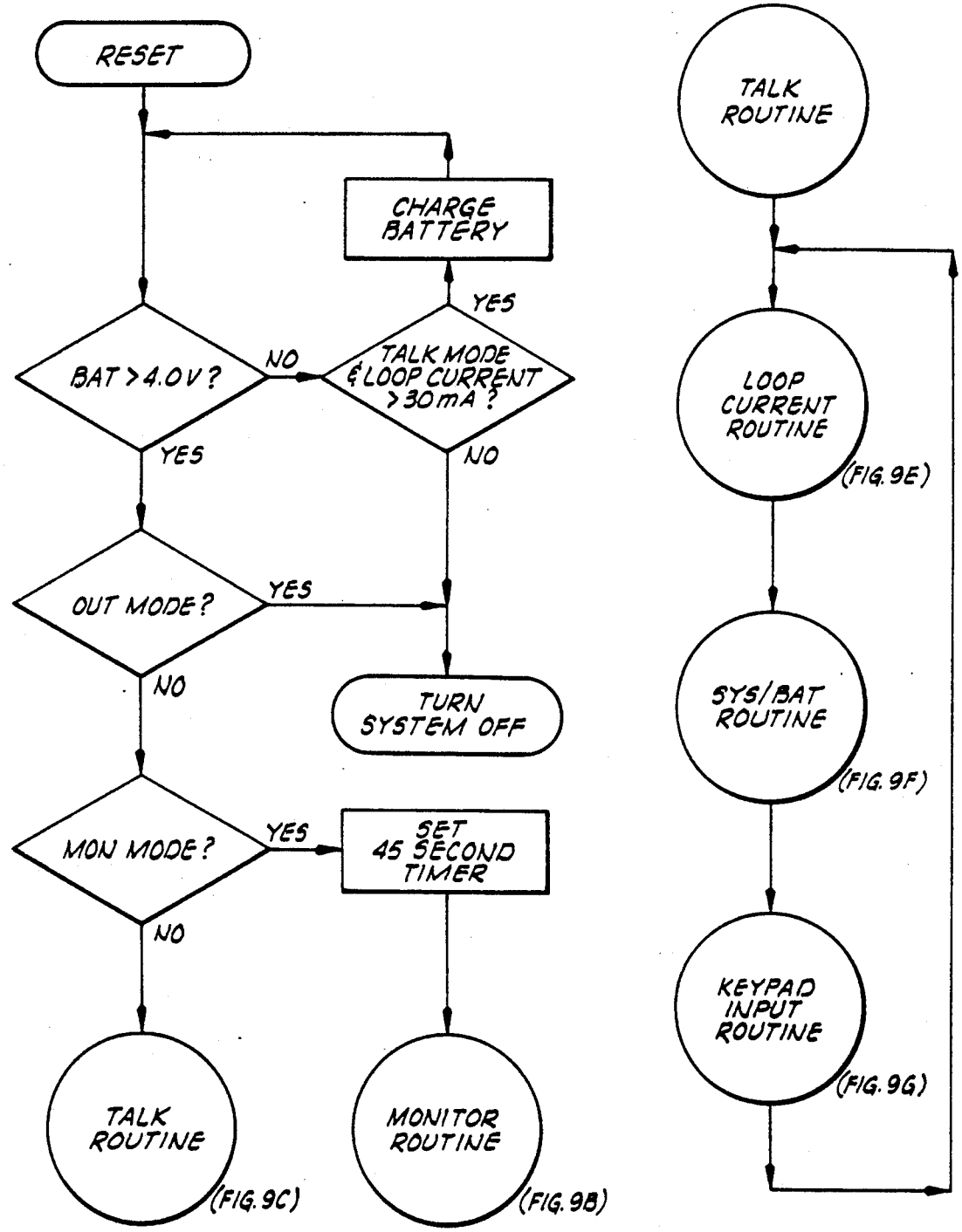

FIG. 9A shows the flow chart for the reset or system initialization portion of the program. Reset is caused by any one of the following: pressing the function (FNCTN) key of the keypad 18, switching from monitor mode to talk mode when the instrument 2 is connected to active tip and ring lines, switching from tone mode or pulse mode to out mode, switching from out mode to tone mode or pulse mode, and in the SYS/BAT routine if the internal energy supply 62 voltage is not greater than a predetermined voltage. When the reset routine is entered, the voltage of the supply 62 is checked. If it is below the predetermined value, and the instrument 2 is in the talk mode and there is sufficient loop current, the battery is charged. If the voltage of the supply 62 is initially above the predetermined voltage, the out mode and monitor mode are checked and the appropriate action shown in FIG. 9A taken.

Figure 9B:
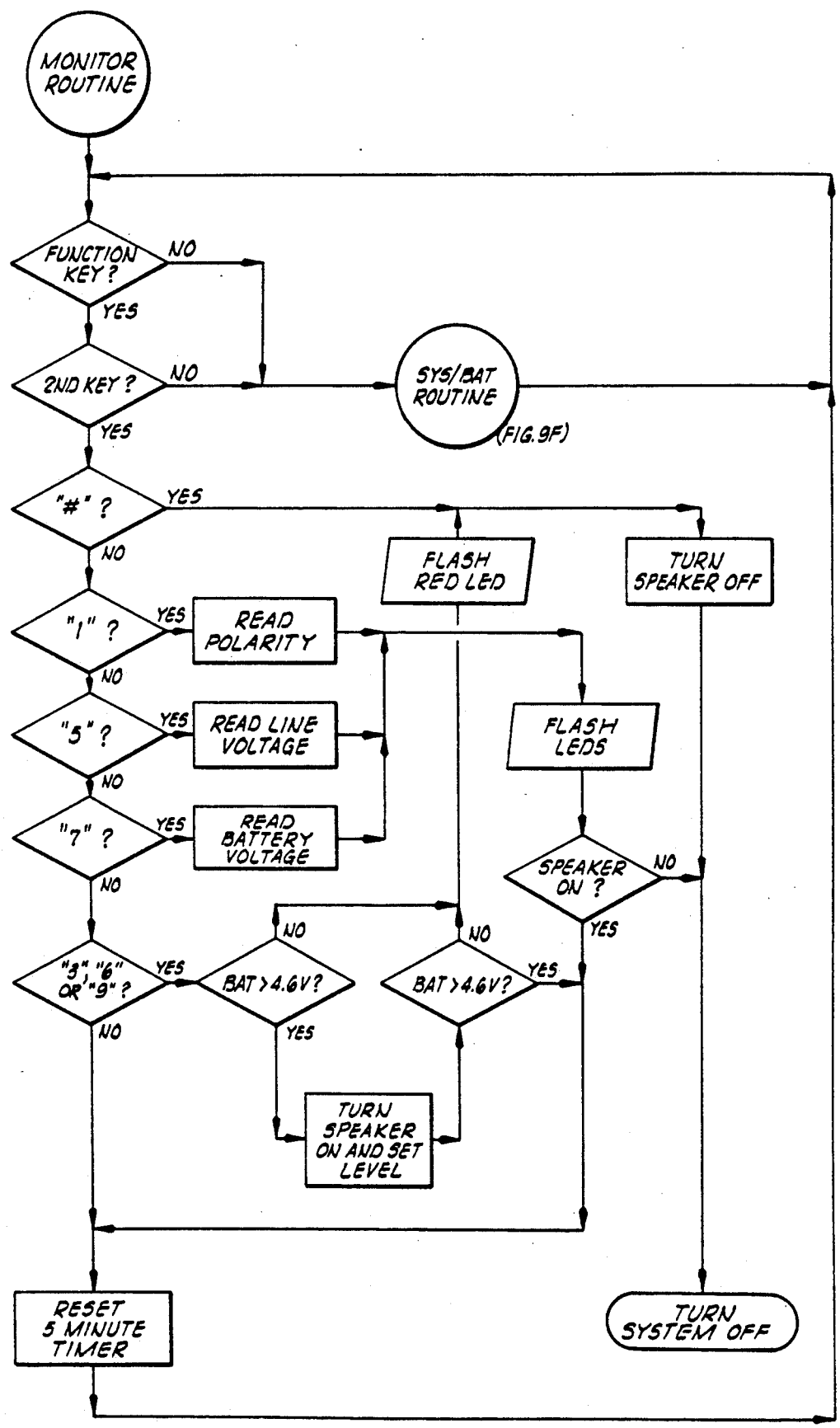

FIG. 9B shows the monitor routine which can be entered from the reset routine as indicated in FIG. 9A. In the monitor routine, the functions indicated in FIG. 9B can be selected by means of pressing the appropriate keys of the keypad 18. It is to be noted that in the monitor routine, the internal energy supply voltage is checked when loudspeaker operation is selected. U5 continually (22.7 seconds) and automatically checks the voltage to insure that it is above a predetermined level adequate for energizing the loudspeaker. This also occurs in the SYS/BAT routine (FIG. 9E) and function routine (FIG. 9H).

FIG. 9C shows the talk routine which can also be entered from the reset routine. The talk routine includes performing the loop current routine, the SYS/BAT routine and the keypad input routine, each of which will be described hereinbelow with reference to FIGS. 9E, 9F and 9G, respectively.

FIG. 9D is the flow chart for the talk mode/off-line routine which can be entered from the loop current routine shown in FIG. 9E. During the talk mode/off-line routine, telephone numbers with pauses can be stored.

FIG. 9E shows the loop current routine which controls the charging of the internal energy supply 62. This routine implements software charge hysteresis wherein if the supply is not being charged and the loop current is greater than a first predetermined level, U5 turns on the charging circuit and turns off the primary hold circuit; whereas if the charge circuit is on and the loop current is less than a second predetermined value, U5 turns off the charging circuit and turns on the primary hold circuit. FIG. 9E also shows that if the loop current is initially detected to be below a minimum value, the instrument 2 is considered to be off-line so that the talk mode/off-line routine is entered.

Figure 9F:
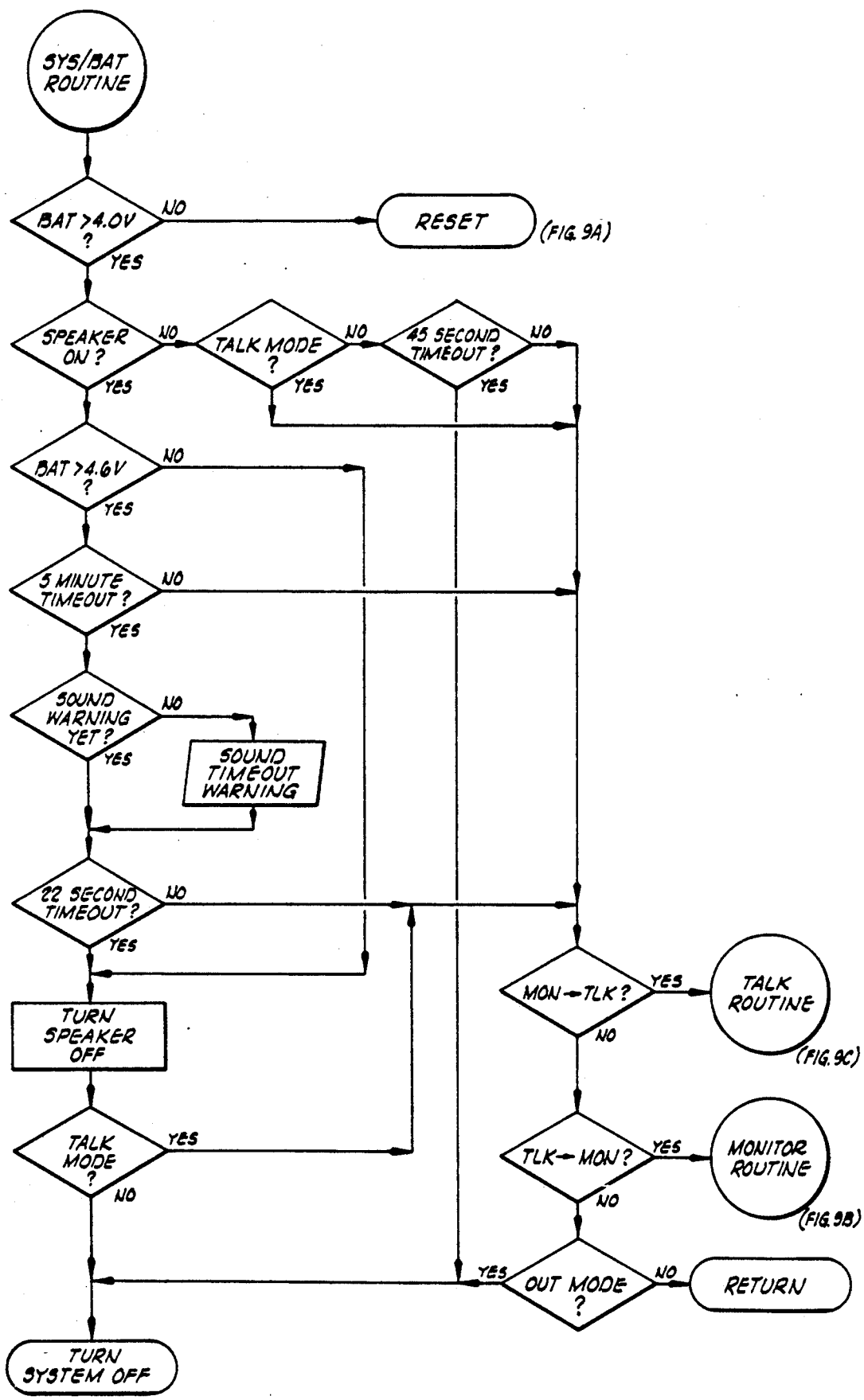

FIG. 9F is the flow chart for the SYS/BAT routine. If the internal energy supply 62 voltage is too low, the reset routine is entered. If the supply voltage is initially above the predetermined level, it is determined whether the loudspeaker is on. If it is not, modes set by the talk-/monitor switch 24 and the TPO switch 26 are checked. If, on the other hand, the speaker is on, the internal energy supply 62, is checked, as is a five-minute operating limit. Ultimately the indicated modes are checked or the system is turned off as indicated.

Figure 9G:
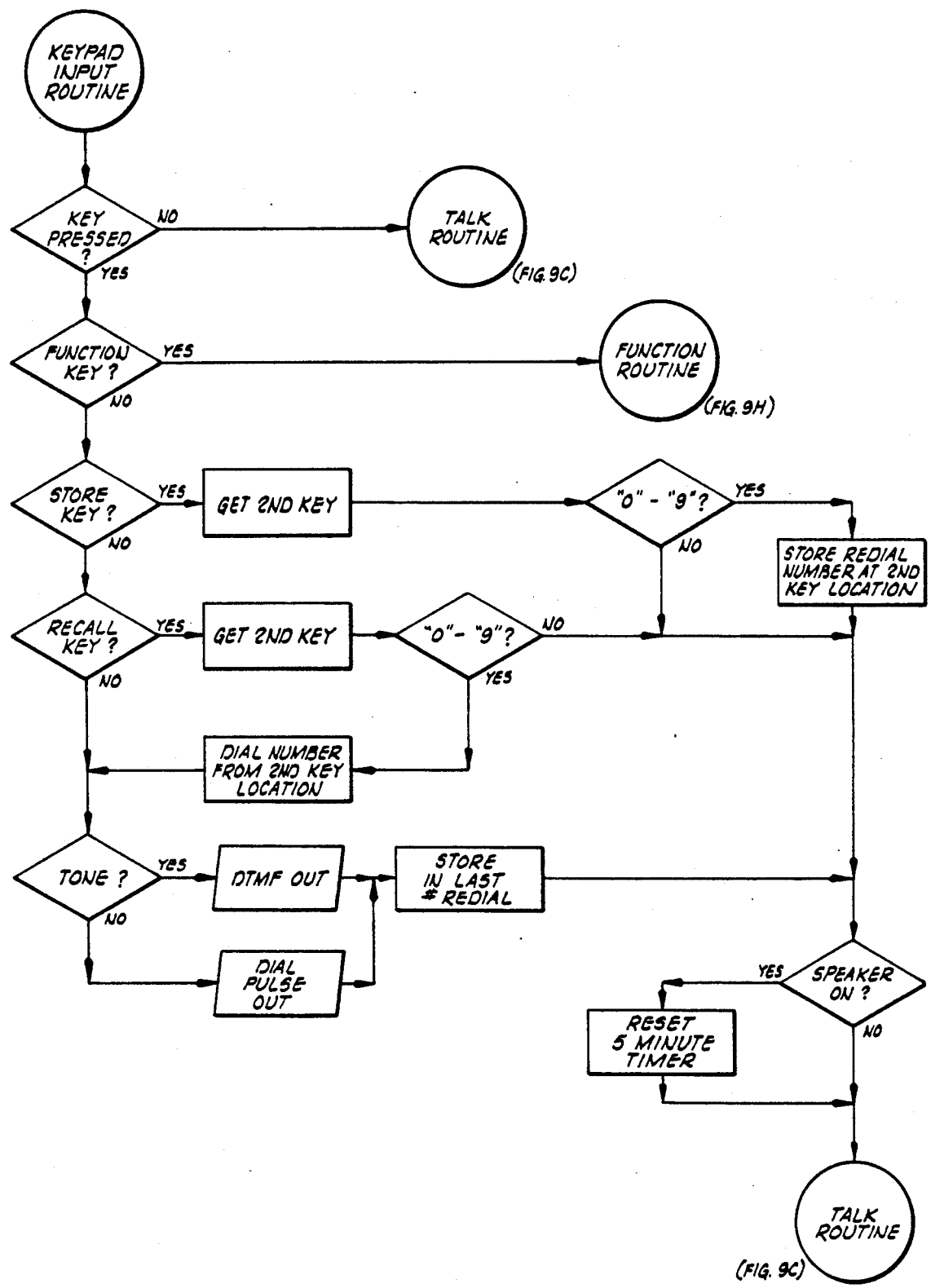

FIG. 9G shows the keypad input routine wherein the talk routine is recommenced, or the function routine is entered, or store, recall and dialing functions are checked and performed. During a store function, a telephone number is loaded in a selected memory location; if a recall function is performed, a previously entered number is retrieved and dialed from the selected location; in the dialing function, the telephone number is dialed by either DTMF or pulse dialing and the number is stored in the last number redial location.

FIG. 9H shows the function routine which is entered from the keypad input routine shown in FIG. 9G. The various functions are performed if the function (FNCTN) and appropriate numerical/function selection keys of the keypad 18 are pressed. These various functions are described hereinbelow in the "operation" section.

With reference again to FIG. 7D, also shown in FIG. 7D are switch sections 24c, 26d which are read by U5 to determine the talk/monitor and tone/pulse/out modes of operation of the instrument 2.

The LEDs 20, 22 which are controlled by U5 to indicate polarity, loop current and internal energy supply voltage are also shown in FIG. 7D. To conserve energy, U5 duty-cycles or strobes the LEDs 20, 22 when they are illuminated.

Also shown in FIG. 7D is the DAC/ADC 110 implemented by integrated circuit U3. U3 provides one 8-bit digital-to-analog converter (DAC) and four 8-bit analog-to-digital converters (ADC) in the single integrated chip. All channels are controlled directly from U5 via the bus 108. U3 derives a reference for the ADC from the circuit 116 shown in FIG. 7C. The DAC controls the base of Q5 which controls the hold/dial pulse circuit 72.

ADC channel 1 receives the voltage which is on the tip conductor 36 to determine whether the polarity of the test leads 6, 8 is correct. This input is scaled by resistors R27, R28 shown in FIG. 7C. This scaling also allows the line voltage to be measured in the monitor mode when the polarity is correct.

ADC channel 2 senses the out position of the TPO switch 26.

ADC channel 3 receives the voltage of the voltage monitor circuit 78 comprising resistors R25, R26 connected to Q16 (FIG. 7B).

ADC channel 4 receives voltage responsive to the current through the resistor R52 to determine loop current.

Also shown in FIG. 7D is the random access memory 114 implemented by the integrated circuit U6. U6 provides 256 bytes of random access memory for the storage of phone numbers. U6 is powered directly from the internal energy supply 62 so that it will retain its contents even when the instrument 2 is off line. U6 is controlled directly by U5 via the bus 108.

Referring to FIG. 8, implementations for the ringer circuit 40 and the ground start circuit 42 are shown. The circuit 40 includes a piezo ringer 122 which is activated by the illustrated circuit which is connected to the ring and tip junctions having the common labeling (R and T) in FIGS. 7A and 8. The ringer 122 produces a ring tone when the test instrument 2 is rung into while in the monitor mode.

The ground start circuit 42 includes a resistor 124 connected between the ring conductor 38 (via the R junction) and the switch 34 (via the GS1 junction). The other end of the switch 34 is connected through the circuit 42 to the belt hook 14 (via the GS2 and GND junctions). When the switch 34 is closed and the belt hook 14 is touched to an electrical ground, the ring conductor of the connected telephone circuit is grounded through the resistor 124.

Also shown in FIG. 8 is part of the high current protection circuit of the illustrated embodiment. The portion of the circuit shown in FIG. 8 includes a resistor 126 connected to an opto-coupled triac 128 which is also connected to resistors 130, 132 and a 20-ampere triac 134. This circuit is connected to the R, T, TT, A and BRG- junctions as shown in FIGS. 8 and 7A. This places the triac 134 in series with the positive temperature coefficient resettable fuse, PTC1, between the tip and ring lines when the instrument 2 is connected to the tip and ring lines of a telephone circuit. The triac 134 is also in parallel with the instrument operating circuit which includes the bridge 48 and the circuits connected off the nodes 54, 58 thereof.

When the instrument 2 is connected to the tip and ring lines and operated in the talk mode, the loop current to the instrument 2 is routed through R52 (FIG. 7A). This allows loop current to be calculated by measuring the voltage drop across R52. Additionally, R52 is connected across the input of the optocoupled triac 128 through the A and BRG- junctions (FIGS. 7A and 8). The output of the opto-coupled triac 128 operates the gate of the triac 134.

If the instrument 2 is exposed to a constant high voltage source such as a power line (AC) or pair-gain equipment (DC), large amounts of current will flow through CR12 (FIG. 7A) or, if in charge mode, CR17 (FIG. 7B). When the current exceeds 150 milliamperes in the particular implementation, the voltage drop across R52 will bias on the internal light emitting diode of the optocoupled triac 128, thereby triggering its internal triac and gating on the triac 134. When this occurs, the triac 134 presents a virtual short, shunting the loop current through itself and PTC1.

PTC1 is a positive temperature coefficient resistance device which exhibits a non-linear increase in resistance in response to increased current. In the particular implementation, PTC1 presents a series resistance of 8.5 ohms until the predetermined current of 150 milliamperes is reached. At that time, the resistance of PTC1 increases by several orders of magnitude, thereby presenting a virtual open circuit in response to the high loop current passing through it. This protects the instrument 2 until the hazardous current is removed. Removing the external voltage from the instrument 2 of the particular implementation is the only way this "crow-bar" circuit is reset.

With reference again to diodes CR12, CR17 mentioned above, these two elements provide high voltage surge protection along with MOV1 (FIG. 7A). In the event of a high voltage surge, such as by lightning, MOV1 will clamp the voltage to approximately 300 volts in the particular implementation providing overvoltage protection for PTC1. Due to the response time of MOV1, however, a momentary voltage surge could be transmitted through the bridge 48. Such a voltage surge will be clamped to 144 volts in the particular implementation by CR12. If a voltage surge were to occur while the instrument 2 is in the charge mode (using the current path through Q10 as the hold circuit), CR17 (FIG. 7B) will clamp the voltage to 40 volts in the particular implementation, thereby protecting VR2, which has a maximum voltage rating of 40 volts in the particular implementation.

Operation internal energy supply check

Before the instrument 2 is used, the condition of the internal energy supply 62 is checked by pressing the FNCTN and 7/BATVLT keys. The range of operation for the loudspeaker/amplifier in the particular embodiment is from 4.6 to 5.9 volts. The other functions of the instrument 2 will operate on a low limit of 2 volts. The LED 20 flashes at 30 ipm (interruptions per minute) indicating the units digit; the LED 22 flashes at 30 ipm indicating the tenths digit. A low limit reading would be 4 flashes of the LED 20 and 6 flashes of the LED 22.

connecting to a line

Operate the talk/monitor switch 24 to the monitor position before connecting to a subscriber line to avoid interrupting any transmission in progress. The high impedance monitoring circuit provides a non-service affecting audible monitor. The amplifier/loudspeaker can be enabled with similar results.

Connect the lead 6 of the test instrument 2 to the tip (positive/ground) side of the telephone circuit and the lead 8 to the ring (negative/battery) side of the telephone circuit. If the leads are connected in reverse, the instrument 2 will work; however, a polarity check will show a reverse polarity.

enabling the amplifier speaker

Press the FNCTN key plus one of the LEVEL keys to enable the amplifier/speaker at one of four amplification levels: AL0 (minimum), AL1, AL2, AL3 (maximum).

|                 | monitor mode | talk mode |
|-----------------|--------------|-----------|
| FNCTN + 9/LEVL 1 | AL1          | AL0       |
| FNCTN + 6/LEVL 2 | AL2          | AL1       |
| FNCTN + 3/LEVL 3 | AL3          | AL2       |

The amplifier will be automatically powered down after 5 minutes or if the internal energy supply 62 voltage drops too low.

amplifier/speaker off

Press the FNCTN and #/SPKOFF keys to turn off the amplifier/loudspeaker.

loop current/line voltage check

To make a check of the loop current, operate the talk/monitor switch 24 to the talk position and press the FNCTN and 5/CURRNT keys. The number of flashes of the LED 20 will indicate the tens digit of the measured current (in milliamperes); the units digit will be indicated by counting the number of flashes of the LED 22. The measurement range of the particular illustrated embodiment is from 0–250 milliamperes with regards to the loop current measurement circuit 56 itself, but the overall circuitry is limited to 150 milliamperes by the "crow-bar" circuit of FIG. 8. That is, if loop current exceeds 150 milliamperes, PTC1 effectively open-circuits.

If the FNCTN and the 5/CURRNT keys are pressed in the monitor mode, the voltage sensed at the junction of R27, R28 will be measured and displayed via flashing of the LEDs 20, 22. If the instrument is connected in reversed polarity, the voltage will not be displayed; only one LED will be flashed to indicate "low".

charge current check

Although when in the talk mode pressing the FNCTN and 5/CURRNT keys produces signals indicating the loop current magnitude, pressing the FNCTN and */CHARGE keys in the talk mode illuminates one of the LEDs 20, 22 to indicate the charged status of the energy supply 62. LED 20 is flashed at two-second intervals if the voltage of the supply 62 is less than 5.8 volts; LED 22 is flashed at two-second intervals if the voltage is greater than or equal to 5.8 volts. This function also puts the instrument in the charge mode if charging current is available.

polarity check

If a polarity check on the line is desired, operate the talk/monitor switch 24 to the monitor position and press the FNCTN and the 1/POLRTY keys. A lighted LED 22 indicates normal polarity; a reversed line will be indicated by a lighted LED 20.

originating a call

With the instrument 2 connected to an idle line, select the type of pulsing required by moving the TPO slide switch 26 to position T if DTMF pulses are required or to position P for dc pulses.

Set the talk/monitor switch 24 in the talk position and verify that dial tone is received by listening to the receiver 84. With the keypad 18, enter the desired number. The digits will be output at the correct rate.

To draw dial tone on a ground start line, operate the talk/monitor switch 24 to the talk position and press the ground start switch 34 while holding the belt hook 14 against a grounded object.

To mute the transmitter, such as may be needed in noisy locations, press and hold the mute switch 32.

last number redial

In T (DTMF) mode or P (dc pulse) mode, the last number dialed can be automatically redialed by toggling the talk/monitor switch 24 from talk position to monitor position to talk position and then pressing the FNCTN key followed by the 2/REDIAL key.

storing numbers in the repertory dialer memory

The particular implementation of the instrument 2 has 10 memory locations allocated for storing telephone numbers; one for each of the number keys 1 through 0. Twenty-seven digits can be stored in each of the locations; if a 28th digit is entered, the previous digits will be cleared and the last digit (the 28th just entered) starts a new series. Numbers can be entered in memory at any time. That is, the test set may be either on-hook or off-hook and need not be connected to a subscriber loop.

In some situations, it may be necessary to insert a pause between digits of a stored number, e.g., when accessing a trunk through a PBX or CENTREX switch that requires a "9" or other intermediate access number to seize an outside line. This is accomplished by pressing the FNCTN key and the 8/PAUSE key. Each time the FNCTN and 8/PAUSE keys are operated in this manner, a 4-second delay will be stored in the number string. A maximum of four 4-second pauses may be stored between any two numbers in a string.

A credit-card number can be stored along with the number being called. Pause intervals from 4 to 16 seconds are programmable and use only one digit of the register. A call requiring credit-card billing will be stored as follows: 0+3 digit area code+7 digit telephone number+8 second pause+14 digit credit-card number, e.g., 0+123+456-7890+(FNCTN+8/PAUSE twice)+405+555-1212-2934.

To store a number being called:
(1) connect the test instrument 2 to a subscriber line;
(2) if the line is idle, operate the talk/monitor switch 24 to the talk position;
(3) dial the number;
(4) press the STORE key;
(5) press one of the keys 1 through 0 to designate the memory location.

A call will be placed to the number dialed; the memory location will be cleared if a number was previously stored there, and the new number will be stored in that location.

To store a number with the set on hook or disconnected:
(1) select talk mode via switch 24;
(2) press the FNCTN key once;
(3) enter the number to be stored;
(4) press the STORE key;
(5) press a number key, 1 through 0, for the desired memory location. (If there is no keypad activity for 15 seconds, the number will be lost and the procedure must be repeated.)

dialing a stored number

After going off-hook and receiving dial tone, press the RECALL key and then the appropriate key (0-9) for the desired memory location. The number selected will be automatically dialed in the dial mode selected by the tone/pulse/out switch 26.

precision hookswitch flash

Press the FNCTN and 4/FLASH keys when a precision-timed interval (flash) is required to eliminate accidentally disconnecting calls. This provides an electronically-precision-timed disconnect for custom calling and PABX features, e.g., while testing trunk circuit equipment.

software version number

Pressing the FNCTN and 0 keys causes the software version number to be signaled by flashing the LEDs 20, 22 to count the version number.

disconnection upon test or call completion

After testing is completed, release the line or equipment by operating the talk/monitor switch 24 to the monitor position or by disconnecting the test clips from the line or by removing the plug from the equipment.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

APPENDIX A

U1 dual operational amplifier integrated circuit, LT1013CN8
U2 power amplifier integrated circuit, LM386N
U3 I$^2$C bus D/A×1, A/D×4 integrated circuit, Signetics PCF 8591
U4 I$^2$C bus DTMF generator integrated circuit, Signetics PCD 3312
U5 I$^2$C bus 2K EPROM microprocessor integrated circuit, Signetics PCF83C751
U6 I$^2$C bus 256K×8 static RAM integrated circuit, Signetics PCF8570
R1 1M (resistor values are in ohms)
R2 10K
R3 20K
R4 16K
R5 6.8K
R6 43K
R7 5.1
R8 160K
R9 1K
R10 470
R11 110
R12 11K
R13 510K
R14 33K
R15 10K
R16 130
R17 160K
R18 120
R19 27
R20 10K
R21 100K
R22 560, 3W
R24 10K
R25 69.8K
R26 100K
R27 25.5K
R28 1M
R29 100K
R30 10K
R31 180
R32 30K
R33 75K R34 1M
R35 100
R36 2K
R37 2K
R38 120
R39 39K
R40 3.3K
R41 39
R42 100K
R43 100K
R44 3.3K
R45 5.1
R46 100
R47 470
R48 82
R50 100K R51 100K
R52 10, 1%, 1.5W
R53 100K
R54 8.2K
R55 1M
R56 100K
R57 43K
C1 220 (capacitor values are in microfarods unless otherwise marked)
C2 0.47
C3 2.2
C4 0.1
C5 0.1
C6 10
C7 0.1
C9 220
C10 0.1
C11 0.1
C12 1.0
C13 0.47
C14 4.7
C15 0.01
C16 2.2nf
C17 0.1
C18 10
C19 22pf
C20 22pf
C21 10
C22 0.47
C23 1.5
C24 4.7
C25 0.1
C27 10
C28 0.1
C29 0.01
C31 0.1
VR1 LT1004-2.5
VR2 LT1086
VR3 LT1004-2.5
CR12 130V transient voltage suppressor CR17 37V transient voltage suppressor
MOV1 300V metal-oxide varistor
PTC1 positive temperature coefficient resettable fuse
MIC1 Audiosears 1583
REC1 Audiosears 2463V
SPK1 Star Micronics DS-29C, 45 ohms, 0.1W

APPENDIX B

Keypad Scanning

I/O port 3 (P3.0–P3.7) of U5 is configured to scan the keypad. P3.4–7 are programmed as outputs and sequence a "0" through the rows of the keypad. P3.0.3 are programmed as inputs and read the columns. The diagrams and table detail the keypad encoding scheme, the configuration of P3 and the bit mapping and corresponding DTMF output codes.

KEYPAD ENCODING SCHEME

| COLUMN (Cx) | 2 | 1 | 0 | 3 | |
|---|---|---|---|---|---|
| ROW (Rx) | | | | | |
| 3 | 1 | 2 | 3 | ? | (NOT USED) |
| 0 | 4 | 5 | 6 | R | (NUMBER RECALL) |
| 2 | 7 | 8 | 9 | FNC | (FUNCTION SELECT) |
| 1 | * | 0 | # | S | (NUMBER STORE) |

PROCESSOR I/O PIN ASSIGNMENTS FOR THE KEYPAD PORT P3.x

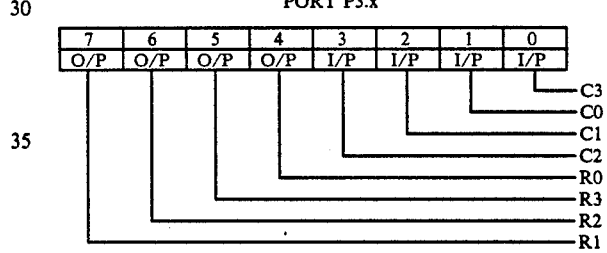

KEYPAD LOOK-UP TABLE

| | DTMF CODE | | OUTPUT | | INPUT | |
|---|---|---|---|---|---|---|
| KEY | BINARY | HEX | BINARY | HEX | BINARY | HEX |
| 0 | XX010000 | 10 | 0111XXXX | 7X | XXXX1011 | XB |
| 1 | XX010001 | 11 | 1101XXXX | DX | XXXX0111 | X7 |
| 2 | XX010010 | 12 | 1101XXXX | DX | XXXX1011 | XB |
| 3 | XX010011 | 13 | 1101XXXX | DX | XXXX1101 | XD |
| 4 | XX010100 | 14 | 1110XXXX | EX | XXXX0111 | X7 |
| 5 | XX010101 | 15 | 1110XXXX | EX | XXXX1011 | XB |
| 6 | XX010110 | 16 | 1110XXXX | EX | XXXX1101 | XD |
| 7 | XX010111 | 17 | 1011XXXX | BX | XXXX0111 | X7 |
| 8 | XX011000 | 18 | 1011XXXX | BX | XXXX1011 | XB |
| 9 | XX011001 | 19 | 1011XXXX | BX | XXXX1101 | XD |
| ? (A) | XX011010 | 1A | 1101XXXX | DX | XXXX1110 | XE |
| R (B) | XX011100 | 1B | 1110XXXX | EX | XXXX1110 | XE |
| FNC (C) | XX011101 | 1C | 1011XXXX | BX | XXXX1110 | XE |
| S (D) | XX011011 | 1D | 0111XXXX | 7X | XXXX1110 | XE |
| * | XX011110 | 1E | 0111XXXX | 7X | XXXX0111 | X7 |
| # | XX011111 | 1F | 0111XXXX | 7X | XXXX1101 | XB |

```
 1    $PAGEWIDTH(150)
 2    $MOD751
 3    $TITLE(C.M.C. 7900S V1.8 Updated on January 31, 1990 at 12:01 PM)
 4    ;
 5    ; Version 1.2  - change drop-out current from 18 ma. to 5 ma.
 6    ; Version (1.3) - stop clearing register when storing numbers (version 1.3 never released)
 7    ;              - shorten SPeaKer muting TIME in Tone mode (SPK_TIME)
 8    ; Version 1.4  - invert make/break polarity for PCB REV. P5 (unit X15)
 9    ;              - LINAMP in MONitor mode returns line voltage
10    ;              - R22 = 560 or 470, hysteresis changes in SYS_STAT routine
11    ;              - check if loop current sufficent to charge after reset
12    ;              - change drop-out current from 5 ma. to 8 ma.
13    ; Version 1.5  - rearrange FNCTN look-up table for new bezel (units X15 & 7900S)
14    ;              - fixed speaker operation in REDIAL routine
15    ;              - fixed off-line TaLK mode telephone number loading (droping first key after FNCTN)
16    ; Version 1.6  - turn off after speaker time-out in MONitor mode (45 sec.)
17    ;              - in MONitor mode w/SPeaKeR on, loop rather than processor Idle Mode (min. loudspeaker n
                       oise, increase 1.6 mA.)
18    ; Version 1.7  - increase DTMF tone-on-time by 30 msec. inorder to account for tone-ramp-up time
19    ; Version 1.71 - REDIAL inoperative in MONitor mode (released as V1.7)
20    ; Version 1.8  - fixed TaLK/MONitor switch recognition when dialing
21    ;              - indicate low battery condition ( < 4.4 volts) by flashing red LED every 22.7 sec.
22    ;              - add FNCTN + '*' battery charging function
23    ;
```

| 0018 | 24 | SOFT_VER | EQU | 18H       | ;software version number used by FNCTN+0 |
| 0001 | 25 | TRUE     | EQU | 1         | |
| 0000 | 26 | FALSE    | EQU | 0         | |
| 0000 | 27 | EMULATE  | EQU | FALSE     | ;if emulator EMULATE = TRUE, else FALSE for 87C751 |
| 0003 | 28 | CRYSTAL  | EQU | 3         | ;3 = 3.579545M Hz, 1 = 1.0M Hz, 640 = 640K Hz |
| 0230 | 29 | R22      | EQU | 560       | ;R22 = 560 or 470, hysteresis changes depending on which resistance selected |

```
30    ;
31    IF (EMULATE)
32         $NOOBJECT                              ;no INTEL hex format written if in emulator mode
33    ENDIF
34    ;
35    ; Global Ram Locations
```

| 0031 | 36 | _I2CBUF  | EQU | 31H        | ;starting address of _I2C BUFfer |
| 0030 | 37 | _I2CCNT  | EQU | _I2CBUF-1  | ;number of bytes to send or receive on I2C |
| 002F | 38 | _DESTRW  | EQU | _I2CBUF-2  | ;I2C dest address + read/write bit |
| 002E | 39 | _FLAGS1  | EQU | _I2CBUF-3  | ;system flag register 1, this address MUST be between 20-2FH |
| 002D | 40 | _FLAGS0  | EQU | _I2CBUF-4  | ;system flag register 0, this address MUST be between 20-2FH |
| 002C | 41 | _SPKRLVL | EQU | _I2CBUF-5  | ;speaker level value in reverse order (0-3), where 3 = min. leve 1 & 0 = max. level |
| 002B | 42 | _DIGCNT  | EQU | _I2CBUF-6  | ;counts number of keys dialed or being dialed |
| 002A | 43 | _PULCNT  | EQU | _I2CBUF-7  | ;number of make/break represented by digit being dialed, pulse train |
| 0029 | 44 | _KEYCNT  | EQU | _I2CBUF-8  | ;counts number of keys entered in _I2C BUFfer |
| 0028 | 45 | _KEYPTR  | EQU | _I2CBUF-9  | ;counts number of keys entered in _I2C BUFfer, cleared after buffer out-pulsed |
| 0027 | 46 | _TMPTR1  | EQU | _I2CBUF-10 | ;make or break timer, 10ms increment (break = 60ms, make = 40ms) |
| 0026 | 47 | _TMPTR0  | EQU | _I2CBUF-11 | ;INterDigit TiMeR |
| 0025 | 48 | _DAVALUE | EQU | _I2CBUF-12 | ;last value written to DA converter by DA_WRITE routine |
| 0024 | 49 | _TIMERH  | EQU | _I2CBUF-13 | ;high byte of timer counter |
| 0023 | 50 | _TIMERL  | EQU | _I2CBUF-14 | ;low byte of timer counter; |
| 0022 | 51 | _TMPR3   | EQU | _I2CBUF-15 | ;temporary storage location 3, used by BINary to BCD routine only |
| 0021 | 52 | _TMPR2   | EQU | _I2CBUF-16 | ;temporary storage location 2, used by BINary to BCD routine only |
| 0020 | 53 | _TMPR1   | EQU | _I2CBUF-17 | ;temporary storage location 1, used by BINary to BCD routine only |
| 001F | 54 | _TMPR0   | EQU | _I2CBUF-18 | ;temporary storage location 0 |
|      | 55 | ; System Flags | | | |
| 0068 | 56 | MODE_FLG | EQU | _FLAGS0.0  | ; 0 = TaLK mode, 1 = MONitor mode |
| 0069 | 57 | DIAL_FLG | EQU | _FLAGS0.1  | ; 0 = Tone dial, 1 = Pulse dial |
| 006A | 58 | MB_FLG   | EQU | _FLAGS0.2  | ; 0 = Break, 1 = Make |
| 006B | 59 | SPKR_FLG | EQU | _FLAGS0.3  | ; 0 = SPeaKeR OFF, 1 = SPeaKeR ON, |
| 006C | 60 | RS_FLG   | EQU | _FLAGS0.4  | ; 0 = Store mode , 1 = Recall mode |
| 006D | 61 | CMOD_FLG | EQU | _FLAGS0.5  | ; 0 = no Changed MODe form TaLK to MONitor, 1 = Changed MODe |
| 006E | 62 | MUTE_FLG | EQU | _FLAGS0.6  | ; 0 = MUTE talk circuit off, 1 = MUTE talk circuit on |

| Addr | Line | Name | Op | Value | Comment |
|---|---|---|---|---|---|
| 006F | 63 | LINE_FLG | EQU | _FLAGS0.7 | ; 0 = unit off LINE, 1 = unit on LINE |
| 0070 | 64 | TLK_FLG | EQU | _FLAGS1.0 | ; 0 = unit off line in TaLK mode, 1 = unit on line in TaLK mode |
| 0071 | 65 | CHRG_FLG | EQU | _FLAGS1.1 | ; 0 = CHaRGe circuit off, 1 = CHaRGe circuit on |
| 0072 | 66 | PULS_FLG | EQU | _FLAGS1.2 | ; 0 = no manual PULSe dialing in process, 1 = manual PULSe dialing in process |
| 0073 | 67 | MSN_FLG | EQU | _FLAGS1.3 | ; 0 = key is in Least Significant Nibble, 1 = key is in Most Significant Nibble |
| 0074 | 68 | IND_FLG | EQU | _FLAGS1.4 | ; 0 = INterDigit time off, 1 = INterDigit time on |
|  | 69 | ;TEST_FLG | EQU | _FLAGS1.5 | ; 0 = no system status tests performed, 1 = system status tests performed |
| 0076 | 70 | TIME_FLG | EQU | _FLAGS1.6 | ; 0 = system BATtery status OK, 1 = system BATtery status below 4.8 volts |
|  | 71 | ;LBAT_FLG | EQU | _FLAGS1.7 | ; 0 = BATtery voltage OK, 1 = Low BATtery indication |
|  | 72 | ; Bit Assignments | | | |
| 0082 | 73 | SPKR_CNTRL | EQU | P0.2 | ; 0 = speaker on, 1 = speaker off |
| 0092 | 74 | TPO_CNTRL | EQU | P1.2 | ; 0 = Tone, 1 = Pulse or Out |
| 0092 | 75 | GRNLED_CNTRL | EQU | P1.2 | ; 0 = off, 1 = green selected or used as input for tone or pulse switch |
| 0093 | 76 | MUTE_CNTRL | EQU | P1.3 | ; 0 = MUTE on, 0 = MUTE off |
| 0094 | 77 | CHRG_CNTRL | EQU | P1.4 | ; 0 = CHaRGer off, 1 = CHaRGer on |
| 0095 | 78 | PWR_CNTRL | EQU | P1.5 | ; 0 = battery power off, 1 = battery power on |
| 0096 | 79 | LED_CNTRL | EQU | P1.6 | ; 0 = selected LED on, 1 = LEDs off |
| 0097 | 80 | TLKMON_CNTRL | EQU | P1.7 | ; 0 = TaLK mode, 1 = MONitor mode |
| 0097 | 81 | REDLED_CNTRL | EQU | P1.7 | ; 0 = off, 1 = red selected or used as input for talk or monitor switch |
|  | 82 | ; General Assignments | | | |
|  | 83 | IF (CRYSTAL = 3) | | | |
| 00D6 | 84 | T1MS_LOW | EQU | 0D6H | ;loads timer 0 w/65238, TH overflows once every 1ms, @f=3.579545 MHz |
| 00FE | 85 | T1MS_HGH | EQU | 0FEH | |
| 005A | 86 | T10MS_LOW | EQU | 05AH | ;loads timer 0 w/62554, TH overflows once every 10ms, @f=3.579545 MHz |
| 00F4 | 87 | T10MS_HGH | EQU | 0F4H | |
| 007A | 88 | T100MS_LOW | EQU | 07AH | ;loads timer 0 w/35706, TH overflows once every 100ms, @f=3.579545 MHz |
| 008B | 89 | T100MS_HGH | EQU | 08BH | |
|  | 90 | ENDIF | | | |
|  | 91 | IF (CRYSTAL = 1) | | | |
|  | 92 | T1MS_LOW | EQU | 0ADH | ;loads timer 0 w/65453, TH overflows once every 1ms, @f=1.0 MHz |
|  | 93 | T1MS_HGH | EQU | 0FFH | |
|  | 94 | T10MS_LOW | EQU | 0BEH | ;loads timer 0 w/64703, TH overflows once every 10ms, @f=1.0 MHz |
|  | 95 | T10MS_HGH | EQU | 0FCH | |
|  | 96 | T100MS_LOW | EQU | 073H | ;loads timer 0 w/57203, TH overflows once every 100ms, @f=1.0 MHz |
|  | 97 | T100MS_HGH | EQU | 0DFH | |
|  | 98 | ENDIF | | | |
|  | 99 | IF (CRYSTAL = 640) | | | |
|  | 100 | T1MS_LOW | EQU | 0CBH | ;loads timer 0 w/65483, TH overflows once every 1ms, @f=640 KHz |
|  | 101 | T1MS_HGH | EQU | 0FFH | |
|  | 102 | T10MS_LOW | EQU | 0EBH | ;loads timer 0 w/65003, TH overflows once every 10ms, @f=640 KHz |
|  | 103 | T10MS_HGH | EQU | 0FDH | |
|  | 104 | T100MS_LOW | EQU | 02BH | ;loads timer 0 w/60203, TH overflows once every 100ms, @f=640 KHz |
|  | 105 | T100MS_HGH | EQU | 0EBH | |
|  | 106 | ENDIF | | | |
| 00F0 | 107 | EOF | EQU | 0F0H | ;end of file marker |
| 0001 | 108 | IDL | EQU | 01H | ;when written to PCON register puts processor in Idle Mode |
| 0002 | 109 | PD | EQU | 02H | ;when written to PCON register puts processor in Power Down Mode |
| 000B | 110 | PSE | EQU | 0BH | ;pause code stored in buffer, BH=4 sec., CH=8sec., DH=12 sec., EH=16 sec. |
| 000A | 111 | AST_KEY | EQU | 0AH | ;value for '*' key returned by SCAN_KEY routine |
| 000B | 112 | PND_KEY | EQU | 0BH | ;value for '#' key returned by SCAN_KEY routine |
| 0000 | 113 | LIN_SEN | EQU | 0 | ;AD converter channel 0, telephone line sense, voltage on TIP side system ground ref. RING |

```
0001         114    OUT_SEN      EQU    1              ;AD converter channel 1, used to determine state of OUT mode
0002         115    BAT_SEN      EQU    2              ;AD converter channel 2, voltage across internal battery, used t
                                                        o determine battery cond.
0003         116    LPI_SEN      EQU    3              ;AD converter channel 3, voltage across 10 ohm resistor on neg.
                                                        side of bridge
008E         117    LN_REDIAL    EQU    8EH            ;last number redial storage location in ram
0040         118    I2CBUF_END   EQU    40H            ;last I2C BUFfer address + 1
0095         119    THRSH_LPI    EQU    149            ;THReSHold for _LooP I current, A converter voltage at Q18 base
0044         120    THRSH_BAT    EQU    44H            ;represents 4.4 volts measured at the battery, which is consider
                                                        ed low battery condition
0001         121    MON_TIMEH    EQU    001H           ;represents 45 sec. when compared against _TIMERL/H, based on 10
                                                        msec. interrupt rate
00C2         122    MON_TIMEL    EQU    0C2H           ;
000B         123    TLK_TIMEH    EQU    00BH           ;represents 5 min. when compared against _TIMERL/H, based on 10
                                                        msec. interrupt rate
00B8         124    TLK_TIMEL    EQU    0B8H           ;
0005         125    READ_TIME    EQU    5              ;number of 100 msec. increments between reading of switches
0007         126    LPI_TIME     EQU    7              ;700 msec., time increment for testing loop current
000E         127    SPK_TIME     EQU    14             ;1.4 sec., time increments between speaker mute & enable time
00E3         128    BAT_TIME     EQU    227            ;22.7 sec., time increment for testing battery status
             129    ;
             130    ; Low level interrupt vectors
0000         131           ORG    0
0000         132    STRT_PROG:
             133    ;      CLR    A                    ;cleared by RESET algorithm
0000 F52D    134           MOV    _FLAGS0,A            ;clear all flags
0002 F52E    135           MOV    _FLAGS1,A            ;clear all flags
0004 F52C    136           MOV    _SPKRLVL,A           ;clear _SPeaKeR LeVeL
0006 010E    137           AJMP   START
             138    ;      ORG    003H
             139    ;      RETI                        ;external (INT0) NOT USED
000B         140           ORG    00BH
000B B1B7    141           ACALL  TIMER_UPDATE         ;counter/timer 0 interrupt service routine
000D 32      142           RETI
             143    ;      ORG    013H
             144    ;      RETI                        ;external (INT1) NOT USED
             145    ;      ORG    01BH
             146    ;      RETI                        ;timer 1
             147    ;      ORG    023H
             148    ;      RETI                        ;serial I/O, I2C
             149    ;************************
             150    ; Main: Program Start   *
             151    ;************************
000E         152    START:
000E 758B7A  153           MOV    RTL,#T100MS_LOW      ;interuppt time is 100msec., load low byte into timer reload reg
0011 758D8B  154           MOV    RTH,#T100MS_HGH      ;load high byte '       '
0014 D28C    155           SETB   TR                   ;select GATE=0,C/T=0,TR=1
0016 D2A9    156           SETB   ET0                  ;enable timer 0 interrupt
0018 D2AF    157           SETB   EA                   ;enable interrupts
001A D19F    158           ACALL  READ_SWITCH          ;interrogate switch settings & update flags, updates MODE_FLG &
                                                        DIAL_FLG
001C         159    MODE_CHANGE:
001C 307202  160           JNB    PULS_FLG,NO_PULSE_DIAL ;skip termination if not pulse dialing
001F D159    161           ACALL  TERM_PULSE           ;TERMinate PULSE dialing
0021         162    NO_PULSE_DIAL:
0021 7401    163           MOV    A,#OUT_SEN           ;select DA active & channel 1 AD, OUT mode SENse line
0023 752500  164           MOV    _DAVALUE,#0          ;load value into DA register (loop current on by hardware defaul
                                                        t)
0026 91DF    165           ACALL  READ_VOLTAGE         ;read voltage @ S2/C, OUT mode switch
0028 B41200  166           CJNE   A,#12H,OUT_LE        ;test if analog value in ACC >= 1.2V
002B 402F    167    OUT_LE: JC    TURN_OFF             ;if OUT mode selected then ACC = 0, else 2.5V
002D 306B07  168    OUT_GT: JNB   SPKR_FLG,NO_SPKR     ;jump if SPeaKeR not on
0030 E52C    169           MOV    A,_SPKRLVL           ;load ACC w/SPeaKeR LeVeL
0032 439003  170           ORL    P1,#MIN_LVL          ;select min. level
0035 6290    171           XRL    P1,A                 ;exclusive or ACC w/P1, P1.0 & P1.1 will the only bits changed
0037         172    NO_SPKR:
0037 30680E  173           JNB    MODE_FLG,TLK_ADJ     ;jump if TaLK mode selected
003A C294    174           CLR    CHRG_CNTRL           ;disable charge circuit, must be off line
003C C271    175           CLR    CHRG_FLG             ;clear CHaRGe circuit FLaG
```

```
003E 71FE      176           ACALL   BREAK_CKT              ;disable primary hold circuit
0040 752701    177           MOV     _TMPTR1,#MON_TIMEH     ;load _TeMpory Timer Reg. 1 w/high byte time out value, 45 sec.
                                                             time-out
0043 7526C2    178           MOV     _TMPTR0,#MON_TIMEL     ;load _TeMpory Timer Reg. 0 w/low byte time out value
0046 0164      179           AJMP    INITIALIZE
0048           180   TLK_ADJ:
0048 75270B    181           MOV     _TMPTR1,#TLK_TIMEH     ;load _TeMpory Timer Reg. 1 w/high byte time out value, 5 min. t
                                                             ime-out
004B 7526B8    182           MOV     _TMPTR0,#TLK_TIMEL     ;load _TeMpory Timer Reg. 0 w/low byte time out value
004E 719D      183           ACALL   LPI_ADJ                ;adjust loop current, test unit status w/battery charge circuit 0050 206F0B    184           JB      LINE_FLG,LN_LOAD       ;if on line & TaLK mode reload Last Number for REDIAL routine
0053 752701    185           MOV     _TMPTR1,#MON_TIMEH     ;load _TeMpory Timer Reg. 1 w/high byte time out value, 45 sec.
                                                             time-out
0056 7526C2    186           MOV     _TMPTR0,#MON_TIMEL     ;load _TeMpory Timer Reg. 0 w/low byte time out value
0059 306D08    187           JNB     CMOD_FLG,INITIALIZE    ;if TaLK/MONitor mode change then turn unit off
005C           188   TURN_OFF:
005C 81D6      189           AJMP    ON_HOOK                ;go off line, BREAK condition; if MONitor mode selected & Power
                                                             Down
005E           190   LN_LOAD:
005E D270      191           SETB    TLK_FLG                ;unit on line in TaLK mode
0060 748E      192           MOV     A,#LN_REDIAL           ;Last Number REDIAL storeage location
0062 91C3      193           ACALL   RECALL_LOC             ;restore Last Number dialed from ram LOCation #LN_REDIAL -> _I2C
                                                             BUFfer
0064           194   INITIALIZE:
0064 E4        195           CLR     A
0065 F523      196           MOV     _TIMERL,A              ;clear time out timers high & low
0067 F524      197           MOV     _TIMERH,A              ;
0069 F529      198           MOV     _KEYCNT,A              ;clear KEY CouNTer
006B F528      199           MOV     _KEYPTR,A              ;clear _KEY PointeR, used in PULSE_DIAL routine
006D F52A      200           MOV     _PULCNT,A              ;clear _PULse CouNTer, used in PULSE_DIAL routine
006F F52B      201           MOV     _DIGCNT,A              ;clear pulse dial _DIGit CouNTer, used in PULSE_DIAL routine
0071           202   SCAN_AGAIN:
0071 D1F7      203           ACALL   KEY_SCAN               ;scan keyboard for new key returned in ACC
0073 B4FF21    204           CJNE    A,#NO_KEY,DECODE_KEYS  ;test if key received, if so decode key
0076 D19F      205           ACALL   READ_SWITCH            ;interrogate switch settings & update flags, updates MODE_FLG &
                                                             DIAL_FLG
0078 206DA1    206           JB      CMOD_FLG,MODE_CHANGE   ;if TaLK/MONitor mode changes restart by software reset
007B 20720C    207           JB      PULS_FLG,IDLE_MODE     ;skip to IDLE if out-pulsing in process
007E 306805    208           JNB     MODE_FLG,TALK_MODE     ;stay active if TaLK mode
0081 206B02    209           JB      SPKR_FLG,TALK_MODE     ;stay active if in MONitor mode w/SPeaKeR on
0084 81D6      210           AJMP    ON_HOOK                ;go off line, BREAK condition, if MONitor mode selected & Power
                                                             Down
0086           211   TALK_MODE:
0086 7136      212           ACALL   TIME_OUT               ;check if _TIMERX is equal to _TMPTRX, if so turn unit off, else
                                                             return
0088 7163      213           ACALL   SYS_STAT               ;test loop current & battery status
               214   ;       JBC     TEST_FLG,SCAN_AGAIN    ;if tests were performed skip idle
008A           215   IDLE_MODE:
               216   IF (EMULATE)
               217           JNB     TF,$                   ;emulator simulation of Idle mode
               218   ELSE
008A 306B05    219           JNB     SPKR_FLG,IDLE_SPKR     ;if SPeaKeR off put processor in Idle Mode
               220   ;       JNB     MODE_FLG,IDLE_SPKR     ;jump if MONitor mode selected
008D 308DFD    221           JNB     TF,$                   ;emulator simulation of Idle mode
0090 0171      222           AJMP    SCAN_AGAIN
0092           223   IDLE_SPKR:
0092 758701    224           MOV     PCON,#IDL              ;put processor in Idle Mode, reactivated by timer overflow, 10 o
                                                             r 100 msec.
               225   ENDIF
0095 0171      226           AJMP    SCAN_AGAIN             ;no key received, scan keyboard again
0097           227   DECODE_KEYS:
0097 307207    228           JNB     PULS_FLG,NORM_DECODE   ;jump if no PULSe FLaG, dial pulsing not in progress
009A B40B00    229           CJNE    A,#PND_KEY,PND_GE      ;return w/out out-pulsing key if '#' or 'PAUSE'
009D 50D2      230   PND_GE: JNC     SCAN_AGAIN             ;scan for next key if '#',RECALL,STORE or FNCTN pressed
009F 01C6      231   PND_LT: AJMP    SAVE_KEY               ;store & out-pulse if key 0-9 is received
00A1           232   NORM_DECODE:
00A1 C276      233           CLR     TIME_FLG               ;clear speaker TIME-out FLaG
00A3 752300    234           MOV     _TIMERL,#0             ;clear time out timers high & low
00A6 752400    235           MOV     _TIMERH,#0
00A9 B40D04    236           CJNE    A,#RECALL_KEY,TST_FNCTN ;continue testing for keys other than 0-9
```

```
OOAC D26C       237          SETB    RS_FLG                  ;set when RECALL mode selected
OOAE 41E9       238          AJMP    RECALL_STORE            ;jump to recall telephone number routine if RECALL key pressed
00B0            239   TST_FNCTN:
00B0 B40F02     240          CJNE    A,#FNCTN_KEY,TST_STORE  ;continue testing for keys other than 0-9
00B3 212B       241          AJMP    FNCTN                   ;jump to function routoine if FNCTN key pressed
00B5            242   TST_STORE:
00B5 B40E04     243          CJNE    A,#STORE_KEY,DIAL_TP    ;jump if key is 0-9
00B8 C26C       244          CLR     RS_FLG                  ;cleared when STORE mode selected
00BA 41E9       245          AJMP    RECALL_STORE            ;jump to store telephone number routine if STORE key pressed
00BC            246   DIAL_TP:
00BC 2068B2     247          JB      MODE_FLG,SCAN_AGAIN     ;if in MONitor mode do not generate Tone or Pulse
00BF B40B04     248          CJNE    A,#PND_KEY,SAVE_KEY     ;compare key w/'#', jmup if '#' & don't save
00C2 F51F       249          MOV     _TMPR0,A                ;save '#' key
00C4 01F4       250          AJMP    DIAL_KEY                ;generate '#' key in DTMF but do not save in _I2CBUF
00C6            251   SAVE_KEY:
00C6 C2AF       252          CLR     EA                      ;disable interrupts during when storing key in _I2CBUFfer
00C8 F51F       253          MOV     _TMPR0,A                ;save new key
00CA D17C       254          ACALL   SHIFT_BUF               ;shift keys right one position
00CC 7932       255          MOV     R1,#_I2CBUF+1           ;load buffer pointer w/buffer starting address
00CE C4         256          SWAP    A                       ;move new key to MSN
00CF D7         257          XCHD    A,@R1                   ;load last key into LSN
00D0 C529       258          XCH     A,_KEYCNT               ;swap ACC w/ KEYCouNter
00D2 7006       259          JNZ     NOT_FIRST_KEY           ;test if first key entered, if so then add EOF
00D4 C529       260          XCH     A,_KEYCNT               ;swap ACC w/ KEYCouNter
00D6 440F       261          ORL     A,#NOT_EOF              ;add EOF to key, MSN contains N key & LSN contains End Of File c
                                                              ode (XFH)
00D8 01DC       262          AJMP    FIRST_KEY
00DA            263   NOT_FIRST_KEY:
00DA C529       264          XCH     A,_KEYCNT               ;swap ACC w/ KEYCouNter
00DC            265   FIRST_KEY:
00DC F7         266          MOV     @R1,A                   ;store new key & last key into buffer
00DD 207204     267          JB      PULS_FLG,NO_STORE       ;jump if no PULSe_FLaG, can not use I2C bus during out-pulsing
00E0 748E       268          MOV     A,#LN_REDIAL            ;Last Number REDIAL storeage location
00E2 91B8       269          ACALL   STORE_LOC               ;store last number dialed from _I2CBUF -> ram
00E4            270   NO_STORE:
00E4 0529       271          INC     _KEYCNT                 ;inc. buffer key counter
00E6 0528       272          INC     _KEYPTR                 ;inc. pulse dial out-pulse key counter
00E8 D2AF       273          SETB    EA                      ;enable timer interrupt
00EA E529       274          MOV     A,_KEYCNT               ;load ACC w/ KEY CouNTer
00EC B41B05     275          CJNE    A,#MAX_KEYS,DIAL_KEY    ;test if max. number of keys have been entered
00EF E4         276          CLR     A                       ;if _KEYCouNTer = MAX. KEYS, then clear _KEY CouNTer
00F0 F529       277          MOV     _KEYCNT,A               ;clear _KEY CouNTer
00F2 F528       278          MOV     _KEYPTR,A               ;clear _KEY PoinTeR, used in PULSE_DIAL routine
00F4            279   DIAL_KEY:
00F4 30701E     280          JNB     TLK_FLG,DEBOUNCE_KEY    ;jump if TaLK mode off line, off line STORE routine
00F7 306915     281          JNB     DIAL_FLG,TONE_DIAL      ;jump if TONE mode selected DIAL_FLG (TONE=0, PULSE=1)
00FA 207218     282          JB      PULS_FLG,DEBOUNCE_KEY   ;jump if PULSe dialing in process
00FD D272       283          SETB    PULS_FLG                ; 0 = no manual PULSe dialing in process, 1 = manual PULSe diali
                                                              ng in process
00FF 919D       284          ACALL   MUTE_ON                 ;mute talk circuit & speaker
0101 758AD6     285          MOV     TL,#TIMS_LOW            ;interuppt time is 1msec., load low byte into timer reload reg.
0104 758CFE     286          MOV     TH,#TIMS_HGH            ;load high byte ' '
0107 758BD6     287          MOV     RTL,#TIMS_LOW           ;interuppt time is 1msec. when out-pulse routine is in progress
010A 758DFE     288          MOV     RTH,#TIMS_HGH           ;load high byte ' '
010D 2115       289          AJMP    DEBOUNCE_KEY
010F            290   TONE_DIAL:
010F 919D       291          ACALL   MUTE_ON                 ;mute talk circuit & speaker
0111            292   STORE_DIAL:
0111 E51F       293          MOV     A,_TMPR0                ;restore new key for output
0113 D138       294          ACALL   TONE_WRITE              ;ACC = key, select DTMF tone pair ON
0115            295   DEBOUNCE_KEY:
                296   IF (EMULATE)
                297          JNB     TF,$                    ;emulator simulation of Idle mode
                298   ELSE
0115 758701     299          MOV     PCON,#IDL               ;put processor in Idle Mode, reactivated by timer overflow, 10 o
                                                              r 100 msec.
                300   ENDIF
0118            301   PULS_DEBOUNCE:
0118 D1F7       302          ACALL   KEY_SCAN                ;scan keyboard for key released
```

```
011A B4FFF8    303         CJNE    A,#NO_KEY,DEBOUNCE_KEY   ;jump if same key still pressed, else scan for new key
011D 307009    304         JNB     TLK_FLG,PULSE_SEL        ;jump if TaLK mode off line, off line STORE routine
0120 206906    305         JB      DIAL_FLG,PULSE_SEL       ;jump if pulse dial mode & scan for a new key
0123 740D      306         MOV     A,#TONE_OFF              ;key has been released, load code to disable DTMF tone
0125 D138      307         ACALL   TONE_WRITE               ;disable DTMF tone pair
0127 91AA      308         ACALL   MUTE_OFF                 ;disable mute
0129           309    PULSE_SEL:
0129 0171      310         AJMP    SCAN_AGAIN               ;scan for new key
               311    ;
               312    ; Function Key Decode Routines
012B           313    FNCTN:
012B B1F2      314         ACALL   DEBOUNCE                 ;debounce FNCTN key
012D B4FF13    315         CJNE    A,#NO_KEY,DECODE_FNCTN   ;jump if new key pressed
0130           316    SCAN_FNCTN:
0130 D1F7      317         ACALL   KEY_SCAN                 ;scan keyboard for FNCTN # key returned in ACC
0132 B4FF0E    318         CJNE    A,#NO_KEY,DECODE_FNCTN   ;test if key received, if so decode key
0135 7136      319         ACALL   TIME_OUT                 ;check if TIMERX is equal to _TMPTRX, if so turn unit off, else return
0137 7163      320         ACALL   SYS_STAT                 ;test loop current & battery status
0139 306D02    321         JNB     CMOD_FLG,FNCTN_MOD       ;check if TaLK/MONitor mode change
013C 011C      322         AJMP    MODE_CHANGE              ;jump if mode changed, else remain in FNCTN loop routine
013E           323    FNCTN_MOD:
               324         IF (EMULATE)
               325         JNB     TF,$                     ;emulator simulation of Idle mode
               326         ELSE
013E 758701    327         MOV     PCON,#IDL                ;put processor in Idle Mode, reactivated by timer overflow, 100 msec.
               328         ENDIF
0141 2130      329         AJMP    SCAN_FNCTN               ;no key received, scan keyboard again
0143           330    DECODE_FNCTN:
0143 B1F2      331         ACALL   DEBOUNCE                 ;debounce function # key
0145 B4FF02    332         CJNE    A,#NO_KEY,INVALID_FN     ;jump if new key pressed
0148 214C      333         AJMP    FNCTN_NUM
014A           334    INVALID_FN:
014A 0171      335         AJMP    SCAN_AGAIN
014C           336    FNCTN_NUM:
014C E51F      337         MOV     A,_TMPR0                 ;restore function # key
014E 206806    338         JB      MODE_FLG,FNCTN_DECODE    ;jump if MONitor mode selected & decode FNCTN # key
0151 206F03    339         JB      LINE_FLG,FNCTN_DECODE    ;if in TaLK then decode FNCTN # key
0154 B408F3    340         CJNE    A,#8,INVALID_FN          ;PAUSE is the only valid FNCTN when off-line in TaLK mode
0157           341    FNCTN_DECODE:
0157 90015C    342         MOV     DPTR,#JMP_FNCTN          ;load DPTR w/starting address of jump table
015A 23        343         RL      A                        ;multiply ACC by 2, for proper jump offset
015B 73        344         JMP     @A+DPTR
015C           345    JMP_FNCTN:
015C 217C      346         AJMP    VERSION                  ;software version number
015E 2180      347         AJMP    POLRTY                   ;POLaRiTY indication leds
0160 417E      348         AJMP    REDIAL                   ;last number redial
0162 2197      349         AJMP    LEVEL3                   ;speaker level 3
0164 413A      350         AJMP    FLASH                    ;go from MAKE to BREAK for 220 msec. then to MAKE
0166 21D5      351         AJMP    LINAMP                   ;report LINe (AMPeres) current
0168 219B      352         AJMP    LEVEL2                   ;speaker level 2
016A 4104      353         AJMP    BATVLT                   ;report internal BATtery VoLTage
016C 4155      354         AJMP    PAUSE                    ;place a 4 sec. pause in buffer
016E 219F      355         AJMP    LEVEL1                   ;speaker level 1
0170 4114      356         AJMP    RECHRGBAT                ;REChaRGe BATtery routine
0172 4178      357         AJMP    SPKROFF                  ;speaker off
0174 0171      358         AJMP    SCAN_AGAIN               ;
0176 0171      359         AJMP    SCAN_AGAIN               ;RECALL key, CHaRGer STATus, on = green LED & off = red LED
0178 0171      360         AJMP    SCAN_AGAIN               ;STORE key
017A 212B      361         AJMP    FNCTN                    ;FNCTN key
               362    ;
               363    ; Software Version Number
017C           364    VERSION:
017C 7418      365         MOV     A,#SOFT_VER              ;load ACC w/ SOFTware VERsion number
017E 41E0      366         AJMP    DISPLAY
               367    ;
               368    ; Polarity Indication, Green for Normal & Red for Reversed
0010           369    RED         EQU     10H              ;blink the red LED once for one second
0001           370    GREEN       EQU     01H              ;blink the green LED once for one second
0005           371    THRSH_POL   EQU     05               ;reverse POLarity voltage THReSHold value < .5 volts
               372    ;
```

```
0180              373  POLRTY:
0180 7440         374         MOV     A,#40H+LIN_SEN      ;select DA active & channel 0 AD, telco LINe SENse
0182 D11F         375         ACALL   DA_WRITE            ;write analog value stored in _DAVALUE to DA converter
0184 7405         376         MOV     A,#5                ;analog settling time in milliseconds
0186 B18F         377         ACALL   TIMER_MSEC          ;delay routine in milliseconds
0188 D103         378         ACALL   AD_READ             ;read analog line voltage
018A B40500       379         CJNE    A,#THRSH_POL,POL_GE ;next two instructions test if ACC >= POLarity_THReSHold
018D 5004         380  POL_GE: JNC    POL_NORM            ;
018F 7410         381  POL_LT: MOV    A,#RED              ;ACC < THReSHold_POLarity, blink red LED for one second, reverse
                                                                 polarity
0191 2195         382         AJMP    POL_REV
0193              383  POL_NORM:
0193 7401         384         MOV     A,#GREEN            ;ACC >= THReSHold_POLarity blink red LED for one second, normal
                                                                 polarity
0195              385  POL_REV:
0195 41E0         386         AJMP    DISPLAY
                  387  ;
                  388  ; Enable Speaker & Set Volume Level
0197              389  LEVEL3:
0197 7402         390         MOV     A,#2                ;highest level in TaLK mode 'LEVL 3'
0199 21A0         391         AJMP    LEVEL
019B              392  LEVEL2:
019B 7401         393         MOV     A,#1                ;mid level in TaLK mode 'LEVL 2'
019D 21A0         394         AJMP    LEVEL
019F              395  LEVEL1:
019F E4           396         CLR     A                   ;lowest level in either TaLK/MONitor mode 'LEVL 1'
01A0              397  LEVEL:
01A0 75270B       398         MOV     _TMPTR1,#TLK_TIMEH  ;load _TeMpory Timer Reg. 1 w/high byte time out value, 5 min. t
                                                                 ime-out
01A3 7526B8       399         MOV     _TMPTR0,#TLK_TIMEL  ;load _TeMpory Timer Reg. 0 w/low byte time out value
01A6 F52C         400         MOV     _SPKRLVL,A          ;save speaker level
01A8 7402         401         MOV     A,#BAT_SEN          ;select DA active & channel 2 AD, BATtery SENse
01AA 91DF         402         ACALL   READ_VOLTAGE        ;read voltage on BATtery
01AC B44400       403         CJNE    A,#THRSH_BAT,LVL_LE ;test if analog value in ACC <= THReSHold on BATtery
01AF 401C         404  LVL_LE: JC     LEVEL_LOW_BAT       ;battery must have >= 4.6 volts or the speaker is not enabled
01B1 E52C         405  LVL_GT: MOV    A,_SPKRLVL          ;restore key selecting desired level
01B3 306801       406         JNB     MODE_FLG,TALK_LEVEL ;test if TaLK or MONitor mode
01B6 04           407         INC     A                   ;select levels 2,3 or 4 if MONitor, or 1,2 or 3 if TaLK
01B7              408  TALK_LEVEL:
01B7 F52C         409         MOV     _SPKRLVL,A          ;save speaker level
01B9 439003       410         ORL     P1,#MIN_LVL         ;select min. level
01BC 6290         411         XRL     P1,A                ;exclusive or ACC w/P1 (P1.0 & P1.1 will be the only bits change
                                                                 d)
01BE C282         412         CLR     SPKR_CNTRL          ;turn speaker on
01C0 D26B         413         SETB    SPKR_FLG            ;set SPeaKeR FLaG
01C2 7402         414         MOV     A,#BAT_SEN          ;select DA active & channel 2 AD, BATtery SENse
01C4 91DF         415         ACALL   READ_VOLTAGE        ;read voltage of the BATtery
01C6 B44400       416         CJNE    A,#THRSH_BAT,SPK_LE ;test if analog value in ACC <= THReSHold on BATtery
01C9 4002         417  SPK_LE: JC     LEVEL_LOW_BAT       ;battery must have > 4.5 volts or the speaker is not enabled
01CB 0171         418  SPK_GT: AJMP   SCAN_AGAIN
01CD              419  LEVEL_LOW_BAT:
01CD D282         420         SETB    SPKR_CNTRL          ;turn speaker OFF
01CF C26B         421         CLR     SPKR_FLG            ;clear SPeaKeR FLaG
01D1 7410         422         MOV     A,#RED              ;ACC < CHaRGe THReSHold, blink red LED for one second, BATtery l
                                                                 ow voltage
01D3 41E0         423         AJMP    DISPLAY
                  424  ;
                  425  ; CHaRGer STATus on or off line
                  426  ;CHRGSTAT:
                  427  ;       MOV     A,#GREEN            ;blink green LED for 1/2 second, charger on line
                  428  ;       JB      CHRG_FLG,CHRGS_BLNK ;test CHaRGer FLaG
                  429  ;       SWAP    A                   ;blink red LED for 1/2 second, charger off line
                  430  ;CHRGS_BLNK:
                  431  ;       AJMP    DISPLAY
                  432  ;
                  433  ; Report Line (Amperes) Current
01D5              434  LINAMP:
01D5 20681C       435         JB      MODE_FLG,MON_LINVLT ;jump if MONitor mode selected to report LINe VoLTage
01D8 7403         436         MOV     A,#LPI_SEN          ;select line current reading
01DA 91DF         437         ACALL   READ_VOLTAGE        ;read line current
                  438  ; (2.499 - X.XXX) / 10 = loop current
```

```
01DC 781F       439             MOV     R0,#_TMPR0
01DE F6         440             MOV     @R0,A              ;save ones & tenths digits
01DF 7499       441             MOV     A,#99H             ;load ACC w/99, (99 - XX)
01E1 95F0       442             SUBB    A,B                ;
01E3 D4         443             DA      A                  ;adjust if half carry set for BCD
01E4 C4         444             SWAP    A
01E5 C6         445             XCH     A,@R0
01E6 F5F0       446             MOV     B,A                ;load B w/ones & tenths digits
01E8 742E       447             MOV     A,#2EH             ;load ACC w/24, (2.4 - X.X)
01EA 95F0       448             SUBB    A,B
01EC D4         449             DA      A                  ;decimal adjust ACC
01ED C4         450             SWAP    A
01EE D6         451             XCHD    A,@R0
01EF 2401       452             ADD     A,#01H
01F1 D4         453             DA      A
01F2 41E0       454             AJMP    DISPLAY
                455     ;
                456     ; Report Line Voltage in MONitor mode only (must have proper polarity for valid voltage reading)
01F4            457     MON_LINVLT:
01F4 7400       458             MOV     A,#LIN_SEN         ;select line voltage reading
01F6 91DF       459             ACALL   READ_VOLTAGE       ;read line voltage
                460     ; if LINe voltage = 94.7 then ACC = 94 & B = 70
01F8 C5F0       461             XCH     A,B                ;load ACC = 70, B = 94
01FA 2450       462             ADD     A,#50H             ;round to nearest ones, 0.9V
01FC D4         463             DA      A                  ;adjust if half carry set for BCD
                464     ; ACC = 70 + 50 = 20 + CY (0.7 + 0.5 = 1.2 volts)
01FD C5F0       465             XCH     A,B                ;load ACC = 94, B = 60
01FF 3401       466             ADDC    A,#01H             ;add CY to tens digit, ACC = 94 + CY
0201 D4         467             DA      A                  ;decimal adjust ACC
0202 41E0       468             AJMP    DISPLAY
                469     ;
                470     ; Report Internal Battery Voltage
0204            471     BATVLT:
0204 7402       472             MOV     A,#BAT_SEN         ;select battery voltage reading
0206 91DF       473             ACALL   READ_VOLTAGE       ;read battery voltage
                474     ; if BATtery voltage = 4.676 then ACC = 46 & B = 76
0208 C5F0       475             XCH     A,B                ;load ACC = 76, B = 46
020A 2450       476             ADD     A,#50H             ;round to nearest tenths = 0.50
020C D4         477             DA      A                  ;adjust if half carry set for BCD
                478     ; B = 76 + 50 = 26 + CY
020D C5F0       479             XCH     A,B                ;load ACC = 46, B = 26
020F 3401       480             ADDC    A,#01H             ;add CY to tenths digit, ACC = 46 + 1 + CY, (0.1 volts accounts
                                                           ;   for drop accross Q16)
0211 D4         481             DA      A                  ;decimal adjust ACC
0212 41E0       482             AJMP    DISPLAY
                483     ;
                484     ; REChaRGe BATtery when on line in TaLK mode
0058            485     THRSH_CHRG      EQU     58H        ;THReSHold of a fully CHaRGed battery is 5.8 volts
                486     ;
0214            487     RECHRGBAT:
0214 20683C     488             JB      MODE_FLG,FLASH_RET ;jump if MONitor mode, no recharge
0217 D282       489             SETB    SPKR_CNTRL         ;turn speaker OFF
0219 C26B       490             CLR     SPKR_FLG           ;clear SPeaKeR FLaG
021B            491     BAT_STAT:
021B 719D       492             ACALL   LPI_ADJ            ;make sure sufficent current to charge battery
021D 307133     493             JNB     CHRG_FLG,FLASH_RET ;jump if CHaRGe FLaG not set, terminate recharge routine
0220 7402       494             MOV     A,#BAT_SEN         ;select DA active & channel 2 AD, BATtery SENse
0222 91DF       495             ACALL   READ_VOLTAGE       ;read voltage of the BATtery
0224 B45800     496             CJNE    A,#THRSH_CHRG,BB_GE ;test if analog value in ACC >= THReSHold of BATtery
0227 5004       497     BB_GE:  JNC     FULL_CHRG          ;battery must have >= 5.8 volts or it is not FULLy CHaRGed
0229 7410       498     BB_LT:  MOV     A,#RED             ;ACC < CHaRGe THReSHold, blink red LED for one second, BATtery low voltage
022B 412F       499             AJMP    MORE_CHRG
022D            500     FULL_CHRG:
022D 7401       501             MOV     A,#GREEN           ;ACC >= CHaRGe THReSHold, blink green LED for one second
022F            502     MORE_CHRG:
022F B14C       503             ACALL   BLINK_LED          ;value in MSN of ACC blinks red, LSN blinks green
0231 7404       504             MOV     A,#4               ;delay seconds = ACC * .5 sec.
0233 B181       505             ACALL   TIMER_SEC          ;delay for 2 sec. between LED blinks
0235 306DE3     506             JNB     CMOD_FLG,BAT_STAT  ;check if TaLK/MONitor mode change
0238            507     RECHRG_RET:
0238 011C       508             AJMP    MODE_CHANGE
```

```
                509  ;
                510  ; Go from MAKE to BREAK for 220 msec. then back to MAKE condition
00DC            511  FLASH_TIME      EQU     220             ;220 msec. of BREAK time
                512  ;
023A            513  FLASH:
023A E4         514          CLR     A
023B F528       515          MOV     _KEYPTR,A               ;clear _KEY PoinTeR
023D F529       516          MOV     _KEYCNT,A               ;clear _KEYCouNTer
023F 7532F0     517          MOV     _I2CBUF+1,#EOF          ;clear _I2CBUFfer by storing an End Of File in first digit locat
                                                              ion
0241 C294       518          CLR     CHRG_CNTRL              ;disable charge circuit
0244 71FE       519          ACALL   BREAK_CKT               ;disable primary hold circuit
0246 74DC       520          MOV     A,#FLASH_TIME           ;duration BREAK
0248 B18F       521          ACALL   TIMER_MSEC              ;delay routine in milliseconds
024A 71F2       522          ACALL   MAKE_CKT                ;enable primary hold circuit
024C 307104     523          JNB     CHRG_FLG,FLASH_RET      ;re-enable CHaRGe circuit after FLASH
024F D294       524          SETB    CHRG_CNTRL              ;enable CHaRGe circuit
0251 71FE       525          ACALL   BREAK_CKT               ;disable primary hold circuit
0253            526  FLASH_RET:
0253 0171       527          AJMP    SCAN_AGAIN
                528  ;
                529  ; Insert a 4 Second Pause or Increment Pause in Buffer
00E0            530  MAX_PSE         EQU     0E0H            ;MSN contains max. delay (PSE-E=16 sec.)
                531  ;
0255            532  PAUSE:
0255 206815     533          JB      MODE_FLG,PAUSE_RET      ;PAUSE in TaLK mode only
0258 7832       534          MOV     R0,#_I2CBUF+1           ;load pointer w/starting loc. of buffer
025A E6         535          MOV     A,@R0                   ;load N & N-1 keys from buffer
025B B4B000     536          CJNE    A,#PSE_KEY,IPS_GE       ;test if key is = 'PSE', PSE-B=4 sec., ACC >= PauSE_KEY or End O
                                                              f File code
025E 500F       537  IPS_GE: JNC     INC_PSE                 ;inc. PauSE in buffer to next 4 second delay
0260            538  PSI_LT:                                 ;ACC < PauSE_KEY, shift buffer & include pause
0260            539  SAVE_PSE:
0260 740B       540          MOV     A,#PSE                  ;load ACC w/pause
0262 D17C       541          ACALL   SHIFT_BUF               ;shift keys right one nibble position, making N into N-1 key
0264 0529       542          INC     _KEYCNT                 ;inc. buffer key counter
0266 C4         543          SWAP    A                       ;move pause key to upper nibble
0267 D6         544          XCHD    A,@R0                   ;load N-1 key into lower nibble
0268            545  STORE_PSE:
0268 F6         546          MOV     @R0,A                   ;store pause key & N-1 key into buffer
0269 748E       547          MOV     A,#LN_REDIAL            ;Last Number REDIAL storage location
026B 91B8       548          ACALL   STORE_LOC               ;store last number dialed from _I2CBUF -> ram
026D            549  PAUSE_RET:
026D 0171       550          AJMP    SCAN_AGAIN
026F            551  INC_PSE:
026F B4E000     552          CJNE    A,#MAX_PSE,MPS_GE       ;next two instructions test if ACC >= MAX. PauSE or End Of File
0272 50F9       553  MPS_GE: JNC     PAUSE_RET               ;MAX. PauSE or EOF, so do nothing
0274            554  MPS_LT:                                 ;ACC < MAX. PauSE, so inc. PauSE
0274 2410       555          ADD     A,#10H                  ;inc. PauSE in MSN of ACC
0276 4168       556          AJMP    STORE_PSE               ;restore increased PauSE time & N-1 key
                557  ;
                558  ; Disable Speaker & Set Minimum Level
0003            559  MIN_LVL         EQU     3               ;minimum level value
                560  ;
0278            561  SPKROFF:
0278 D282       562          SETB    SPKR_CNTRL              ;turn SPeaKeR off
027A C26B       563          CLR     SPKR_FLG                ;clear SPeaKeR FLaG
027C 0171       564          AJMP    SCAN_AGAIN
                565  ;
                566  ; Dial Number in I2C Buffer
00B0            567  PSE_KEY         EQU     0B0H            ;represents PAUSE key 'B'
00F0            568  EOF_CODE        EQU     0F0H            ;represents EOF & '*'
0002            569  EVEN            EQU     2
0064            570  SPKR_DELAY      EQU     100             ;SPeaKeR delay 100 msec.
                571  ;
027E            572  REDIAL:
027E 20685D     573          JB      MODE_FLG,SPKR_REDL      ;jump if MONitor mode selected, REDIAL in TaLK mode only
0281 919D       574          ACALL   MUTE_ON                 ;mute talk circuit & speaker
0283 7832       575          MOV     R0,#_I2CBUF+1           ;load pointer w/starting loc. of buffer
0285            576  TST_EOF:
```

```
0285 7A02      577         MOV     R2,#2                   ;represents two keys BCD digits/byte
0287 E6        578         MOV     A,@R0                   ;load ACC w/N key in Most Significat Nibble (MSN) & N-1 key in L
                                                            SN
0288           579  TST_KEY:
0288 B4F000    580         CJNE    A,#EOF_CODE,EOF_GE      ;next two instructions test if ACC >= End Of File
028B 5009      581  EOF_GE: JNC    EOF_POS                 ;
028D           582  EOF_LT:
028D C4        583         SWAP    A                       ;ACC < End Of File, move N-1 key into MSN of ACC, prepare for ou
                                                            tput
028E DAF8      584         DJNZ    R2,TST_KEY              ;output N-1 key, from Least Significant Nibble
0290 08        585         INC     R0                      ;move buffer pointer to next byte in buffer
0291 B840F1    586         CJNE    R0,#I2CBUF_END,TST_EOF  ;test if end of _I2CBUF (40H)
0294 41CE      587         AJMP    REDIAL_RET              ;return w/ no redial
0296           588  EOF_POS:
0296 BA0202    589         CJNE    R2,#EVEN,LSN_KEY        ;if odd then output MSN
0299 41AF      590         AJMP    ODD_KEY
029B           591  LSN_KEY:
029B 7A02      592         MOV     R2,#2                   ;represents two keys/byte in buffer
029D E6        593         MOV     A,@R0                   ;load ACC w/N-1 key in Most Significat Nibble (MSN) & N key in L
                                                            SN
029E C4        594         SWAP    A
029F           595  MSN_KEY:
029F B4B000    596         CJNE    A,#PSE_KEY,PSE_GE       ;test if key is = 'PSE', PSE-B=4 sec., ACC >= PauSE_KEY or End O
                                                            f File code
02A2 5011      597  PSE_GE: JNC    PAUSE_KEY               ;
02A4           598  PSE_LT:                                ;ACC < PauSE KEY
02A4 C4        599         SWAP    A                       ;move N key into LSN of ACC
02A5 540F      600         ANL     A,#0FH                  ;strip off N-1 key
02A7 910A      601         ACALL   DIAL                    ;dial the number in ACC w/either pulse or tone
02A9 206D22    602         JB      CMOD_FLG,REDIAL_RET     ;check if TaLK/MONitor mode change
02AC           603  EVEN_KEY:
02AC E6        604         MOV     A,@R0                   ;load N & N-1 keys from buffer, again
02AD DAF0      605         DJNZ    R2,MSN_KEY              ;output N-1 key, from Least Significant Nibble
02AF           606  ODD_KEY:
02AF 18        607         DEC     R0                      ;move buffer pointer to next byte in buffer
02B0 B831E8    608         CJNE    R0,#_I2CBUF,LSN_KEY     ;test if beginning of buffer
02B3 41CE      609         AJMP    REDIAL_RET              ;done dialing if at beginning of buffer _I2CBUF
02B5           610  PAUSE_KEY:
02B5 B4F000    611         CJNE    A,#EOF_CODE,EOP_GE      ;next two instructions test if ACC >= End Of File
02B8 500F      612  EOP_GE: JNC    EVEN_ODD                ;
02BA           613  EOP_LT:
02BA C3        614         CLR     C                       ;ACC < End Of File, execute PauSE
02BB C4        615         SWAP    A                       ;move PAUSE key into lower nibble of ACC
02BC 540F      616         ANL     A,#0FH                  ;strip off N-1 key
02BE 940A      617         SUBB    A,#0AH                  ;ACC = 1 (4 sec.), 2 (8 sec.), 3 (12 sec.),4 (16 sec.)
02C0 75F008    618         MOV     B,#8                    ;delay seconds = ACC * 8 * .5 sec.
02C3 A4        619         MUL     AB
02C4 B181      620         ACALL   TIMER_SEC               ;delay routine in 1/2 seconds
02C6 206D05    621         JB      CMOD_FLG,REDIAL_RET     ;check if TaLK/MONitor mode change
02C9           622  EVEN_ODD:
02C9 BA02E3    623         CJNE    R2,#EVEN,ODD_KEY        ;if odd then move to next buffer byte
02CC 41AC      624         AJMP    EVEN_KEY                ;output N key, from Most Significant Nibble
02CE           625  REDIAL_RET:
02CE 91AA      626         ACALL   MUTE_OFF                ;disable mute
02D0 306D02    627         JNB     CMOD_FLG,REDL_RET       ;check if TaLK/MONitor mode change
02D3 011C      628         AJMP    MODE_CHANGE
02D5           629  REDL_RET:
02D5 306B06    630         JNB     SPKR_FLG,SPKR_REDL      ;jump if SPeaKeR is off, leave SPeaKeR off
02D8 7464      631         MOV     A,#SPKR_DELAY           ;SPeaKeR delay, required to recharge capacitor C1 if _I2CBUF emp
                                                            ty
02DA B18F      632         ACALL   TIMER_MSEC              ;delay routine in milliseconds
02DC C282      633         CLR     SPKR_CNTRL              ;turn SPeaKeR back on
02DE           634  SPKR_REDL:
02DE 0171      635         AJMP    SCAN_AGAIN
               636  ;
               637  ; Display contents of ACC & return
02E0           638  DISPLAY:
02E0 B14C      639         ACALL   BLINK_LED               ;value in MSN of ACC blinks red, LSN blinks green
02E2 306D02    640         JNB     CMOD_FLG,DSPLY_RET      ;check if TaLK/MONitor switch changed
02E5 011C      641         AJMP    MODE_CHANGE             ;jump if mode changed, else remain in FNCTN loop routine
02E7           642  DSPLY_RET:
02E7 0171      643         AJMP    SCAN_AGAIN
```

```
                644    ;
                645    ; Recall or Store Routines
02E9            646    RECALL_STORE:
02E9 B1F2       647            ACALL   DEBOUNCE               ;debounce STORE key
02EB B4FF1C     648            CJNE    A,#NO_KEY,DECODE_RS    ;jump if new key pressed & decode
02EE 206825     649            JB      MODE_FLG,INVALID_RS    ;if in MONitor mode then RECALL & STORE are inoperative
02F1 A26C       650            MOV     C,RS_FLG               ;move Recall/Store FLaG to CY, 1 = Recall, 0 = Store
02F3 B070       651            ANL     C,/TLK_FLG             ;AND Recall/Store FLaG w/complement of TaLK FLaG, 1 = Recall, of
                                                                f-line TaLK mode
02F5 401F       652            JC      INVALID_RS             ;if in TaLK mode, off line then RECALL is inoperative
02F7            653    SCAN_RS:
02F7 D1F7       654            ACALL   KEY_SCAN               ;scan keyboard for memory loc. returned in ACC
02F9 B4FF0E     655            CJNE    A,#NO_KEY,DECODE_RS    ;test if key received, if so decode key
02FC 7136       656            ACALL   TIME_OUT               ;check if _TIMERX is equal to _TMPTRX, if so turn unit off, else
                                                                return
02FE 7163       657            ACALL   SYS_STAT               ;test loop current & battery status
0300 306D02     658            JNB     CMOD_FLG,RS_MOD        ;check if TaLK/MONitor mode change
0303 011C       659            AJMP    MODE_CHANGE            ;jump if mode changed, else remain in Recall/Store loop routine 0305            660    RS_MOD:
                661    IF (EMULATE)
                662            JNB     TF,$                   ;emulator simulation of Idle mode
                663    ELSE
0305 758701     664            MOV     PCON,#IDL              ;put processor in Idle Mode, reactivated by timer overflow, 10 o
                                                                r 100 msec.
                665    ENDIF
0308 41F7       666            AJMP    SCAN_RS                ;no key received, scan keyboard again
030A            667    DECODE_RS:
030A B1F2       668            ACALL   DEBOUNCE               ;debounce recall or store # key
030C B4FF07     669            CJNE    A,#NO_KEY,INVALID_RS   ;jump if new key pressed
030F E51F       670            MOV     A,_TMPRO               ;restore # key
0311 B40A00     671            CJNE    A,#10,SR_LE            ;next two instructions test if ACC <= 10, 0-9 are valid memory l
                                                                ocations
0314 4002       672    SR_LE:  JC      VALID_RS               ;
0316            673    SR_GT:                                 ;return if number is > 10 must be an invalid memory location, '*
                                                                ', '#', etc.
0316            674    INVALID_RS:
0316 0171       675            AJMP    SCAN_AGAIN
0318            676    VALID_RS:
0318 75F00E     677            MOV     B,#14                  ;number of bytes per telephone number (27 BCD digits + EOF)
031B A4         678            MUL     AB                     ;calculate starting address, (0 - 9) * 14 = starting address of
                                                                ram
031C           -679    RS_OFSET:
031C 206C0A     680            JB      RS_FLG,RECALL_NUMBER
031F            681    STORE_NUMBER:
031F 91B8       682            ACALL   STORE_LOC              ;STORE telco number from _I2CBUF into ram LOcation in ACC
0321 7532F0     683            MOV     _I2CBUF+1,#EOF         ;clear _I2CBUF by storing an End Of File in first digit location 0324 207005     684            JB      TLK_FLG,STORE_ON       ;if in TaLK mode & off line then turn unit off to minimize power 0327 81D6       685            AJMP    ON_HOOK
0329            686    RECALL_NUMBER:
0329 306806     687            JNB     MODE_FLG,RECALL_TLK    ;recall in TaLK mode only
032C            688    STORE_ON:
032C 748E       689            MOV     A,#LN_REDIAL           ;Last Number REDIAL storeage location
032E 91C3       690            ACALL   RECALL_LOC             ;restore Last Number dialed from ram LOCation #LN_REDIAL -> _I2C
                                                                BUFfer
0330 0171       691            AJMP    SCAN_AGAIN
0332            692    RECALL_TLK:
0332 91C3       693            ACALL   RECALL_LOC             ;RECALL telco number from ram LOCation stored in ACC
0334 417E       694            AJMP    REDIAL                 ;dial number contained in I2C buffer
                695    ;***********************
                696    ; Main: Program End     *
                697    ;***********************
                698    ;
                699    ;****************************************************************
                700    ;                    SUBROUTINES                                 *
                701    ;****************************************************************
                702    ;
                703    ;****************************************************************
                704    ; TIME_OUT - checks if system or speaker time-out exceeded       *
                705    ;****************************************************************
```

```
              706    ; Entry Parameters:                                                  :
              707    ;      none                                                          :
              708    ; Returned Value:                                                    :
              709    ;      ACC - altered                                                 :
              710    ;************************************************************************
0336          711    TIME_OUT:
0336 E524     712           MOV     A,TIMERH              ;load ACC w/timer high register
0338 B52727   713           CJNE    A,TMPTR1,TIME_OUT_RET ;continue operation if time not equal
033B E523     714           MOV     A,TIMERL              ;load ACC w/timer low register
033D B52622   715           CJNE    A,TMPTR0,TIME_OUT_RET ;continue operation if time not equal
0340 C4       716           CLR     A
0341 F523     717           MOV     TIMERL,A              ;clear time out timers high & low
0343 F524     718           MOV     TIMERH,A
0345 206F05   719           JB      LINE_FLG,SPKR_FNCTN   ;stay active if TaLK mode on line, else turn off
0348 206B02   720           JB      SPKR_FLG,SPKR_FNCTN   ;stay active if SPeaKeR on in MONitor mode
034B 81D6     721           AJMP    ON_HOOK               ;go off line, BREAK condition, if MONitor mode selected & Power
                                                                Down
034D          722    SPKR_FNCTN:
034D 306B12   723           JNB     SPKR_FLG,TIME_OUT_RET ;if SPeaKeR off skip speaker time-out warning
0350 D276     724           SETB    TIME_FLG              ;set TIME-out FLaG for speaker off time ( > 5 min.)
0352 C293     725           CLR     MUTE_CNTRL            ;mute talk circuit
0354 740E     726           MOV     A,#14                 ;load ACC w/DTMF key '0'
0356 D138     727           ACALL   TONE_WRITE            ;select DTMF tone pair ON
0358 7401     728           MOV     A,#1
035A B181     729           ACALL   TIMER_SEC             ;delay routine in 500 millisecond increments
035C 740C     730           MOV     A,#DTMF_OFF           ;duration has elapsed, load code to disable DTMF tone
035E D138     731           ACALL   TONE_WRITE            ;disable DTMF tone pair
0360 D293     732           SETB    MUTE_CNTRL            ;disable muting of talk circuit
0362          733    TIME_OUT_RET:
0362 22       734           RET
              735
              736    ;************************************************************************
              737    ; SYS_STAT - SYStem STATus, battery & charging current              *
              738    ;************************************************************************
              739.   ; Entry Parameters:                                                  :
              740    ;      none                                                          :
              741    ; Returned Value:                                                    :
              742    ;      ACC = altered                                                 :
              743    ;      Does not return if TaLK mode off line condition               *
              744    ;************************************************************************
0363          745    SYS_STAT:
              746    ;      CLR     TEST_FLG              ;assume no tests have been preformed
0363 E523     747           MOV     A,TIMERL              ;load ACC w/timer low register
0365 B4E320   748           CJNE    A,#BAT_TIME,LPI_STAT  ;test for battery status every 22.7 sec., otherwise check charge
                                                                r status
0368 307607   749           JNB     TIME_FLG,LOW_BAT_CHK  ;test if TIME-out FLaG indicating speaker time-out exceeded
036B D282     750           SETB    SPKR_CNTRL            ;turn speaker OFF
036D C26B     751           CLR     SPKR_FLG              ;clear SPeaKeR FLaG
036F 206872   752           JB      MODE_FLG,LPI_ON_HOOK  ;jump if MONitor mode & go on-hook
0372          753    LOW_BAT_CHK:
              754    ;      SETB    TEST_FLG              ;indicates that battery status test has been performed
0372 7402     755           MOV     A,#BAT_SEN            ;select DA active & channel 2 AD, BATtery SENse
0374 91DF     756           ACALL   READ_VOLTAGE          ;read voltage of the BATtery
0376 B44400   757           CJNE    A,#THRSH_BAT,ST_GE    ;test if analog value in ACC >= THReSHold of BATtery
0379 5076     758    ST_GE: JNC     STAT_RET              ;battery must have >= 4.4 volts or the speaker is disabled
037B 206866   759    ST_LT: JB      MODE_FLG,LPI_ON_HOOK  ;jump if MONitor mode & go on-hook
037E D282     760           SETB    SPKR_CNTRL            ;turn speaker OFF
0380 C26B     761           CLR     SPKR_FLG              ;clear SPeaKeR FLaG
0382 7410     762           MOV     A,#RED                ;ACC < CHaRGe THReSHold, blink red LED for one second, BATtery l
                                                                ow voltage
0384 B14C     763           ACALL   BLINK_LED             ;value in MSN of ACC blinks red LSN blinks green
0386 61F1     764           AJMP    STAT_RET
0388          765    LPI_STAT:
0388 206864   766           JB      MODE_FLG,STAT_CHK     ;skip loop current test if in MONitor mode, READ_SWITCH routine
                                                                sets or clears flag
038B 307061   767           JNB     TLK_FLG,STAT_CHK      ;skip loop current test if off line in TaLK mode, LPI_ADJ routin
                                                                e sets or clears flag
038E 541F     768           ANL     A,#1FH                ;mask off MSN of low byte timer
0390 B40E0C   769           CJNE    A,#SPK_TIME,SPKR_STAT ;test for SPeaKer on every 800 msec.
0393 306B02   770           JNB     SPKR_FLG,SPKR_STAT    ;jump if SPeaKeR is off, leave SPeaKeR off
0396 C282     771           CLR     SPKR_CNTRL            ;turn SPeaKeR back on
```

```
0398                    772  SPKR_STAT:
0398  5407              773           ANL     A,#07H                      ;mask off MSN of low byte timer
039A  B40754            774           CJNE    A,#LPI_TIME,STAT_RET        ;test for loop current every 800 msec.
                        775         ; SETB    TEST_FLG                    ;indicates that charge status has been checked
039D                    776  LPI_ADJ:
039D  7403              777           MOV     A,#LPI_SEN                  ;select DA active & channel 3 ., LooP I_SENse
039F  91DF              778           ACALL   READ_VOLTAGE                ;read voltage across 10 ohm resistor R52
03A1  207118            779           JB      CHRG_FLG,CHRG_STAT          ;jump if CHaRGe circuit is on, primary hold circuit is already i
                                                                           nactive (Q9 off)
03A4  B42202            780           CJNE    A,#22H,LN_NE                ;test if analog value in ACC <= CHaRGe THReSHold current (2.5V -
                                                                           2.2XXV) / 10 ohm = 2X mA.
03A7  61AD              781           AJMP,   LN_EQ                       ;ACC = 2.2 volts, so continue compare operation
03A9  4009               782  LN_NE:  JC      LN_LT                       ;ACC < 2.2 volts, sufficient loop current to charge battery, no
                                                                           need to continue compare
03AB  61D2              783           AJMP    LINE_CHK                    ;jump if ACC > 2.2 volts, test if still on active line, < 30 mA.
                                                                           insufficient charge current
03AD  C5F0              784  LN_EQ:   XCH     A,B                         ;exchange ACC w/reg B, load ACC w/hundredths & thousandths digit
                                                                           s
03AF  B4C000            785           CJNE    A,#00H,LN_NGE               ;test if analog value in ACC >= CHaRGe THReSHold voltage of 2.20
                                                                           0, i.e. <= 30 mA.
03B2  501C              786  LN_NGE:  JNC     LINE_CHK1                   ;leave charge circuit disabled & primary hold circuit on line, i
                                                                           nsufficient charge current
03B4  D271              787  LN_LT:   SETB    CHRG_FLG                    ;set CHaRGe circuit FLaG, indicates CHaRGe circuit is on
03B6  D294              788           SETB    CHRG_CNTRL                  ;enable secondary hold circuit, charge circuit is on
03B8  71FE              789           ACALL   BREAK_CKT                   ;disable primary hold circuit
03BA  61ED              790           AJMP    STAT_LINE
03BC                    791  CHRG_STAT:
03BC  B42207            792           CJNE    A,#22H,CHG_NE               ;test if value in ACC >= loop current to charge (2.500V - 2.2XXV
                                                                           ) / 10 ohm = 2X mA.
03BF  C5F0              793  CHG_EQ:  XCH     A,B                         ;exchange ACC w/reg B, load ACC w/hundredths & thousandths digit
                                                                           s
                        794         IF (R22 = 470)
                        795           CJNE    A,#30H,CHG_GE               ;test if value in ACC >= loop current to charge (2.500V - 2.230V
                                                                           ) / 10 ohm = 27 mA.
                        796         ELSE
03C1  B44500            797           CJNE    A,#45H,CHG_GE               ;test if value in ACC >= loop current to charge (2.500V - 2.245V
                                                                           ) / 10 ohm = 25.5 mA.
                        798         ENDIF
03C4  5002              799  CHG_GE:  JNC     CHG_GT                      ;insufficient loop current to continue charging, ACC >= 2.250V
03C6  4025              800  CHG_NE:  JC      STAT_LINE                   ;if ACC < 2.2V loop current OK, if ACC > 2.2V insufficient loop c
                                                                           urrent to charge
03C8  71F2              801  CHG_GT:  ACALL   MAKE_CKT                    ;enable primary hold circuit
03CA  C271              802           CLR     CHRG_FLG                    ;clear CHaRGe circuit FLaG, indicates CHaRGe circuit is off
03CC  C294              803           CLR     CHRG_CNTRL                  ;charge ckt. off
03CE  61ED              804           AJMP    STAT_LINE
03D0                    805  LINE_CHK1:
03D0  C5F0              806           XCH     A,B                         ;exchange ACC w/reg B, load ACC w/ones & tenths digits
03D2                    807  LINE_CHK:
03D2  C294              808           CLR     CHRG_CNTRL                  ;disable secondary hold circuit, charge circuit is off
03D4  B42402            809           CJNE    A,#24H,ID_NE                ;test if value in ACC < 2.4 volts, loop current (2.500V - 2.4XXV
                                                                           ) / 10 ohm = 10 mA.
03D7  61E6              810           AJMP    ID_EQ                       ;ACC = 2.4 volts, continue w/compare opertion
03D9  4012              811  ID_NE:   JC      STAT_LINE                   ;ACC < 2.4 volts, loop current OK, continue normal operation
03DB  206F06            812  ID_GT:   JB      LINE_FLG,LPI_ON_HOOK        ;if LINE FLaG not set then off-line in TaLK mode
03DE  740F              813           MOV     A,#FNCTN_KEY                ;debounce FNCTN key reset before returning
03E0  B1F2              814           ACALL   DEBOUNCE                    ;debounce FNCTN key
03E2  61F1              815           AJMP    STAT_RET
03E4                    816  LPI_ON_HOOK:
03E4  81D6              817           AJMP    ON_HOOK                     ;go off line, BREAK condition, if loss of line current in TaLK m
                                                                           ode, if <= 10 mA.
03E6  C5F0              818  ID_EQ:   XCH     A,B                         ;exchange ACC w/reg B, load ACC w/hundredths & thousandths digit
                                                                           s
03E8  B42000            819           CJNE    A,#20H,ID_GE                ;test if value in ACC >= loop current to charge (2.500V - 2.420V
                                                                           ) / 10 ohm = 8 mA.
03EB  50EE              820  ID_GE:   JNC     ID_GT                       ;jump if ACC >= 2.450V, <= 8 mA., insufficient loop current for p
                                                                           roper operation
03ED                    821  STAT_LINE:
03ED  D26F              822           SETB    LINE_FLG                    ;continue normal operation if ACC < 2.400 volts, > 10 mA.
03EF                    823  STAT_CHK:                                    ;LINE FLaG is set when on an active POTS line
03EF  D19F              824           ACALL   READ_SWITCH                 ;read switches TaLK/MONitor & O-P-T, set flags accordingly
```

```
03F1              825    STAT_RET:
03F1 22           826        RET
                  827    ;************************************************************
                  828    ; MAKE_CKT - re-establishes make condition on telco line      *
                  829    ;************************************************************
                  830    ; Entry Parameters:                                            *
                  831    ;     none                                                    *
                  832    ; Returned Value:                                              *
                  833    ;     none                                                    *
                  834    ;************************************************************
03F2              835    MAKE_CKT:
03F2 C0E0         836        PUSH   ACC
03F4 7440         837        MOV    A,#40H              ;select DA active
03F6 752500       838        MOV    _DAVALUE,#0         ;load Q18 off/loop current on value into DA register (loop curre
                                                         nt on by hardware default)
03F9 D11F         839        ACALL  DA_WRITE            ;write analog value stored in _DAVALUE to DA converter
03FB D0E0         840        POP    ACC
03FD 22           841        RET
                  842    ;************************************************************
                  843    ; BREAK_CKT - establishes break condition on telco line       *
                  844    ;************************************************************
                  845    ; Entry Parameters:                                            *
                  846    ;     none                                                    *
                  847    ; Returned Value:                                              *
                  848    ;     none                                                    *
                  849    ;************************************************************
03FE              850    BREAK_CKT:
03FE C0E0         851        PUSH   ACC
0400 7440         852        MOV    A,#40H              ;select DA active
0402 752595       853        MOV    _DAVALUE,#THRSH_LPI ;load Q18 on/loop current off analog value into DA register
0405 D11F         854        ACALL  DA_WRITE            ;write analog value stored in _DAVALUE to DA converter
0407 D0E0         855        POP    ACC
0409 22           856        RET
                  857    ;************************************************************
                  858    ; DIAL - dial number stored in ACC, either tone or pulse      *
                  859    ;************************************************************
                  860    ; Entry Parameters:                                            *
                  861    ;     ACC = key to be dialed                                  *
                  862    ;     DIAL_FLG = 0 TONE dial , = 1 PULSE dial                 *
                  863    ; Returned Value:                                              *
                  864    ;     ACC = altered                                           *
                  865    ;************************************************************
006D              866    TONE_ON_TIME   EQU   79+30     ;duration of composit tone, increments of 1 msec. (30 msec. tone
                                                         -ramp-up time)
004A              867    TONE_OFF_TIME  EQU   74        ;interdigital time, increments of 1 msec.
0028              868    PULSE_MK_TIME  EQU   40        ;Make TIME in 1 msec. increments
003C              869    PULSE_BK_TIME  EQU   60        ;Break TIME in 1 msec increments
0002              870    INTER_DIGIT    EQU   2         ;interdigital timer, increments of 500 msec
                  871    ;
040A              872    DIAL:
040A C0E0         873        PUSH   ACC
040C 206912       874        JB     DIAL_FLG,PULSE_MODE ;jump if PuLse Dial Mode, else Tone mode
040F              875    TONE_DM:
040F D138         876        ACALL  TONE_WRITE          ;select DTMF tone pair ON
0411 746D         877        MOV    A,#TONE_ON_TIME     ;duration of composite tone signal (DTMF)
0413 B18F         878        ACALL  TIMER_MSEC          ;delay routine in milliseconds
0415              879    DIAL_MUTE:
0415 740C         880        MOV    A,#DTMF_OFF         ;duration has elapsed, load code to disable DTMF tone
0417 D138         881        ACALL  TONE_WRITE          ;disable DTMF tone pair
0419 744A         882        MOV    A,#TONE_OFF_TIME    ;interdigital time
041B B18F         883        ACALL  TIMER_MSEC          ;delay routine in milliseconds
041D D19F         884        ACALL  READ_SWITCH         ;check status of TaLK/MONitor switch & Tone or Pulse slide switc
                                                         h
041F 8140         885        AJMP   DIAL_RET
0421              886    PULSE_MODE:
0421 246E         887        ADD    A,#PULSE_TABLE-REDIAL_PULSE  ;required to adjust to starting address of look-up table
0423 83           888        MOVC   A,@A+PC             ;ACC = (ACC + PC), convert Key into Dial Pulse code
0424              889    REDIAL_PULSE:
```

```
0424 601A        890              JZ     DIAL_RET                    ;return w/no output if '*' encountered (0 value from table)
0426 F52A        891              MOV    _PULCNT,A                   ;load make break counter with key value, pulse train
0428             892   DIGIT_TRAIN:
0428 D19F        893              ACALL  READ_SWITCH                 ;check status of TaLK/MONitor switch & Tone or Pulse slide switch
042A 206D13      894              JB     CMOD_FLG,DIAL_RET           ;check if TaLK/MONitor mode change
042D 71FE        895              ACALL  BREAK_CKT                   ;establish break condtion
042F 743C        896              MOV    A,#PULSE_BK_TIME            ;BREAK time (ON HOOK)
0431 B18F        897              ACALL  TIMER_MSEC                  ;delay routine in milliseconds
0433 71F2        898              ACALL  MAKE_CKT                    ;establish make condtion
0435 7428        899              MOV    A,#PULSE_MK_TIME            ;MAKE time (OFF HOOK)
0437 B18F        900              ACALL  TIMER_MSEC                  ;delay routine in milliseconds
0439 D52AEC      901              DJNZ   _PULCNT,DIGIT_TRAIN         ;loop until all pulses have been output
043C 7402        902              MOV    A,#INTER_DIGIT              ;load ACC w/interdigit time
043E B181        903              ACALL  TIMER_SEC                   ;delay routine in increments of 500 msec.
0440             904   DIAL_RET:
0440 D0E0        905              POP    ACC
0442 22          906              RET
                 907   ;************************************************************************
                 908   ; PULSE_DIAL - Generate dial pulse from key buffer, called when TF=1      :
                 909   ;************************************************************************
                 910   ; Entry Parameters:                                                       :
                 911   ;      _KEYPTR = number of keys in I2CBUFfer                              :
                 912   ;      _TMPTR1 = make or break timer, 1 msec. increment                   :
                 913   ;      _DIGCNT = counts number of keys dialed or being dialed             :
                 914   ;      _PULCNT = number of make/break represented by digit being dialed   :
                 915   ;      _TMPTR0 = iNterDigit TiMeR 1000 msec.                              :
                 916   ;      MB_FLG  - 0 = Break, 1 = Make                                      :
                 917   ;      MSN_FLG - 0 = key is in LSNibble, 1 = key is in MS Nibble          :
                 918   ;      PULS_FLG - 0 = PULse dialing not in process, 1 = PULse dialing in process :
                 919   ;      IND_FLG  - 0 = INterDigit time off, 1 = INterDigit time on         :
                 920   ; Returned Value:                                                         :
                 921   ;      _KEYPTR = _KEYPTR + 1                                              :
                 922   ;************************************************************************
                 923   ;
0443             924   PULSE_DIAL:
0443 E52A        925              MOV    A,_PULCNT                   ;load ACC w/PULse CouNTer, number of make/break events remaining
                                                                      in pulse train
0445 7024        926              JNZ    TEST_MB                     ;continue out-pulsing present key until _PULse CouNTer is zero,
                                                                      pulse train complete
0447 C3          927              CLR    C                           ;clear CY flag in preperation of loading next key
0448 7831        928              MOV    R0,#_I2CBUF                 ;load starting address of I2CBUFfer
044A D273        929              SETB   MSN_FLG                     ;default, key stored in Most Significant Nibble
044C E528        930              MOV    A,_KEYPTR                   ;load ACC w/number of keys stored in I2CBUFfer
044E 952B        931              SUBB   A,_DIGCNT                   ;calc. difference between last key in _I2CBUFfer & key being out
                                                                      -pulsed
0450 20E002      932              JB     ACC.0,MSN_ODD               ;determine whether difference is even or odd, even = key in LSN,
                                                                      odd key in MSN
0453 C273        933              CLR    MSN_FLG                     ;key is in LSN
0455             934   MSN_ODD:
0455 13          935              RRC    A                           ;divide difference by 2 in order to determine _I2CBUFfer offset,
                                                                      two keys per byte
0456 38          936              ADDC   A,R0                        ;add offset to local _I2CBUFfer pointer, R0
0457 F8          937              MOV    R0,A                        ;load I2CBUFfer pointer w/byte address
0458 E6          938              MOV    A,@R0                       ;load ACC w/two keys, only one is to be out-pulsed
0459 307301      939              JNB    MSN_FLG,PULSE_LSN           ;jump if key to out-pulse is in LSN
045C C4          940              SWAP   A                           ;move key to out-pulse into LSN of ACC
045D             941   PULSE_LSN:
045D 540F        942              ANL    A,#0FH                      ;mask of MSN of ACC
045F B40A00      943              CJNE   A,#AST_KEY,AST_GE           ;return w/out out-pulsing key if '*','#' or 'PAUSE'
0462 501B        944   AST_GE:    JNC    NO_PULSE
0464 242B        945   AST_LT:    ADD    A,#PULSE_TABLE-DIAL_PULSE   ;required to adjust to starting address of look-up table
0466 83          946              MOVC   A,@A+PC                     ;convert key to number of dial pulses
0467             947   DIAL_PULSE:
0467 F52A        948              MOV    _PULCNT,A                   ;load _PULse CouNTer w/number of out-pulses in pulse train
0469 818A        949              AJMP   PULSE_BREAK                 ;jump to break condition
046B             950   TEST_MB:
046B D52723      951              DJNZ   _TMPTR1,PULSE_RET           ;dec _Make/Break TiMeR to determine if make or break time comple
                                                                      ted
```

```
046E 306A11       952           JNB     MB_FLG,PULSE_MAKE      ;jump if changing from break to make
0471 D52A16       953           DJNZ    _PULCNT,PULSE_BREAK    ;jump if changing from make to break
0474 D274         954           SETB    IND_FLG                ;set INterDigit TiMeR FLaG
0476 75260A       955           MOV     _TMPTR0,#10            ;1000 msec. interdigit time, 10 * 100 msec. = 1000 msec.
0479 758B7A       956           MOV     RTL,#T100MS_LOW        ;interuppt time is 100 msec. when out-pulse INterDigit TiMeR is
                                                                ;  in progress
047C 758D8B       957           MOV     RTH,#T100MS_HGH        ;load high byte '   '
047F              958   NO_PULSE:
047F 052B         959           INC     _DIGCNT                ;inc. _DIGit CouNTer, indicating key out-pulsed completely
0481 22           960           RET
0482              961   PULSE_MAKE:
0482 752728       962           MOV     _TMPTR1,#PULSE_MK_TIME ;load _Make/Break TiMeR w/make time (40msec.)
0485 D26A         963           SETB    MB_FLG                 ;set Make/Break FLaG to indicate Make condition
0487 71F2         964           ACALL   MAKE_CKT               ;establish make condtion
0489 22           965           RET
048A              966   PULSE_BREAK:
048A 75273C       967           MOV     _TMPTR1,#PULSE_BK_TIME ;load _Make/Break TiMeR w/break time (60msec.)
048D C26A         968           CLR     MB_FLG                 ;clear Make/Break FLaG to indicate break condition
048F 71FE         969           ACALL   BREAK_CKT              ;establish break condtion
0491              970   PULSE_RET:
0491 22           971           RET
0492              972   PULSE_TABLE:
0492 0A           973           DB      10
0493 01           974           DB      1
0494 02           975           DB      2
0495 03           976           DB      3
0496 04           977           DB      4
0497 05           978           DB      5
0498 06           979           DB      6
0499 07           980           DB      7
049A 08           981           DB      8
049B 09           982           DB      9
049C 00           983           DB      0                       ;'*' key
                  984   ;************************************************************
                  985   ; MUTE_ON - mute talk circuit & loud speaker                 *
                  986   ;************************************************************
                  987   ; Entry Parameters:                                          *
                  988   ;     none                                                   *
                  989   ; Returned Value:                                            *
                  990   ;     none                                                   *
                  991   ;************************************************************
049D              992   MUTE_ON:
049D C0E0         993           PUSH    ACC
049F D282         994           SETB    SPKR_CNTRL             ;turn speaker off
04A1 C293         995           CLR     MUTE_CNTRL             ;mute talk circuit
04A3 71F2         996           ACALL   MAKE_CKT               ;enable primary hold circuit
04A5 C294         997           CLR     CHRG_CNTRL             ;remove CHaRGe circuit before sending Tone or Pulse
04A7 D0E0         998           POP     ACC
04A9 22           999           RET
                 1000   ;************************************************************
                 1001   ; MUTE_OFF - disable muting talk circuit & loud speaker      *
                 1002   ;************************************************************
                 1003   ; Entry Parameters:                                          *
                 1004   ;     none                                                   *
                 1005   ; Returned Value:                                            *
                 1006   ;     none                                                   *
                 1007   ;************************************************************
04AA             1008   MUTE_OFF:
04AA C0E0        1009           PUSH    ACC
04AC D293        1010           SETB    MUTE_CNTRL             ;disable mute
04AE 307104      1011           JNB     CHRG_FLG,MUTE_RET      ;re-enable CHaRGe circuit after Tone or Pulse
04B1 D294        1012           SETB    CHRG_CNTRL             ;enable CHaRGe circuit
04B3 71FE        1013           ACALL   BREAK_CKT              ;disable primary hold circuit
04B5             1014   MUTE_RET:
04B5 D0E0        1015           POP     ACC
04B7 22          1016           RET
                 1017   ;************************************************************
                 1018   ; STORE_LOC - store telco number from _I2CBUF in ram         *
                 1019   ;************************************************************
                 1020   ; Entry Parameters:                                          *
```

```
                   1021  ;       ACC = starting ram address                                  :
                   1022  ; Returned Value:                                                   :
                   1023  ;       none                                                        :
                   1024  ;*****************************************************************
04B8               1025  STORE_LOC:
04B8 752FA0        1026          MOV     _DESTRW,#AD_RAM+I2C_WR   ;load address of ram slave
04BB 75300F        1027          MOV     _I2CCNT,#MAX_BYTES+1     ;load max. number of bytes in buffer
04BE F531          1028          MOV     _I2CBUF,A                ;store ram address in I2C buffer
                   1029  ; _I2CBUF - must be loaded with the starting address and data bytes to transfer
04C0 F13B          1030          ACALL   I2C_MASTER               ;I2C service routine
04C2 22            1031          RET
                   1032  ;*****************************************************************
                   1033  ; RECALL_LOC - recall telco number from ram & save in _I2CBUF       :
                   1034  ;*****************************************************************
                   1035  ; Entry Parameters:                                                 :
                   1036  ;       ACC = starting ram address                                  :
                   1037  ; Returned Value:                                                   :
                   1038  ;       none                                                        :
                   1039  ;*****************************************************************
04C3               1040  RECALL_LOC:
04C3 752FA0        1041          MOV     _DESTRW,#AD_RAM+I2C_WR   ;load address of slave
                   1042  ; _I2CCNT - must be loaded with number of bytes to be written to slave
04C6 753001        1043          MOV     _I2CCNT,#1               ;load number of bytes to transfer after slave address
04C9 F531          1044          MOV     _I2CBUF,A                ;store ram address in I2C buffer
                   1045  ; _I2CBUF - must be loaded with the starting memory byte address
04CB F13B          1046          ACALL   I2C_MASTER               ;I2C service routine, send slave address & ram byte address
04CD 752FA1        1047          MOV     _DESTRW,#AD_RAM+I2C_RD   ;load address of slave with read bit set
04D0 75300F        1048          MOV     _I2CCNT,#MAX_BYTES+1     ;number of bytes to receive from slave
04D3 F13B          1049          ACALL   I2C_MASTER               ;I2C service routine, send slave address receive N bytes of data
04D5 22            1050          RET
                   1051  ;*****************************************************************
                   1052  ; ON_HOOK - drops telephone circuit & puts I2C slaves in power down  :
                   1053  ;*****************************************************************
                   1054  ; Entry Parameters:                                                 :
                   1055  ;       none                                                        :
                   1056  ; Returned Value:                                                   :
                   1057  ;       does not return                                             :
                   1058  ;*****************************************************************
04D6               1059  ON_HOOK:
04D6 D282          1060          SETB    SPKR_CNTRL               ;turn off speaker circuit
04D8 C294          1061          CLR     CHRG_CNTRL               ;disable charge circuit
04DA C295          1062          CLR     PWR_CNTRL                ;turn off battery power to system
                   1063  IF (EMULATE)
                   1064          CLR     EA                       ;disable interrupts
                   1065          AJMP    $
                   1066  ELSE
04DC 758702        1067          MOV     PCON,#PD                 ;put processor in Power Down Mode
                   1068  ENDIF
                   1069  ;*****************************************************************
                   1070  ; READ_VOLTAGE - performs A/D conversion on selected input          :
                   1071  ;*****************************************************************
                   1072  ; Entry Parameters:                                                 :
                   1073  ;       ACC = A/D conversion channel number (0-3)                   :
                   1074  ; Returned Value:                                                   :
                   1075  ;       BCD voltage = (digit 5,digit 4,digit 3,digit 2,digit 1,digit 0) :
                   1076  ;       ACC = two digit BCD number (digit 4,digit 3)                :
                   1077  ;       B = two digit BCD number (digit 2,digit 1)                  :
                   1078  ;       R0, R2, R3, R4 & R5 = altered                               :
                   1079  ;       _TMPR0, _TMPR1, _TMPR2 & _TMPR3 = altered                   :
                   1080  ;       _DAVALUE = must be loaded w/analog value written to D/A     :
                   1081  ;                                                                   :
                   1082  ;       channel          ACC     B       voltage max.               :
                   1083  ;       ----------------+-------+-------+------------               :
                   1084  ;       LIN_SEN          99      40      99.40V                     :
                   1085  ;       OUT_SEN          24      99      2.499V                     :
                   1086  ;       BAT_SEN          59      93      5.993V                     :
                   1087  ;       LPI_SEN          24      99      2.499V                     :
                   1088  ;*****************************************************************
04DF               1089  READ_VOLTAGE:
```

```
04DF FD         1090            MOV     R5,A                    ;save ACC conversion channel in R5
04E0 2440       1091            ADD     A,#40H                  ;select DA active & channel stored in ACC
04E2 D11F       1092            ACALL   DA_WRITE                ;write analog value stored in _DAVALUE to DA converter
04E4 7405       1093            MOV     A,#5                    ;analog settling time in milliseconds
04E6 B18F       1094            ACALL   TIMER_MSEC              ;delay routine in milliseconds
04E8 D103       1095            ACALL   AD_READ                 ;read analog value into I2C buffer
04EA F5F0       1096            MOV     B,A                     ;load binary voltage into multiplier register
04EC ED         1097            MOV     A,R5                    ;restore A/D conversion channel from R5
04ED 2418       1098            ADD     A,#VOLT_SCALER-CNVRT_VOLT   ;required to adjust to starting address of look-up table 04EF 83         1099            MOVC    A,@A+PC                 ;ACC = (ACC + PC), load ACC w/voltage scaler
04F0            1100    CNVRT_VOLT:
04F0 A4         1101            MUL     AB                      ;actual voltage expressed in binary 16 bits
04F1 B10C       1102            ACALL   BINARY_BCD              ;convert 16 bit binary value into 5 digit BCD number
04F3 BD0200     1103            CJNE    R5,#BAT_SEN,VLT_GE      ;jump if no adjustment in result digits required
04F6 500F       1104    VLT_GE: JNC     VOLT_RET                ;adjustments required for LINe_SENse & BRidGe_SENse
04F8 781F       1105    VLT_LT: MOV     R0,#_TMPR0              ;load address of _TeMPorary Register 0
04FA C5F0       1106            XCH     A,B                     ;load ACC = 94, B = 09
04FC A6F0       1107            MOV     @R0,B                   ;save ones or tenths digit in _TMPR0 w/09
04FE D6         1108            XCHD    A,@R0                   ;swap tenths digit for tens digit, ACC = 99
04FF C4         1109            SWAP    A                       ;move tens digit to MSN & ones digit to LSN of ACC = 99
0500 86F0       1110            MOV     B,@R0                   ;load B w/tenths or hundredths digit
0502 C5F0       1111            XCH     A,B                     ;load ACC = 04, B = 99
0504 C4         1112            SWAP    A                       ;move tenths or hundredths digit to MSN
0505 C5F0       1113            XCH     A,B                     ;load ACC = 99, B = 40 (99.4V or 9.94V)
0507            1114    VOLT_RET:
0507 22         1115            RET
0508            1116    VOLT_SCALER:
0508 27         1117            DB      39                      ;LINe_SENse (100V/255)*10e1=39, 255*39=9945/10e1 or 99.4V max.
0509 62         1118            DB      98                      ;OUT_SENse (2.5V/255)*10e3=98, 255*98=24990/10e3 or 2.499V max.

050A EB         1119            DB      235                     ;BATtery_SENse (6.0V/255)*10e3=235, 255*235=59925/10e3 or 5.993V
                                                                                                        max.
050B 62         1120            DB      98                      ;LooPI_SENse (2.5V/255)*10e3=98, 255*98=24990/10e3 or 2.499V max 1121    ;****************************************************************
                1122    ; BINARY_BCD - converts binary value in ACC & B into four digit BCD      *
                1123    ;****************************************************************
                1124    ; Entry Parameters:                                                       *
                1125    ;       ACC = LSB of 16 bit binary value to be converted                  *
                1126    ;       B = MSB of 16 bit binary value                                    *
                1127    ; Returned Value:                                                         *
                1128    ;       _TMPR1 = two digit BCD number (1,0)                               *
                1129    ;       _TMPR2 = two digit BCD number (3,2)                               *
                1130    ;       _TMPR3 = two digit BCD number (5,4)                               *
                1131    ;       ACC, R2, R3 & R4 = cleared                                        *
                1132    ;       B, R0 & _TMPR0 = altered                                          *
                1133    ;****************************************************************
004F            1134    BCD_CY  EQU     4FH                     ;BCD carry has occured if digit > 4
                1135    ;
050C            1136    BINARY_BCD:
050C 7A10       1137            MOV     R2,#16                  ;load bit counter
050E 85F01F     1138            MOV     _TMPR0,B                ;load temporary register 0 w/MSByte of binary value
0511 752000     1139            MOV     _TMPR1,#0               ;clear LSByte of BCD value, holds digits (1,0)
0514 752100     1140            MOV     _TMPR2,#0               ;clear MIDbyte of BCD value, holds digits (3,2)
0517 752200     1141            MOV     _TMPR3,#0               ;clear MSByte of BCD value, holds digits (3,2)
051A            1142    CHECK_BCD_CY:
051A 7B02       1143            MOV     R3,#2                   ;load number of BCD digits/byte
051C 7C03       1144            MOV     R4,#3                   ;load number of BCD bytes
051E 7820       1145            MOV     R0,#_TMPR1              ;load BCD byte pointer w/first BCD byte address
0520            1146    NEXT_BCD_BYTE:
0520 C6         1147            XCH     A,@R0                   ;swap LSByte of binary value w/Byte of BCD, ACC = BCD
0521            1148    BCD_BYTE:
0521 C4         1149            SWAP    A                       ;swap BCD digits N & N+1, digit 0 is in MSN, on first pass
0522 B44F00     1150            CJNE    A,#BCD_CY,BCD_LE        ;next two instructions test if BCD digit in MSN of ACC <= 4
0525 4002       1151    BCD_LE: JC      BCD_DIG                 ;
0527 2430       1152    BCD_GT: ADD     A,#30H                  ;ACC > 4, so must be 5 then add 3 to BCD value to correct for c
                                                                                                        rry
0529            1153    BCD_DIG:
```

| Addr | Hex | Line | | Label/Instr | Operand | Comment |
|---|---|---|---|---|---|---|
| 0529 | DBF6 | 1154 | | DJNZ | R3,BCD_BYTE | ;decrement BCD digit counter, jump if both digits tested for carry |
| 052B | C6 | 1155 | | XCH | A,@R0 | ;swap LSByte of binary value w/corrected Byte of BCD, ACC = binary |
| 052C | 08 | 1156 | | INC | R0 | ;inc. BCD byte pointer to next byte |
| 052D | 7B02 | 1157 | | MOV | R3,#2 | ;load number of BCD digits/byte |
| 052F | DCEF | 1158 | | DJNZ | R4,NEXT_BCD_BYTE | ;continue to test for carry on all 3 BCD bytes (6 BCD digits) |
| 0531 | 7C04 | 1159 | | MOV | R4,#4 | ;load byte counter w/number of bytes to shift |
| 0533 | 781F | 1160 | | MOV | R0,#_TMPR0 | ;load byte shift pointer w/address of LSByte of binary value |
| 0535 | C3 | 1161 | | CLR | C | ;clear CY, which may have been set by compare |
| 0536 | 33 | 1162 | | RLC | A | ;rotate left LSByte of binary value into CY |
| 0537 | | 1163 | NEXT_SHIFT: | | | |
| 0537 | C6 | 1164 | | XCH | A,@R0 | ;swap, LSBinary w/MSBinary, LSBinary w/BCD0, LSBinary w/BCD1, LS Binary w/BCD2 |
| 0538 | 33 | 1165 | | RLC | A | ;rotate left MSByte of binary value into CY |
| 0539 | C6 | 1166 | | XCH | A,@R0 | ;swap, MSBinary w/LSBinary, LSBinary w/BCD0, LSBinary w/BCD1, LS Binary w/BCD2, back |
| 053A | 08 | 1167 | | INC | R0 | ;inc. byte pointer |
| 053B | DCFA | 1168 | | DJNZ | R4,NEXT_SHIFT | ;continue until shift propagates through all 5 bytes |
| 053D | DADB | 1169 | | DJNZ | R2,CHECK_BCD_CY | ;if more bits to shift then continue else return |
| 053F | 7821 | 1170 | | MOV | R0,#_TMPR2 | ;load address of BCD byte 2 |
| 0541 | E520 | 1171 | | MOV | A,_TMPR1 | ;load BCD digits 1 & 0, (1,0) |
| 0543 | D6 | 1172 | | XCHD | A,@R0 | ;swap BCD digit 0 w/digit 2, (1,2) |
| 0544 | C4 | 1173 | | SWAP | A | ;swap BCD digit 1 w/digit 2, (2,1) |
| 0545 | F5F0 | 1174 | | MOV | B,A | ;save BCD digits 2 & 1 in register B |
| 0547 | E6 | 1175 | | MOV | A,@R0 | ;load BCD digits 3 & 2 |
| 0548 | 08 | 1176 | | INC | R0 | ;inc. BCD address pointer to byte 3 |
| 0549 | D6 | 1177 | | XCHD | A,@R0 | ;swap BCD digit 2 w/digit 4, (3,4) |
| 054A | C4 | 1178 | | SWAP | A | ;swap BCD digit 3 w/digit 4, (4,3) |
| 054B | 22 | 1179 | | RET | | |

```
1180 ;******************************************************************
1181 ; BLINK_LED - Blinks the LEDs a specified number of times         *
1182 ;******************************************************************
1183 ; Entry Parameters:                                               *
1184 ;     ACC = value in MSN indicates number of red LED blinks       *
1185 ;           value in LSN indicates number of green LED blinks     *
1186 ; Returned Value:                                                 *
1187 ;     ACC, B, R2, R3, R4, R5 & R6 = altered                       *
1188 ;     _TMPR0 = entry value of ACC                                 *
1189 ;******************************************************************
```

| Addr | Hex | Line | | Label/Instr | Operand | Comment |
|---|---|---|---|---|---|---|
| 054C | | 1190 | BLINK_LED: | | | |
| 054C | FE | 1191 | | MOV | R6,A | ;save ACC value |
| 054D | 7A02 | 1192 | | MOV | R2,#2 | ;blink both red and green values requires two loops |
| 054F | D297 | 1193 | | SETB | REDLED_CNTRL | ;select red LED, first |
| 0551 | C292 | 1194 | | CLR | GRNLED_CNTRL | ;disable green LED off |
| 0553 | C4 | 1195 | | SWAP | A | ;move red to LSN |
| 0554 | | 1196 | TEST_GRN: | | | |
| 0554 | 540F | 1197 | | ANL | A,#0FH | ;strip off grren value |
| 0556 | 601B | 1198 | | JZ | NEXT_LED | ;jump if no red blink value |
| 0558 | FB | 1199 | | MOV | R3,A | ;load blink counter w/number |
| 0559 | | 1200 | BLINK_RED_GRN: | | | |
| 0559 | 7D19 | 1201 | | MOV | R5,#25 | ;25 * 20 msec. = 500 msec. blink duration |
| 055B | | 1202 | BLINK_DELAY: | | | |
| 055B | C296 | 1203 | | CLR | LED_CNTRL | ;turn on source current to LEDs |
| 055D | 740A | 1204 | | MOV | A,#10 | ;time delay of ACC * 1 msec. = 10 msec. |
| 055F | B18F | 1205 | | ACALL | TIMER_MSEC | ;LED on time |
| 0561 | D296 | 1206 | | SETB | LED_CNTRL | ;disable LEDs |
| 0563 | 740A | 1207 | | MOV | A,#10 | ;time delay of ACC * 1 msec. = 10 msec. or 50 Hz. @ 50% duty cycle |
| 0565 | B18F | 1208 | | ACALL | TIMER_MSEC | ;LED off time |
| 0567 | DDF2 | 1209 | | DJNZ | R5,BLINK_DELAY | ;loop for 480 msec. |
| 0569 | AF90 | 1210 | | MOV | R7,P1 | |
| 056B | 7401 | 1211 | | MOV | A,#1 | ;time delay of 1/2 second |
| 056D | B181 | 1212 | | ACALL | TIMER_SEC | |
| 056F | 8F90 | 1213 | | MOV | P1,R7 | |
| 0571 | DBE6 | 1214 | | DJNZ | R3,BLINK_RED_GRN | ;loop until LED blinks complete |
| 0573 | | 1215 | NEXT_LED: | | | |
| 0573 | EE | 1216 | | MOV | A,R6 | ;restore ACC, green blinks are in LSN |
| 0574 | C297 | 1217 | | CLR | REDLED_CNTRL | ;disable red LED |
| 0576 | D292 | 1218 | | SETB | GRNLED_CNTRL | ;select green LED |

```
0578 DADA        1219    DJNZ    R2,TEST_GRN             ;jump if ! 0, & blink green
057A             1220  BLINK_RET:
057A D296        1221    SETB    LED_CNTRL               ;disable LEDs
057C D297        1222    SETB    REDLED_CNTRL            ;make input or select red LED
057E D292        1223    SETB    GRNLED_CNTRL            ;make input or select green LED
0580 22          1224    RET
                 1225  ;****************************************************************
                 1226  ; TIMER_SEC - Delays number of 1/2 seconds stored in ACC         *
                 1227  ;****************************************************************
                 1228  ; Entry Parameters:                                              *
                 1229  ;     ACC = number N * 500 msec. delay                           *
                 1230  ; Returned Value:                                                *
                 1231  ;     R4 = altered                                               *
                 1232  ;****************************************************************
0581             1233  TIMER_SEC:
0581 23          1234    RL      A                       ;multiply number of 1/2 sec. by 2
0582 FC          1235    MOV     R4,A                    ;load 1/4 sec. counter
0583             1236  NEXT_QTR:
0583 74FA        1237    MOV     A,#250                  ;load ACC w/number of msec.
0585 B18F        1238    ACALL   TIMER_MSEC
0587 D19F        1239    ACALL   READ_SWITCH             ;check status of TaLK/MONitor switch & Tone or Pulse slide switch
0589 206D02      1240    JB      CMOD_FLG,TMRSEC_RET     ;check if TaLK/MONitor mode change
058C DCF5        1241    DJNZ    R4,NEXT_QTR
058E             1242  TMRSEC_RET:
058E 22          1243    RET
                 1244  ;****************************************************************
                 1245  ; Entry Parameters:                                              *
                 1246  ;     ACC = number of milliseconds, 256 msec. maximum            *
                 1247  ; Returned Value:                                                *
                 1248  ;     TIMERL & TIMERH = altered                                  *
                 1249  ;****************************************************************
058F             1250  TIMER_MSEC:
058F C023        1251    PUSH    TIMERL                  ;save low byte of timer on stack
0591 C2A9        1252    CLR     ET0                     ;disable timer 0 interrupt
0593 752300      1253    MOV     TIMERL,#0               ;clear low byte of timer counter
0596 758AD6      1254    MOV     TL,#T1MS_LOW            ;load low byte into timer low
0599 758CFE      1255    MOV     TH,#T1MS_HGH            ;load high byte into timer high
059C 758BD6      1256    MOV     RTL,#T1MS_LOW           ;load low byte into timer low
059F 758DFE      1257    MOV     RTH,#T1MS_HGH           ;load high byte into timer high
05A2 D2A9        1258    SETB    ET0                     ;enable timer 0 interrupt
05A4             1259  LP_TIMER:
                 1260  IF (EMULATE)
                 1261    JNB     TF,$                    ;emulator simulation of Idle mode
                 1262  ELSE
05A4 758701      1263    MOV     PCON,#IDL               ;put processor in Idle Mode, reactivated by timer overflow, 1 msec.
                 1264  ENDIF
05A7 B523FA      1265    CJNE    A,TIMERL,LP_TIMER       ;compare w/low byte of timer counter, loop until 1 msec.
05AA C2A9        1266    CLR     ET0                     ;disable timer 0 interrupt
05AC 758B7A      1267    MOV     RTL,#T100MS_LOW         ;load low byte into timer low
05AF 758D8B      1268    MOV     RTH,#T100MS_HGH         ;load high byte into timer high
05B2 D2A9        1269    SETB    ET0                     ;enable timer 0 interrupt
05B4 D023        1270    POP     TIMERL                  ;restore low byte of timer counter from stack
05B6 22          1271    RET
                 1272  ;****************************************************************
                 1273  ;'TIMER_UPDATE - increments TIMER once every Timer overflow Flag *
                 1274  ;****************************************************************
                 1275  ; Entry Parameters:                                              *
                 1276  ;     none                                                       *
                 1277  ; Returned Value:                                                *
                 1278  ;     TL = RTL, reload timer low byte                            *
                 1279  ;     TH = RTH, reload timer high byte                           *
                 1280  ;     TIMER = TIMER + 1                                          *
                 1281  ;****************************************************************
05B7             1282  TIMER_UPDATE:
05B7 C0D0        1283    PUSH    PSW
05B9 C0E0        1284    PUSH    ACC
05BB 306924      1285    JNB     DIAL_FLG,TONE_SELECT    ;refrain from calling PULSE_DIAL routine if TONE mode SELected
```

```
05BE              1286    PULSE_SELECT:
05BE 307221       1287            JNB      PULS_FLG,TONE_SELECT    ;return w/out out-pulsing if PULSe FLaG not set
05C1 30741C       1288            JNB      IND_FLG,OUT_PULSE       ;test if INterDigit Time in progress
05C4 D52626       1289            DJNZ     _TMPTR0,TIMER_RET       ;skip out-pulsing until InterDigit Time exceeded
05C7 C274         1290            CLR      IND_FLG                 ;terminate interdigit time
05C9 758AD6       1291            MOV      TL,#TIMS_LOW            ;interuppt time is 1msec., load low byte into timer reload reg.

05CC 758CFE       1292            MOV      TH,#TIMS_HGH            ;load high byte '    '
05CF 758BD6       1293            MOV      RTL,#TIMS_LOW           ;interuppt time is 1msec. when out-pulse routine is in progress 05D2 758DFE       1294            MOV      RTH,#TIMS_HGH           ;load high byte '    '
05D5 E52B         1295            MOV      A,_DIGCNT               ;load ACC w/number of keys stored in _I2CBUFfer
05D7 B52800       1296            CJNE     A,_KEYPTR,UPD_LE        ;test if all keys in buffer have been out-pulsed
05DA 4004         1297    UPD_LE: JC       OUT_PULSE               ;jump if not, continue out-pulsing
05DC D159         1298    UPD_GT: ACALL    TERM_PULSE              ;TERMinate PULSE dialing
05DE A1ED         1299            AJMP     TIMER_RET
05E0              1300    OUT_PULSE:
05E0 9143         1301            ACALL    PULSE_DIAL              ;call PULSE_DIAL routine every 1 msec.
05E2              1302    TONE_SELECT:
05E2 7401         1303            MOV      A,#1
05E4 2523         1304            ADD      A,_TIMERL               ;_TIMERL is used for times > 100ms, TIMER=012CH=3sec
05E6 F523         1305            MOV      _TIMERL,A               ;save updated _TIMERL
05E8 E4           1306            CLR      A
05E9 3524         1307            ADDC     A,_TIMERH               ;add carry to _TIMERH
05EB F524         1308            MOV      _TIMERH,A               ;save updated _TIMERH
05ED              1309    TIMER_RET:
05ED D0E0         1310            POP      ACC
05EF D0D0         1311            POP      PSW
05F1 22           1312            RET
                  1313    ;************************************************************
                  1314    ; DEBOUNCE - Debounces last key pressed                      *
                  1315    ;************************************************************
                  1316    ; Entry Parameters:                                          *
                  1317    ;       ACC = key to be debounced                            *
                  1318    ; Returned Value:                                            *
                  1319    ;       ACC = 0FFH, key released with no new key received    *
                  1320    ;       ACC = 0XH, value of new key received                 *
                  1321    ;       _TMPR0 = key to be debounced                         *
                  1322    ;       R5, R6 & R7 = altered                                *
                  1323    ;************************************************************
05F2              1324    DEBOUNCE:
05F2 F51F         1325            MOV      _TMPR0,A                ;save key temporarily
05F4              1326    NEXT_DEBOUNCE:
                  1327    IF (EMULATE)
                  1328            JNB      TF,$                    ;emulator simulation of Idle mode
                  1329    ELSE
05F4 75B701       1330            MOV      PCON,#IDL               ;put processor in Idle Mode, reactivated by timer overflow, 10ms
                  1331    ENDIF
05F7 D1F7         1332            ACALL    KEY_SCAN                ;scan keyboard for old key released
05F9 B4FF01       1333            CJNE     A,#NO_KEY,KEY_DEBOUNCE  ;jump if same key still pressed, else scan for new key
05FC 22           1334            RET
05FD              1335    KEY_DEBOUNCE:
05FD B51F02       1336            CJNE     A,_TMPR0,KEY_RET        ;test if same key, jump if new key received
0600 A1F4         1337            AJMP     NEXT_DEBOUNCE           ;continue scanning keyboard for key release
0602              1338    KEY_RET:
0602 22           1339            RET                              ;new key is in ACC
                  1340    ;************************************************************
                  1341    ; AD_READ - AD converter read routine (PCF8591)              *
                  1342    ;************************************************************
                  1343    ; Entry Parameters:                                          *
                  1344    ;       DA_WRITE routine must first be called to write the control byte *
                  1345    ; Returned Value:                                            *
                  1346    ;       ACC = AD conversion value                            *
                  1347    ;       _DESTRW = AD_ADAC+I2C_RD                             *
                  1348    ;       _I2CCNT = 2, number of bytes to receive from slave A/D *
                  1349    ;       R2 = 0                                               *
                  1350    ;************************************************************
0603              1351    AD_READ:
```

```
0603 C032      1352        PUSH    _I2CBUF+1              ;save keys N & N-1
0605 C033      1353        PUSH    _I2CBUF+2              ;save keys N-2 & N-3
0607 752F91    1354        MOV     _DESTRW,#AD_ADAC+I2C_RD ;load address of slave with read bit set
060A 753002    1355        MOV     _I2CCNT,#2             ;number of bytes to receive from slave A/D
060D F13B      1356        ACALL   I2C_MASTER             ;start conversion, ignore previous value
060F           1357    AD_LOOP:
060F 7A0E      1358        MOV     R2,#14
0611 DAFE      1359        DJNZ    R2,$                   ;90 usec. delay for conversion
0613 E533      1360        MOV     A,_I2CBUF+2            ;load analog value from last conversion
0615 F13B      1361        ACALL   I2C_MASTER             ;read converted analog value into I2CBUF buffer again
0617 B533F5    1362        CJNE    A,_I2CBUF+2,AD_LOOP    ;compare new analog value w/old, loop until same
061A D033      1363        POP     _I2CBUF+2              ;restore keys N-2 & N-3
061C D032      1364        POP     _I2CBUF+1              ;restore keys N & N-1
061E 22        1365        RET
               1366    ;************************************************************
               1367    ; DA_WRITE - DA converter write routine (PCF8591)
               1368    ;************************************************************
               1369    ; Entry Parameters:
               1370    ;       ACC = AD/DA converter control byte
               1371    ;       _DAVALUE = analog value to be written to converter
               1372    ; Returned Value:
               1373    ;       _DESTRW = AD_ADAC+I2C_RD
               1374    ;       _I2CCNT = 3, number of bytes to send slave D/A converter
               1375    ;************************************************************
061F           1376    DA_WRITE:
061F C032      1377        PUSH    _I2CBUF+1              ;save keys N & N-1
0621 C033      1378        PUSH    _I2CBUF+2              ;save keys N-2 & N-3
0623 752F90    1379        MOV     _DESTRW,#AD_ADAC+I2C_WR ;load address of slave AD/DA converter
0626 753002    1380        MOV     _I2CCNT,#2             ;number of bytes to send after slave address (control & data bytes)
0629 F531      1381        MOV     _I2CBUF,A              ;load AD/DA control byte into _I2CBUF buffer
062B 852532    1382        MOV     _I2CBUF+1,_DAVALUE     ;analog value _I2CBUF + 1
062E 852533    1383        MOV     _I2CBUF+2,_DAVALUE     ;analog value + 1,stored at location _I2CBUF + 2
0631 F13B      1384        ACALL   I2C_MASTER             ;I2C service routine
0633 D033      1385        POP     _I2CBUF+2              ;restore keys N-2 & N-3
0635 D032      1386        POP     _I2CBUF+1              ;restore keys N & N-1
0637 22        1387        RET
               1388    ;************************************************************
               1389    ; TONE_WRITE - Write to the DTMF generator (PCD3312)
               1390    ;************************************************************
               1391    ; Entry Parameters:
               1392    ;       ACC = Key (0-9 & *, #) representing DTMF code
               1393    ; Returned Value:
               1394    ;       all registers returned unchanged
               1395    ;************************************************************
000C           1396    DTMF_OFF   EQU    12               ;disable DTMF tone generator
000D           1397    TONE_OFF   EQU    13               ;disable DTMF tone generator & master oscillator (min. power mode)
0638           1398    TONE_WRITE:
0638 C0E0      1399        PUSH    ACC
063A           1400    SEND_TONE:
               1401    ; Send slave address and DTMF data byte
063A 752F48    1402        MOV     _DESTRW,#AD_DTMF+I2C_WR ;load address of slave
063D 753001    1403        MOV     _I2CCNT,#1             ;load number of bytes to transfer after slave address
0640 2407      1404        ADD     A,#TONE_TABLE-TONE_OFSET ;required to adjust to starting address of look-up table
0642 83        1405        MOVC    A,@A+PC                ;ACC = (ACC + PC), convert Key into DTMF code
0643           1406    TONE_OFSET:
0643 F531      1407        MOV     _I2CBUF,A              ;load DTMF code into data buffer
0645 F13B      1408        ACALL   I2C_MASTER             ;I2C service routine
0647 D0E0      1409        POP     ACC
0649 22        1410        RET
064A           1411    TONE_TABLE:
064A 10        1412        DB      10H
064B 11        1413        DB      11H
064C 12        1414        DB      12H
064D 13        1415        DB      13H
064E 14        1416        DB      14H
064F 15        1417        DB      15H
0650 16        1418        DB      16H
0651 17        1419        DB      17H
```

```
0652 18        1420          DB      18H
0653 19        1421          DB      19H
0654 1E        1422          DB      1EH             ;'*' key
0655 1F        1423          DB      1FH             ;'#' key
0656 00        1424          DB      00H             ;12, turn DTMF off
0657 01        1425          DB      01H             ;13, turn DTMF & P3312 internal osc. off (min. power requirement
                                                      )
0658 36        1426          DB      36H             ;14, A5 = 880
               1427  ;****************************************************************
               1428  ; TERM_PULSE - TERMinate PULSE dialing                            *
               1429  ;****************************************************************
               1430  ; Entry Parameters:                                               *
               1431  ;    none                                                         *
               1432  ; Returned Value:                                                 *
               1433  ;    none                                                         *
               1434  ;****************************************************************
0659           1435  TERM_PULSE:
0659 C272      1436          CLR     PULS_FLG        ;disable pulse dialing
065B E4        1437          CLR     A
065C F523      1438          MOV     _KEYPTR,A       ;clear _KEY PointeR
065E F52B      1439          MOV     _DIGCNT,A       ;clear pulse dial _DIGit CouNTer
0660 F523      1440          MOV     _TIMERL,A       ;clear _TIMERL
0662 F524      1441          MOV     _TIMERH,A       ;clear _TIMERH
0664 91AA      1442          ACALL   MUTE_OFF        ;disable mute
0666 758D8B    1443          MOV     RTH,#T100MS_HGH ;interuppt time is 100msec., load low byte into timer reload reg
0669 758B7A    1444          MOV     RTL,#T100MS_LOW ;
066C 75270B    1445          MOV     _TMPTR1,#TLK_TIMEH ;load _TeMpory Timer Reg. 1 w/high byte time out value, 5 min. t
                                                       ime-out
066F 7526B8    1446          MOV     _TMPTR0,#TLK_TIMEL ;load _TeMpory Timer Reg. 0 w/low byte time out value
0672 748E      1447          MOV     A,#LN_REDIAL    ;Last Number REDIAL storeage location
0674 91B8      1448          ACALL   STORE_LOC       ;store last number dialed from _I2CBUF -> ram
0676 306B02    1449          JNB     SPKR_FLG,SPKR_OFF ;jump if SPeaKeR is off, leave SPeaKeR off
0679 C282      1450          CLR     SPKR_CNTRL      ;turn SPeaKeR back on
067B           1451  SPKR_OFF:
067B 22        1452          RET
               1453  ;****************************************************************
               1454  ; SHIFT_BUF - Rotate nibbles in _I2CBUF right one position        *
               1455  ;****************************************************************
               1456  ; Entry Parameters:                                               *
               1457  ;    none                                                         *
               1458  ; Returned Value:                                                 *
               1459  ;    LSN of last byte of buffer will be lost (nibble addr. #1)    *
               1460  ;****************************************************************
               1461  ;BYTE ADDR-  32    33    34    35    36    37    38    39    3A    3B    3C
                                                                3D    3E    3F
               1462  ;NIBBLE ADDR- 28:27 26:25 24:23 22:21 20:19 18:17 16:15 14:13 12:11 10:9  8:7
                                                                6:5   4:3   2:1
               1463  ;When buffer fills & next key is entered into buffer, then first key (LSN of address 3F) is lost
000E           1464  MAX_BYTES    EQU    14          ;max. number of bytes in _I2CBUF, equivalent to 26 nibbles
001B           1465  MAX_KEYS     EQU    27          ;max. number of keys allowed in buffer
               1466  ;
067C           1467  SHIFT_BUF:
067C C0D0      1468          PUSH    PSW
067E C0E0      1469          PUSH    ACC
0680 E8        1470          MOV     A,R0
0681 C0E0      1471          PUSH    ACC
0683 780E      1472          MOV     R0,#MAX_BYTES   ;load max. number of bytes in buffer, address 32H handled outsid
                                                      e of loop
0685 793F      1473          MOV     R1,#_I2CBUF+MAX_BYTES ;determine last byte address in _I2CBUF
0687 77F0      1474          MOV     @R1,#EOF        ;first key entered will be overwritten by EOF in LSN
0689           1475  NEXT_NIBBLE:
0689 E7        1476          MOV     A,@R1           ;load byte from buffer, N
068A 19        1477          DEC     R1              ;point to next lower byte in buffer, N-1
068B D7        1478          XCHD    A,@R1           ;exchange LSN of ACC w/indirect address, shift right nibble acro
                                                      ss byte boundary
068C C4        1479          SWAP    A               ;correct order of nibbles
068D 09        1480          INC     R1              ;point back to original load byte address from buffer, N
068E F7        1481          MOV     @R1,A           ;store right shifted nibbles at N
068F 19        1482          DEC     R1              ;prepare to right shift next nibbles, N-1
0690 D8F7      1483          DJNZ    R0,NEXT_NIBBLE  ;continue until all 26 nibbles have been right shifted one posit
                                                      ion
```

```
0692 E7        1484            MOV     A,@R1           ;load last byte in buffer 33H
0693 C4        1485            SWAP    A               ;swap nibbles
0694 540F      1486            ANL     A,#0FH          ;mask of former LSN
0696 F7        1487            MOV     @R1,A           ;store shifted & masked nibbles
0697 D0E0      1488            POP     ACC
0699 F8        1489            MOV     R0,A
069A D0E0      1490            POP     ACC
069C D0D0      1491            POP     PSW
069E 22        1492            RET
               1493    ;****************************************************************
               1494    ; READ_SWITCH - Read both TLK/MON toggle switch & O-P-T slide switche *
               1495    ;****************************************************************
               1496    ; Entry Parameters:                                               :
               1497    ;    none                                                         :
               1498    ; Returned Value:                                                 :
               1499    ;    MODE_FLG = 1 if MONitor mode, = 0 if TaLK mode              :
               1500    ;    DIAL_FLG = 1 if dial pulse, = 0 if tone pulse                :
               1501    ;    all registers returned unchanged                             :
               1502    ;****************************************************************
0084           1503    TLKMON_TPO  EQU  84H            ;sets P1.2 (PULSE/TONE*) & P1.7 (MON/TLK*), make inputs
               1504    ;
069F           1505    READ_SWITCH:
069F C280      1506            CLR     SCL
06A1 C281      1507            CLR     SDA
06A3 C26D      1508            CLR     CMOD_FLG        ;mode changed, so set Change MODe FLaG
06A5 439084    1509            ORL     P1,#TLKMON_TPO  ;make P1.2 (PULSE/TONE*) & P1.7 (MON/TLK*), inputs for switches 06A8 30920D    1510            JNB     TPO_CNTRL,TONE_MODE  ;jump if Tone mode, test P1.2 to determine state of T-P-O slide
                                                             switch
06AB 206915    1511            JB      DIAL_FLG,TLKMON_SW   ;if changing from Tone to Pulse
06AE 752800    1512            MOV     _KEYPTR,#0      ;clear _KEY PointeR
06B1 752900    1513            MOV     _KEYCNT,#0      ;clear _KEYCouNTer
06B4 D269      1514            SETB    DIAL_FLG        ;set flag for pulse dial mode, 0 = Tone dial, 1 = Pulse dial
06B6 C1C3      1515            AJMP    TLKMON_SW
06B8           1516    TONE_MODE:
06B8 306908    1517            JNB     DIAL_FLG,TLKMON_SW   ;if changing from Pulse to Tone
06BB 752800    1518            MOV     _KEYPTR,#0      ;clear _KEY PointeR
06BE 752900    1519            MOV     _KEYCNT,#0      ;clear _KEYCouNTer
06C1 C269      1520            CLR     DIAL_FLG        ;clear flag for tone dial mode, 0 = Tone dial, 1 = Pulse dial
06C3           1521    TLKMON_SW:
06C3 309717    1522            JNB     TLKMON_CNTRL,TLK_MODE ;jump if TaLK mode, test P1.7 to determine state of TaLK/MONitor
                                                              toggle switch
06C6 206829    1523            JB      MODE_FLG,READ_RET    ;jump if previous mode was MONitor, no mode change
               1524    ; Changing from TaLK to MONitor mode
06C9 D268      1525            SETB    MODE_FLG        ;set MODE_FLaG to indicate MONitor mode
06CB D26D      1526            SETB    CMOD_FLG        ;mode changed, so set Change MODe FLaG
06CD 052C      1527            INC     _SPKRLVL        ;increase SPeaKeR LeVeL in MONitor mode
06CF 752400    1528            MOV     _TIMERH,#0      ;clear time-out timer high & low bytes
06D2 752300    1529            MOV     _TIMERL,#0      ;
06D5 752701    1530            MOV     _TMPTR1,#MON_TIMEH   ;load _TeMpory Timer Reg. 1 w/high byte time out value
06D8 7526C2    1531            MOV     _TMPTR0,#MON_TIMEL   ;load _TeMpory Timer Reg. 0 w/low byte time out value
06DB C1F2      1532            AJMP    READ_RET
06DD           1533    TLK_MODE:
06DD 306812    1534            JNB     MODE_FLG,READ_RET    ;jump if previous mode was TaLK, no mode change
               1535    ; Changing from MONitor to TaLK mode
06E0 C268      1536            CLR     MODE_FLG        ;clear MODE_FLaG to indicate TaLK mode
06E2 D26D      1537            SETB    CMOD_FLG        ;mode changed, so set Change MODe FLaG
06E4 152C      1538            DEC     _SPKRLVL        ;decrease SPeaKeR LeVeL in TaLK mode 06E6 752400    1539            MOV     _TIMERH,#0      ;clear time-out timer high & low bytes
06E9 752300    1540            MOV     _TIMERL,#0      ;
06EC 75270B    1541            MOV     _TMPTR1,#TLK_TIMEH   ;load _TeMpory Timer Reg. 1 w/high byte time out value
06EF 7526B8    1542            MOV     _TMPTR0,#TLK_TIMEL   ;load _TeMpory Timer Reg. 0 w/low byte time out value
06F2           1543    READ_RET:
06F2 D281      1544            SETB    SDA
06F4 D280      1545            SETB    SCL
06F6 22        1546            RET
               1547    ;****************************************************************
               1548    ; KEY_SCAN - Keyboard scan routine                                :
               1549    ;****************************************************************
               1550    ; Entry Parameters:                                               :
```

```
                    1551  ;      none
                    1552  ; Returned Value:
                    1553  ;      ACC = key (00H - 0FH), or 0FFH if no key received
                    1554  ;      R5, R6 & R7 = altered
                    1555  ;*************************************************************
                    1556  ; General assingments
      000D          1557  RECALL_KEY     EQU     0DH
      000E          1558  STORE_KEY      EQU     0EH
      000F          1559  FNCTN_KEY      EQU     0FH
      0010          1560  KEYS           EQU     16      ;number of keys + 1
      0004          1561  ROWS           EQU     4       ;number of rows
      007F          1562  ROW_1          EQU     07FH    ;select row 1 low
      00FF          1563  NO_KEY         EQU     0FFH    ;no key received returned value
                    1564  ; Bit test assignments
      00B1          1565  COL0    EQU     0B1H
      00B2          1566  COL1    EQU     0B2H
      00B3          1567  COL2    EQU     0B3H
      00B0          1568  COL3    EQU     0B0H
                    1569  ; Key pad scan pattern
                    1570  ;          COL0(P3.1)    COL1(P3.2)    COL2(P3.3)    COL3(P3.0)
                    1571  ; ROW1 ..7     #              0             *             STORE
                    1572  ; ROW2(r.3)    9              8             7             FNCTN
                    1573  ; ROW0(P3.4)   6              5             4             RECALL
                    1574  ; ROW3(P3.5)   3              2             1             ?
                    1575  ;
06F7                1576  KEY_SCAN:
06F7 C0D0           1577          PUSH    PSW
                    1578          ;row scan order (1,2,3,0)
06F9 747F           1579          MOV     A,#ROW_1        ;load ACC w/row 1 /...7 low
06FB 7F10           1580          MOV     R7,#KEYS        ;load R0 w/number of keys + 1
06FD 7E04           1581          MOV     R6,#ROWS        ;load R1 w/number of rows
06FF                1582  SCAN_COLUMN:
06FF F5B0           1583          MOV     P3,A            ;output ACC to P3
0701 7D10           1584          MOV     R5,#16          ;number of increments of delay
0703 DDFE           1585          DJNZ    R5,$            ;400 usec. of delay before reading columns
                    1586          ;Test column 0
0705 1F             1587          DEC     R7              ;dec key counter
0706 20B102         1588          JB      COL0,COLUMN_1   ;jump if no column #0 key
0709 E124           1589          AJMP    CNVRT_KEY       ;jump to look-up table
070B                1590  COLUMN_1:
                    1591          ;Test column 1
070B 1F             1592          DEC     R7              ;dec key counter
070C 20B202         1593          JB      COL1,COLUMN_2   ;jump if no column #1 key
070F E124           1594          AJMP    CNVRT_KEY       ;jump to look-up table
0711                1595  COLUMN_2:
                    1596          ;Test column 2
0711 1F             1597          DEC     R7              ;dec key counter
0712 20B302         1598          JB      COL2,COLUMN_3   ;jump if no column #2 key
0715 E124           1599          AJMP    CNVRT_KEY       ;jump to look-up table
0717                1600  COLUMN_3:   ;Test column 3
0717 1F             1601          DEC     R7              ;dec key counter
0718 20B002         1602          JB      COL3,NEXT_ROW   ;jump if no column #3 key, select next row then scan columns again
071B E124           1603          AJMP    CNVRT_KEY       ;jump to look-up table
071D                1604  NEXT_ROW:
071D 03             1605          RR      A               ;move low bit to ACC.(n-1), row (n-1)
071E DEDF           1606          DJNZ    R6,SCAN_COLUMN  ;move to next row
0720 74FF           1607          MOV     A,#0FFH         ;return indicating no key received
0722 E128           1608          AJMP    RESTORE_REG
                    1609          ;Look-up table routine
0724                1610  CNVRT_KEY:
0724 EF             1611          MOV     A,R7            ;load ACC w/key counter value
0725 2403           1612          ADD     A,#LOOK_UP_TABLE-RESTORE_REG    ;required to adjust to starting address of look-up table
0727 83             1613          MOVC    A,@A+PC         ;ACC = (ACC + PC)
0728                1614  RESTORE_REG:
0728 D0D0           1615          POP     PSW
072A 22             1616          RET
072B                1617  LOOK_UP_TABLE:
                    1618          ;row 0
```

```
072B 0D      1619              DB      0DH             ;key 'RECALL'
072C 04      1620              DB      04H             ;key '4'
072D 05      1621              DB      05H             ;key '5'
072E 06      1622              DB      06H             ;key '6'
             1623              ;row 3
072F 00      1624              DB      0               ;NO KEY, place holder in table
0730 01      1625              DB      01H             ;key '1'
0731 02      1626              DB      02H             ;key '2'
0732 03      1627              DB      03H             ;key '3'
             1628              ;row 2
0733 0F      1629              DB      0FH             ;key 'FNCTN'
0734 07      1630              DB      07H             ;key '7'
0735 08      1631              DB      08H             ;key '8'
0736 09      1632              DB      09H             ;key '9'
             1633              ;row 1
0737 0E      1634              DB      0EH             ;key 'STORE'
0738 0A      1635              DB      0AH             ;key '*'
0739 00      1636              DB      00H             ;Key '0'
073A 0B      1637              DB      0BH             ;key '#'
             1638  ;**********************************************************************
             1639  ; I2C_MASTER - I2C Bus master serivce routine
             1640  ;**********************************************************************
             1641  ; Entry Parameters:
             1642  ;     _I2CBUF = starting address of data buffer
             1643  ;     _I2CCNT = number of bytes to transfer (16 bytes max.)
             1644  ;     _DESTRW = destination slave address + R/W bit (7 address bits + 1 R/*W bit)
             1645  ; Returned Value:
             1646  ;     _TMPR3 = result register
             1647  ;           00 = number of bytes in _I2CCNT were received from slave
             1648  ;           01 = number of bytes in _I2CCNT were sent to slave
             1649  ;           02 = slave acknowledged the address but not the transmitted data byte
             1650  ;           03 = no slave acknowledged the address
             1651  ;           04 = master lost arbitration during address transfer
             1652  ;**********************************************************************
             1653  ; Slave addresses
0048         1654  AD_DTMF  EQU    048H        ;PCD3312 I2C (DTMF generator) address
00A0         1655  AD_RAM   EQU    0A0H        ;PCF8571 I2C (128 X 8 bit) RAM address
0090         1656  AD_ADAC  EQU    090H        ;PCF8591 I2C (quad 8 bit A/D & single D/A)
             1657  ; Read or Write control bit definitions
0001         1658  I2C_RD   EQU    01H         ;I2C READ bit (LSB)
0000         1659  I2C_WR   EQU    00H         ;I2C WRITE bit (LSB)
             1660  ; I2CON-I2C BUS CONTROL REGISTER-(READ)
0007         1661  _RDAT    EQU    7           ;RECEIVE DATA-(RDAT)
0006         1662  _ATN     EQU    6           ;ATTENTION-(ATN)
0005         1663  _DRDY    EQU    5           ;DATA READY-(DRDY)
0004         1664  _ARL     EQU    4           ;ARBITRATION LOSS-(ARL)
0003         1665  _STR     EQU    3           ;START-(STR)
0002         1666  _STP     EQU    2           ;STOP-(STP)
0001         1667  _MASTER  EQU    1           ;MASTER-(MASTER)
             1668  ; I2CON-I2C BUS CONTROL REGISTER-(WRITE)
0080         1669  _CXA     EQU    80H         ;CLEAR TRANSMIT ACTIVE-(CXA)
0040         1670  _IDLE    EQU    40H         ;GO IDLE-(IDLE)
0020         1671  _CDR     EQU    20H         ;CLEAR DATA READY-(CDR)
0010         1672  _CARL    EQU    10H         ;CLEAR ARBITRATION LOSS-(CARL)
0008         1673  _CSTR    EQU    08H         ;CLEAR START-(CSTR)
0004         1674  _CSTP    EQU    04H         ;CLEAR STOP-(CSTP)
0002         1675  _XSTR    EQU    02H         ;TRANSMIT REPEATE- START-(XSTR)
0001         1676  _XSTP    EQU    01H         ;TRANSMIT REPEATE- STOP-(XSTP)
             1677  ; I2CFG-I2C BUS CONFIGURATION REGISTER-(WRITE)
             1678                              ;SLAVE I2C BUS-(SLAVEN)
0040         1679  _MASTRQ  EQU    40H         ;MASTER I2C BUS-(MASTRQ)
             1680                              ;CLEAR TIMER INTERRUPT FLAG-(CLRT1)
0010         1681  _T1RUN   EQU    10H         ;START STOP TIMER 1-(T1RUN)
0002         1682  _CT1     EQU    02H         ;CLOCK TIMER 1-(CT1)
0001         1683  _CT0     EQU    01H         ;CLOCK TIMER 0-(CT0)
             1684  ;
073B         1685  I2C_MASTER:
073B C2AF    1686              CLR     EA                      ;disable interrupts
073D C0D0    1687              PUSH    PSW
073F C0E0    1688              PUSH    ACC
```

```
0741 E8        1689           MOV     A,R0
0742 C0E0      1690           PUSH    ACC
0744 E9        1691           MOV     A,R1
0745 C0E0      1692           PUSH    ACC
0747 EA        1693           MOV     A,R2
0748 C0E0      1694           PUSH    ACC
               1695   ; Make processor I2C Bus master
074A 75D843    1696           MOV     I2CFG,#_MASTRQ+_CT1+_CT0  ;set MASTRQ=1 & _T1RUN=0 (slow I2C bus), CT1, and CT0
               1697   ; Send Address+R/W byte
074D           1698   I2C_START:
074D 7931      1699           MOV     R1,#_I2CBUF     ;starting address of masters data buffer, loaded into R3 by call
                                                       ing routine
074F AA30      1700           MOV     R2,_I2CCNT      ;load byte counter, contains number of bytes the master will sen
                                                       d or receive
0751 E52F      1701           MOV     A,_DESTRW       ;location of slave address (7 bits) + R/*W(1 bit)
0753 F599      1702           MOV     I2DAT,A         ;send 1st bit manually
0755 75981C    1703           MOV     I2CON,#_CARL+_CSTR+_CSTP ;clear ARL, STR and STP
0758 7808      1704           MOV     R0,#8           ;load bit counter
075A F1E9      1705           ACALL   XBITRL          ;send 8 bits, then wait for ack
075C 309D4E    1706           JNB     I2CON._DRDY,MXALOS ;master lost arbitration
075F 209F17    1707           JB      I2CON._RDAT,NOSLAVE ;no slave acknowledged address
0762 13        1708           RRC     A               ;rotate R/*W bit into CY
0763 402C      1709           JC      MR              ;test CY, jump to receive routine to read frame 07C1 D0E0      1766           POP     ACC
07C3 D0D0      1767           POP     PSW
07C5 D2AF      1768           SETB    EA              ;enable interrupts
07C7 22        1769           RET
               1770   ;************************
               1771   ; I2C Bus subroutines   *
               1772   ;************************
               1773   ; Send Ack bit 0 then Receive 8 bits
07C8           1774   I2SAR8:
07C8 759900    1775           MOV     I2DAT,#0        ;send Ack
07CB           1776   I2SAR82:
07CB 309EFD    1777           JNB     I2CON._ATN,$    ;loop until ATN
07CE 309D11    1778           JNB     I2CON._DRDY,I2RCVR ;go if fault
               1779   ; Receive 8 bits
07D1           1780   I2RCV8:
07D1 7808      1781           MOV     R0,#8           ;set bit count for address
07D3           1782   I2RCV8A:
07D3 E4        1783           CLR     A               ;clear byte accumulator
07D4           1784   RBITLP:
07D4 4599      1785           ORL     A,I2DAT         ;include the bit, clear ATTN
07D6           1786   RBITRL:
07D6 23        1787           RL      A               ;data enters by way of msb
07D7 309EFD    1788           JNB     I2CON._ATN,$    ;wait for ATTN flag
07DA 309D05    1789           JNB     I2CON._DRDY,I2RCVR ;go if fault
07DD D8F5      1790           DJNZ    R0,RBITLP       ;loop if not 7 yet
07DF A29F      1791           MOV     C,I2CON._RDAT   ;get 8th bit, do not clear ATTN
07E1 33        1792           RLC     A               ;include the 8th bit
07E2           1793   I2RCVR:
07E2 22        1794           RET
               1795   ; Get Byte from Buffer and Send it
07E3           1796   I2XMTB:
07E3 E7        1797           MOV     A,@R1           ;load byte to send
07E4 09        1798           INC     R1              ;inc. address
               1799   ; Send 8 bits and wait for Ack
07E5           1800   I2XMT8:
07E5 7808      1801           MOV     R0,#8           ;start bit count
07E7           1802   XBITLP:
07E7 F599      1803           MOV     I2DAT,A         ;set xmit mode and send bit
07E9           1804   XBITRL:
07E9 23        1805           RL      A               ;rotate left one bit
07EA 309EFD    1806           JNB     I2CON._ATN,$    ;wait for attention
07ED 309D08    1807           JNB     I2CON._DRDY,XMT8R ;go if fault
07F0 D8F5      1808           DJNZ    R0,XBITLP       ;loop if not all out
               1809   ; Switch to Receive Mode for Ack bit
07F2 7598A0    1810           MOV     I2CON,#_CDR+_CXA
               1811   ; Wait for Ack
07F5 309EFD    1812           JNB     I2CON._ATN,$
```

```
07F8              1813        XMT8R:
07F8 22           1814            RET
                  1815        ;
07F9              1816        END_PROG:
0800              1817            ORG     800H
0800 FFFFFFFF     1818            DB      0FFH,0FFH,0FFH,0FFH,0FFH,0FFH,0FFH,0FFH
0804 FFFFFFFF
0808 FFFFFFFF     1819            DB      0FFH,0FFH,0FFH,0FFH,0FFH,0FFH,0FFH,0FFH
080C FFFFFFFF
                  1820            END
                  1710        ; Write Frame -Send Message to Slave
0765              1711        MXLP:
0765 F1E3         1712            ACALL   I2XMTB              ;send 8 bits, then wait for ack
0767 209C43       1713            JB      I2CON._ARL,MSGEND   ;jump if Arb lost
076A 209F07       1714            JB      I2CON._EDAT,MXNOAK  ;slave did not acknowledge transmitted data byte
076D DAF6         1715            DJNZ    R2,MXLP             ;continue to loop if I2CCNT != 0
076F              1716        MNEND:
076F 752201       1717            MOV     _TMPR3,#1           ;number of bytes indicated in I2CCNT were sent to slave
0772 E17C         1718            AJMP    MXSTOP
0774              1719        MXNOAK:
0774 752202       1720            MOV     _TMPR3,#2           ;slave acknowledged the address but not the transmitted data byte
0777 E17C         1721            AJMP    MXSTOP
0779              1722        NOSLAVE:
0779 752203       1723            MOV     _TMPR3,#3           ;slave did not acknowledge the address
077C              1724        MXSTOP:
077C C2DE         1725            CLR     MASTRQ              ;clear master request
077E 759821       1726            MOV     I2CON,#_CDR+_XSTP   ;set to send stop
0781 309EFD       1727            JNB     I2CON._ATN,$        ;wait for attention
0784 759820       1728            MOV     I2CON,#_CDR         ;set to send stop
0787 309EFD       1729            JNB     I2CON._ATN,$        ;wait for attention
078A 309C28       1730            JNB     I2CON._ARL,MSGENDS  ;ARL, poss acc by start or stop
078D D2DE         1731            SETB    MASTRQ              ;set master request
078F E1AD         1732            AJMP    MSGEND
                  1733        ; Read Frame -Receive Byte from slave
0791              1734        MR:
0791 09           1735            INC     R1                  ;start loading buffer at _I2CBUF + 1, address 33H
0792 F1D1         1736            ACALL   I2RCV8              ;receive byte
0794 E198         1737            AJMP    MRCK                ;jump around message
                  1738        ; Receive message from slave
0796              1739        MRLP:
0796 F1C8         1740            ACALL   I2SAR8              ;send Ack 0 then Receive Byte
0798              1741        MRCK:
0798 309D12       1742            JNB     I2CON._DRDY,LME     ;can only be other's start or stop
079B F7           1743            MOV     @R1,A               ;store the byte
079C 09           1744            INC     R1                  ;advance the address
079D DAF7         1745            DJNZ    R2,MRLP             ;loop if more wanted
                  1746        ; Desired number Bytes Received -Send Nack
079F 759980       1747            MOV     I2DAT,#80H          ;send Nack=1
07A2 309EFD       1748            JNB     I2CON._ATN,$        ;wait for Attention
07A5 309D05       1749            JNB     I2CON._DRDY,LME     ;ARL, possible start or stop
07A8 752200       1750            MOV     _TMPR3,#0           ;number of bytes indicated in I2CCNT were received correctly from slave
07AB E17C         1751            AJMP    MXSTOP              ;go send a stop bit
07AD              1752        LME:
07AD              1753        MXALOS:
07AD              1754        MSGEND:
07AD 309905       1755            JNB     I2CON._MASTER,MSGENDS ;go unless it was a stop w/MRQ
07B0 309BFD       1756            JNB     I2CON._STR,$        ;wait for I2CON.STR in case we are to fast
07B3 E14D         1757            AJMP    I2C_START           ;repeat transfer, try again
07B5              1758        MSGENDS:
07B5 7598D4       1759            MOV     I2CON,#_CARL+_CSTP+_IDLE+_CXA
07B8 D0E0         1760            POP     ACC
07BA FA           1761            MOV     R2,A
07BB D0E0         1762            POP     ACC
07BD F9           1763            MOV     R1,A
07BE D0E0         1764            POP     ACC
07C0 F8           1765            MOV     R0,A
```

| | | | | |
|---|---|---|---|---|
| ACC. | D | ADDR | 00E0H | PREDEFINED |
| AD_ADAC. | | NUMB | 0090H | |
| AD_DTMF. | | NUMB | 0048H | |
| AD_LOOP. | C | ADDR | 060FH | |
| AD_RAM. | | NUMB | 00A0H | |
| AD_READ. | C | ADDR | 0603H | |
| AST_GE. | C | ADDR | 0462H | |
| AST_KEY. | | NUMB | 000AH | |
| AST_LT. | C | ADDR | 0464H | NOT USED |
| B. | D | ADDR | 00F0H | PREDEFINED |
| BATVLT. | C | ADDR | 0204H | |
| BAT_SEN. | | NUMB | 0002H | |
| BAT_STAT. | C | ADDR | 021BH | |
| BAT_TIME. | | NUMB | 00E3H | |
| BCD_BYTE. | C | ADDR | 0521H | |
| BCD_CY. | | NUMB | 004FH | |
| BCD_DIG. | C | ADDR | 0529H | |
| BCD_GT. | C | ADDR | 0527H | NOT USED |
| BCD_LE. | C | ADDR | 0525H | |
| BINARY_BCD. | C | ADDR | 050CH | |
| BLINK_DELAY. | C | ADDR | 055BH | |
| BLINK_LED. | C | ADDR | 054CH | |
| BLINK_RED_GRN. | C | ADDR | 0559H | |
| BLINK_RET. | C | ADDR | 057AH | NOT USED |
| BREAK_CKT. | C | ADDR | 03FEH | |
| CHECK_BCD_CY. | C | ADDR | 051AH | |
| CHG_EQ. | C | ADDR | 03BFH | NOT USED |
| CHG_GE. | C | ADDR | 03C4H | |
| CHG_GT. | C | ADDR | 03C8H | |
| CHG_NE. | C | ADDR | 03C6H | |
| CHRG_CNTRL. | | NUMB | 0094H | |
| CHRG_FLG. | | NUMB | 0071H | |
| CHRG_STAT. | C | ADDR | 03BCH | |
| CMOD_FLG. | | NUMB | 006DH | |
| CNVRT_KEY. | C | ADDR | 0724H | |
| CNVRT_VOLT. | C | ADDR | 04F0H | |
| COL0. | | NUMB | 00B1H | |
| COL1. | | NUMB | 00B2H | |
| COL2. | | NUMB | 00B3H | |
| COL3. | | NUMB | 00B0H | |
| COLUMN_1. | C | ADDR | 070BH | |
| COLUMN_2. | C | ADDR | 0711H | |
| COLUMN_3. | C | ADDR | 0717H | |
| CRYSTAL. | | NUMB | 0003H | |
| DA_WRITE. | C | ADDR | 061FH | |
| DEBOUNCE. | C | ADDR | 05F2H | |
| DEBOUNCE_KEY. | C | ADDR | 0115H | |
| DECODE_FNCTN. | C | ADDR | 0143H | |
| DECODE_KEYS. | C | ADDR | 0097H | |
| DECODE_BS. | C | ADDR | 030AH | |
| DIAL. | C | ADDR | 040AH | |
| DIAL_FLG. | | NUMB | 0069H | |
| DIAL_KEY. | C | ADDR | 00F4H | |
| DIAL_MUTE. | C | ADDR | 0415H | NOT USED |
| DIAL_PULSE. | C | ADDR | 0467H | |
| DIAL_RET. | C | ADDR | 0440H | |
| DIAL_TP. | C | ADDR | 00BCH | |
| DIGIT_TRAIN. | C | ADDR | 0428H | |
| DISPLAY. | C | ADDR | 02E0H | |
| DSPLY_RET. | C | ADDR | 02E7H | |
| DTMF_OFF. | | NUMB | 000CH | |
| EA. | B | ADDR | 00AFH | PREDEFINED |
| EMULATE. | | NUMB | 0000H | |
| END_PROG. | C | ADDR | 07F9H | NOT USED |
| EOF. | | NUMB | 00F0H | |
| EOF_CODE. | | NUMB | 00F0H | |
| EOF_GE. | C | ADDR | 028BH | |
| EOF_LT. | C | ADDR | 028DH | NOT USED |
| EOF_POS. | C | ADDR | 0296H | |
| EOP_GE. | C | ADDR | 02B8H | |

| | | | | |
|---|---|---|---|---|
| EOP_LT . . . . . . . . . . . . . . | C ADDR | 02BAH | NOT USED | |
| ET0. . . . . . . . . . . . . . . . | B ADDR | 00A9H | PREDEFINED | |
| EVEN . . . . . . . . . . . . . . . | NUMB | 0002H | | |
| EVEN_KEY . . . . . . . . . . . . . | C ADDR | 02ACH | | |
| EVEN_ODD . . . . . . . . . . . . . | C ADDR | 02C9H | | |
| FALSE. . . . . . . . . . . . . . . | NUMB | 0000H | | |
| FIRST_KEY. . . . . . . . . . . . . | C ADDR | 00DCH | | |
| FLASH. . . . . . . . . . . . . . . | C ADDR | 023AH | | |
| FLASH_RET. . . . . . . . . . . . . | C ADDR | 0253H | | |
| FLASH_TIME . . . . . . . . . . . . | NUMB | 00DCH | | |
| FNCTN. . . . . . . . . . . . . . . | C ADDR | 012BH | | |
| FNCTN_DECODE . . . . . . . . . . . | C ADDR | 0157H | | |
| FNCTN_KEY. . . . . . . . . . . . . | NUMB | 000FH | | |
| FNCTN_MOD. . . . . . . . . . . . . | C ADDR | 013EH | | |
| FNCTN_NUM. . . . . . . . . . . . . | C ADDR | 014CH | | |
| FULL_CHRG. . . . . . . . . . . . . | C ADDR | 022DH | | |
| GREEN. . . . . . . . . . . . . . . | NUMB | 0001H | | |
| GRNLED_CNTRL . . . . . . . . . . . | NUMB | 0092H | | |
| I2CBUF_END . . . . . . . . . . . . | NUMB | 0040H | | |
| I2CFG. . . . . . . . . . . . . . . | D ADDR | 00D8H | PREDEFINED | |
| I2CON. . . . . . . . . . . . . . . | D ADDR | 0098H | PREDEFINED | |
| I2C_MASTER . . . . . . . . . . . . | C ADDR | 073BH | | |
| I2C_RD . . . . . . . . . . . . . . | NUMB | 0001H | | |
| I2C_START. . . . . . . . . . . . . | C ADDR | 074DH | | |
| I2C_WR . . . . . . . . . . . . . . | NUMB | 0000H | | |
| I2DAT. . . . . . . . . . . . . . . | D ADDR | 0099H | PREDEFINED | |
| I2RCV8 . . . . . . . . . . . . . . | C ADDR | 07D1H | | |
| I2RCV8A. . . . . . . . . . . . . . | C ADDR | 07D3H | NOT USED | |
| I2RCVR . . . . . . . . . . . . . . | C ADDR | 07E2H | | |
| I2SAR8 . . . . . . . . . . . . . . | C ADDR | 07C8H | | |
| I2SAR82. . . . . . . . . . . . . . | C ADDR | 07CBH | NOT USED | |
| I2XMT8 . . . . . . . . . . . . . . | C ADDR | 07E5H | NOT USED | |
| I2XMTB . . . . . . . . . . . . . . | C ADDR | 07E3H | | |
| IDL. . . . . . . . . . . . . . . . | NUMB | 0001H | | |
| IDLE_MODE. . . . . . . . . . . . . | C ADDR | 008AH | | |
| IDLE_SPKR. . . . . . . . . . . . . | C ADDR | 0092H | | |
| ID_EQ. . . . . . . . . . . . . . . | C ADDR | 03E6H | | |
| ID_GE. . . . . . . . . . . . . . . | C ADDR | 03EBH | | |
| ID_GT. . . . . . . . . . . . . . . | C ADDR | 03DBH | | |
| ID_NE. . . . . . . . . . . . . . . | C ADDR | 03D9H | | |
| INC_PSE. . . . . . . . . . . . . . | C ADDR | 026FH | | |
| IND_FLG. . . . . . . . . . . . . . | NUMB | 0074H | | |
| INITIALIZE . . . . . . . . . . . . | C ADDR | 0064H | | |
| INTER_DIGIT. . . . . . . . . . . . | NUMB | 0002H | | |
| INVALID_FN . . . . . . . . . . . . | C ADDR | 014AH | | |
| INVALID_RS . . . . . . . . . . . . | C ADDR | 0316H | | |
| IPS_GE . . . . . . . . . . . . . . | C ADDR | 025EH | | |
| JMP_FNCTN. . . . . . . . . . . . . | C ADDR | 015CH | | |
| KEYS . . . . . . . . . . . . . . . | NUMB | 0010H | | |
| KEY_DEBOUNCE . . . . . . . . . . . | C ADDR | 05FDH | | |
| KEY_RET. . . . . . . . . . . . . . | C ADDR | 0602H | | |
| KEY_SCAN . . . . . . . . . . . . . | C ADDR | 06F7H | | |
| LED_CNTRL. . . . . . . . . . . . . | NUMB | 0096H | | |
| LEVEL. . . . . . . . . . . . . . . | C ADDR | 01A0H | | |
| LEVEL1 . . . . . . . . . . . . . . | C ADDR | 019FH | | |
| LEVEL2 . . . . . . . . . . . . . . | C ADDR | 019BH | | |
| LEVEL3 . . . . . . . . . . . . . . | C ADDR | 0197H | | |
| LEVEL_LOW_BAT. . . . . . . . . . . | C ADDR | 01CDH | | |
| LINAMP . . . . . . . . . . . . . . | C ADDR | 01D5H | | |
| LINE_CHK . . . . . . . . . . . . . | C ADDR | 03D2H | | |
| LINE_CHK1. . . . . . . . . . . . . | C ADDR | 03D0H | | |
| LINE_FLG . . . . . . . . . . . . . | NUMB | 006FH | | |
| LIN_SEN. . . . . . . . . . . . . . | NUMB | 0000H | | |
| LME. . . . . . . . . . . . . . . . | C ADDR | 07ADH | | |
| LN_EQ. . . . . . . . . . . . . . . | C ADDR | 03ADH | | |
| LN_LOAD. . . . . . . . . . . . . . | C ADDR | 005EH | | |
| LN_LT. . . . . . . . . . . . . . . | C ADDR | 03B4H | | |
| LN_NE. . . . . . . . . . . . . . . | C ADDR | 03A9H | | |
| LN_NGE . . . . . . . . . . . . . . | C ADDR | 03B2H | | |
| LN_REDIAL. . . . . . . . . . . . . | NUMB | 008EH | | |

| | | | |
|---|---|---|---|
| LOOK_UP_TABLE. . . . . . . . . . . | C ADDR | 072BH | |
| LOW_BAT_CHK. . . . . . . . . . . | C ADDR | 0372H | |
| LPI_ADJ. . . . . . . . . . . . . . | C ADDR | 039DH | |
| LPI_ON_HOOK. . . . . . . . . . . | C ADDR | 03E4H | |
| LPI_SEN. . . . . . . . . . . . . . | NUMB | 0003H | |
| LPI_STAT . . . . . . . . . . . . . | C ADDR | 0388H | |
| LPI_TIME . . . . . . . . . . . . . | NUMB | 0007H | |
| LP_TIMER . . . . . . . . . . . . . | C ADDR | 05A4H | |
| LSN_KEY. . . . . . . . . . . . . . | C ADDR | 029BH | |
| LVL_GT . . . . . . . . . . . . . . | C ADDR | 01B1H | NOT USED |
| LVL_LE . . . . . . . . . . . . . . | C ADDR | 01AFH | |
| MAKE_CKT . . . . . . . . . . . . . | C ADDR | 03F2H | |
| MASTEQ . . . . . . . . . . . . . . | B ADDR | 00DEH | PREDEFINED |
| MAX_BYTES. . . . . . . . . . . . . | NUMB | 000EH | |
| MAX_KEYS . . . . . . . . . . . . . | NUMB | 001BH | |
| MAX_PSE. . . . . . . . . . . . . . | NUMB | 00E0H | |
| MB_FLG . . . . . . . . . . . . . . | NUMB | 006AH | |
| MIN_LVL. . . . . . . . . . . . . . | NUMB | 0003H | |
| MNEND. . . . . . . . . . . . . . . | C ADDR | 076FH | NOT USED |
| MODE_CHANGE. . . . . . . . . . . . | C ADDR | 001CH | |
| MODE_FLG . . . . . . . . . . . . . | NUMB | 0068H | |
| MON_LINVLT . . . . . . . . . . . . | C ADDR | 01F4H | |
| MON_TIMEH. . . . . . . . . . . . . | NUMB | 0001H | |
| MON_TIMEL. . . . . . . . . . . . . | NUMB | 00C2H | |
| MORE_CHEG. . . . . . . . . . . . . | C ADDR | 022FH | |
| MPS_GE . . . . . . . . . . . . . . | C ADDR | 0272H | |
| MPS_LT . . . . . . . . . . . . . . | C ADDR | 0274H | NOT USED |
| MR . . . . . . . . . . . . . . . . | C ADDR | 0791H | |
| MRCK . . . . . . . . . . . . . . . | C ADDR | 0798H | |
| MRLP . . . . . . . . . . . . . . . | C ADDR | 0796H | |
| MSGEND . . . . . . . . . . . . . . | C ADDR | 07ADH | |
| MSGENDS. . . . . . . . . . . . . . | C ADDR | 07B5H | |
| MSN_FLG. . . . . . . . . . . . . . | NUMB | 0073H | |
| MSN_KEY. . . . . . . . . . . . . . | C ADDR | 029FH | |
| MSN_ODD. . . . . . . . . . . . . . | C ADDR | 0455H | |
| MUTE_CNTRL . . . . . . . . . . . . | NUMB | 0093H | |
| MUTE_FLG . . . . . . . . . . . . . | NUMB | 006EH | NOT USED |
| MUTE_OFF . . . . . . . . . . . . . | C ADDR | 04AAH | |
| MUTE_ON. . . . . . . . . . . . . . | C ADDR | 049DH | |
| MUTE_RET . . . . . . . . . . . . . | C ADDR | 04B5H | |
| MXALOS . . . . . . . . . . . . . . | C ADDR | 07ADH | |
| MXLP . . . . . . . . . . . . . . . | C ADDR | 0765H | |
| MXNOAK . . . . . . . . . . . . . . | C ADDR | 0774H | |
| MXSTOP . . . . . . . . . . . . . . | C ADDR | 077CH | |
| NEXT_BCD_BYTE. . . . . . . . . . . | C ADDR | 0520H | |
| NEXT_DEBOUNCE. . . . . . . . . . . | C ADDR | 05F4H | |
| NEXT_LED . . . . . . . . . . . . . | C ADDR | 0573H | |
| NEXT_NIBBLE. . . . . . . . . . . . | C ADDR | 0689H | |
| NEXT_QTR . . . . . . . . . . . . . | C ADDR | 0583H | |
| NEXT_ROW . . . . . . . . . . . . . | C ADDR | 071DH | |
| NEXT_SHIFT . . . . . . . . . . . . | C ADDR | 0537H | |
| NORM_DECODE. . . . . . . . . . . . | C ADDR | 00A1H | |
| NOSLAVE. . . . . . . . . . . . . . | C ADDR | 0779H | |
| NOT_FIRST_KEY. . . . . . . . . . . | C ADDR | 00DAH | |
| NO_KEY . . . . . . . . . . . . . . | NUMB | 00FFH | |
| NO_PULSE . . . . . . . . . . . . . | C ADDR | 047FH | |
| NO_PULSE_DIAL. . . . . . . . . . . | C ADDR | 0021H | |
| NO_SPKR. . . . . . . . . . . . . . | C ADDR | 0037H | |
| NO_STORE . . . . . . . . . . . . . | C ADDR | 00E4H | |
| ODD_KEY. . . . . . . . . . . . . . | C ADDR | 02AFH | |
| ON_HOOK. . . . . . . . . . . . . . | C ADDR | 04D6H | |
| OUT_GT . . . . . . . . . . . . . . | C ADDR | 002DH | NOT USED |
| OUT_LE . . . . . . . . . . . . . . | C ADDR | 002BH | |
| OUT_PULSE. . . . . . . . . . . . . | C ADDR | 05E0H | |
| OUT_SEN. . . . . . . . . . . . . . | NUMB | 0001H | |
| P0 . . . . . . . . . . . . . . . . | D ADDR | 0080H | PREDEFINED |
| P1 . . . . . . . . . . . . . . . . | D ADDR | 0090H | PREDEFINED |
| P3 . . . . . . . . . . . . . . . . | D ADDR | 00B0H | PREDEFINED |
| PAUSE. . . . . . . . . . . . . . . | C ADDR | 0255H | |
| PAUSE_KEY. . . . . . . . . . . . . | C ADDR | 02B5H | |

| | | | |
|---|---|---|---|
| PAUSE_RET. | C ADDR | 026DH | |
| PCON | D ADDR | 0087H | PREDEFINED |
| PD | NUMB | 0002H | |
| PND_GE | C ADDR | 009DH | |
| PND_KEY. | NUMB | 000BH | |
| PND_LT. | C ADDR | 009FH | NOT USED |
| POLRTY | C ADDR | 0180H | |
| POL_GE | C ADDR | 018DH | |
| POL_LT. | C ADDR | 018FH | NOT USED |
| POL_NORM. | C ADDR | 0193H | |
| POL_REV. | C ADDR | 0195H | |
| PSE. | NUMB | 000BH | |
| PSE_GE | C ADDR | 02A2H | |
| PSE_KEY. | NUMB | 00B0H | |
| PSE_LT | C ADDR | 02A4H | NOT USED |
| PSI_LT | C ADDR | 0260H | NOT USED |
| PSW. | D ADDR | 00D0H | PREDEFINED |
| PULSE_BK_TIME. | NUMB | 003CH | |
| PULSE_BREAK. | C ADDR | 048AH | |
| PULSE_DIAL | C ADDR | 0443H | |
| PULSE_LSN. | C ADDR | 045DH | |
| PULSE_MAKE | C ADDR | 0482H | |
| PULSE_MK_TIME. | NUMB | 0028H | |
| PULSE_MODE | C ADDR | 0421H | |
| PULSE_RET. | C ADDR | 0491H | |
| PULSE_SEL. | C ADDR | 0129H | |
| PULSE_SELECT | C ADDR | 05BEH | NOT USED |
| PULSE_TABLE. | C ADDR | 0492H | |
| PULS_DEBOUNCE. | C ADDR | 0118H | NOT USED |
| PULS_FLG | NUMB | 0072H | |
| PWR_CNTRL. | NUMB | 0095H | |
| R22. | NUMB | 0230H | |
| RBITLP | C ADDR | 07D4H | |
| RBITRL | C ADDR | 07D6H | NOT USED |
| RB_GE. | C ADDR | 0227H | |
| RB_LT. | C ADDR | 0229H | NOT USED |
| READ_RET | C ADDR | 06F2H | |
| READ_SWITCH. | C ADDR | 069FH | |
| READ_TIME. | NUMB | 0005H | NOT USED |
| READ_VOLTAGE | C ADDR | 04DFH | |
| RECALL_KEY | NUMB | 000DH | |
| RECALL_LOC | C ADDR | 04C3H | |
| RECALL_NUMBER. | C ADDR | 0329H | |
| RECALL_STORE | C ADDR | 02E9H | |
| RECALL_TLK | C ADDR | 0332H | |
| RECHRGBAT. | C ADDR | 0214H | |
| RECHRG_RET | C ADDR | 0238H | NOT USED |
| RED. | NUMB | 0010H | |
| REDIAL | C ADDR | 027EH | |
| REDIAL_PULSE | C ADDR | 0424H | |
| REDIAL_RET | C ADDR | 02CEH | |
| REDLED_CNTRL | NUMB | 0097H | |
| REDL_RET. | C ADDR | 02D5H | |
| RESTORE_REG. | C ADDR | 0728H | |
| ROWS. | NUMB | 0004H | |
| ROW_1. | NUMB | 007FH | |
| RS_FLG | NUMB | 006CH | |
| RS_MOD | C ADDR | 0305H | |
| RS_OFSET | C ADDR | 031CH | NOT USED |
| RTH. | D ADDR | 008DH | PREDEFINED |
| RTL. | D ADDR | 008BH | PREDEFINED |
| SAVE_KEY | C ADDR | 00C6H | |
| SAVE_PSE | C ADDR | 0260H | NOT USED |
| SCAN_AGAIN | C ADDR | 0071H | |
| SCAN_COLUMN. | C ADDR | 06FFH | |
| SCAN_FNCTN | C ADDR | 0130H | |
| SCAN_RS. | C ADDR | 02F7H | |
| SCL. | B ADDR | 0080H | PREDEFINED |
| SDA. | B ADDR | 0081H | PREDEFINED |
| SEND_TONE. | C ADDR | 063AH | NOT USED |

| | | | |
|---|---|---|---|
| SHIFT_BUF. . . . . . . . . . . . . . | C ADDR | 067CH | |
| SOFT_VER . . . . . . . . . . . . . | NUMB | 0018H | |
| SPKROFF. . . . . . . . . . . . . . | C ADDR | 0278H | |
| SPKR_CNTRL . . . . . . . . . . . | NUMB | 0082H | |
| SPKR_DELAY . . . . . . . . . . . | NUMB | 0064H | |
| SPKR_FLG . . . . . . . . . . . . . | NUMB | 006BH | |
| SPKR_FNCTN . . . . . . . . . . . | C ADDR | 034DH | |
| SPKR_OFP . . . . . . . . . . . . . | C ADDR | 067BH | |
| SPKR_REDL. . . . . . . . . . . . | C ADDR | 02DEH | |
| SPKR_STAT. . . . . . . . . . . . | C ADDR | 0398H | |
| SPK_GT . . . . . . . . . . . . . . . | C ADDR | 01CBH | NOT USED |
| SPK_LE . . . . . . . . . . . . . . . | C ADDR | 01C9H | |
| SPK_TIME . . . . . . . . . . . . . | NUMB | 000EH | |
| SR_GT. . . . . . . . . . . . . . . . | C ADDR | 0316H | NOT USED |
| SR_LE. . . . . . . . . . . . . . . . | C ADDR | 0314H | |
| START. . . . . . . . . . . . . . . . | C ADDR | 000EH | |
| STAT_CHK . . . . . . . . . . . . | C ADDR | 03EFH | |
| STAT_LINE. . . . . . . . . . . . | C ADDR | 03EDH | |
| STAT_RET . . . . . . . . . . . . | C ADDR | 03F1H | |
| STORE_DIAL . . . . . . . . . . . | C ADDR | 0111H | NOT USED |
| STORE_KEY. . . . . . . . . . . . | NUMB | 000EH | |
| STORE_LOC. . . . . . . . . . . . | C ADDR | 04B8H | |
| STORE_NUMBER . . . . . . . . . | C ADDR | 031FH | NOT USED |
| STORE_ON . . . . . . . . . . . . | C ADDR | 032CH | |
| STORE_PSE. . . . . . . . . . . . | C ADDR | 0268H | |
| STRT_PROG. . . . . . . . . . . . | C ADDR | 0000H | NOT USED |
| ST_GE. . . . . . . . . . . . . . . . | C ADDR | 0379H | |
| ST_LT. . . . . . . . . . . . . . . . | C ADDR | 037BH | NOT USED |
| SYS_STAT . . . . . . . . . . . . | C ADDR | 0363H | |
| T100MS_HGH . . . . . . . . . . . | NUMB | 008BH | |
| T100MS_LOW . . . . . . . . . . . | NUMB | 007AH | |
| T10MS_HGH. . . . . . . . . . . . | NUMB | 00F4H | NOT USED |
| T10MS_LOW. . . . . . . . . . . . | NUMB | 005AH | NOT USED |
| T1MS_HGH . . . . . . . . . . . . | NUMB | 00FEH | |
| T1MS_LOW . . . . . . . . . . . . | NUMB | 00D6H | |
| TALK_LEVEL . . . . . . . . . . . | C ADDR | 01B7H | |
| TALK_MODE. . . . . . . . . . . . | C ADDR | 0086H | |
| TERM_PULSE . . . . . . . . . . . | C ADDR | 0659H | |
| TEST_GRN . . . . . . . . . . . . | C ADDR | 0F04H | |
| TEST_NB. . . . . . . . . . . . . . | C ADDR | 046BH | |
| TF . . . . . . . . . . . . . . . . . . | B ADDR | 008DH | PREDEFINED |
| TH . . . . . . . . . . . . . . . . . . | D ADDR | 008CH | PREDEFINED |
| THESH_BAT. . . . . . . . . . . . | NUMB | 00C8H | |
| THESH_CHRG . . . . . . . . . . . | NUMB | 005CH | |
| THESH_LPI . . . . . . . . . . . . | NUMB | 0095H | |
| THESH_POL. . . . . . . . . . . . | NUMB | 0005H | |
| TIMER_MSEC . . . . . . . . . . . | C ADDR | 058FH | |
| TIMER_RET. . . . . . . . . . . . | C ADDR | 05EDH | |
| TIMER_SEC. . . . . . . . . . . . | C ADDR | 0581H | |
| TIMER_UPDATE . . . . . . . . . | C ADDR | 05B7H | |
| TIME_FLG . . . . . . . . . . . . . | NUMB | 0076H | |
| TIME_OUT . . . . . . . . . . . . | C ADDR | 0336H | |
| TIME_OUT_RET . . . . . . . . . | C ADDR | 0362H | |
| TL . . . . . . . . . . . . . . . . . . | D ADDR | 008AH | PREDEFINED |
| TLKMON_CNTRL . . . . . . . . . | NUMB | 0097H | |
| TLKMON_SW. . . . . . . . . . . . | C ADDR | 06C3H | |
| TLKMON_TPO . . . . . . . . . . . | NUMB | 0084H | |
| TLK_ADJ. . . . . . . . . . . . . . | C ADDR | 0048H | |
| TLK_FLG. . . . . . . . . . . . . . | NUMB | 0071H | |
| TLK_MODE . . . . . . . . . . . . | C ADDR | 06B1H | |
| TLK_TIMEH. . . . . . . . . . . . | NUMB | 000FH | |
| TLK_TIMEL. . . . . . . . . . . . | NUMB | 00E2H | |
| TMRSEC_RET . . . . . . . . . . . | C ADDR | 0581H | |
| TONE_DIAL. . . . . . . . . . . . | C ADDR | 0101H | |
| TONE_DN. . . . . . . . . . . . . | C ADDR | 040FH | NOT USED |
| TONE_MODE. . . . . . . . . . . . | C ADDR | 06B8H | |
| TONE_OFF . . . . . . . . . . . . | NUMB | 000DH | |
| TONE_OFF_TIME. . . . . . . . . | NUMB | 004AH | |

| | | | |
|---|---|---|---|
| TONE_OFSET | C ADDR | 0643H | |
| TONE_ON_TIME | NUMB | 006DH | |
| TONE_SELECT | C ADDR | 05E2H | |
| TONE_TABLE | C ADDR | 064AH | |
| TONE_WRITE | C ADDR | 0638H | |
| TPO_CNTRL | NUMB | 0092H | |
| TR | B ADDR | 008CH | PREDEFINED |
| TRUE | NUMB | 0001H | NOT USED |
| TST_EOF | C ADDR | 0285H | |
| TST_FNCTN | C ADDR | 0CB0H | |
| TST_KEY | C ADDR | 0288H | |
| TST_STORE | C ADDR | 00B5H | |
| TURN_OFF | C ADDR | 005CH | |
| UPD_GT | C ADDR | 05DCH | NOT USED |
| UPD_LE | C ADDR | 05DAH | |
| VALID_ES | C ADDR | 0318H | |
| VERSION | C ADDR | 017CH | |
| VLT_GE | C ADDR | 04F6H | |
| VLT_LT | C ADDR | 04F8H | NOT USED |
| VOLT_RET | C ADDR | 0507H | |
| VOLT_SCALER | C ADDR | 0508H | |
| XBITLP | C ADDR | 07E7H | |
| XBITRL | C ADDR | 07E9H | |
| XMT8R | C ADDR | 07F8H | |
| _ARL | NUMB | 0004H | |
| _ATN | NUMB | 0006H | |
| _CARL | NUMB | 0010H | |
| _CDR | NUMB | 0020H | |
| _CSTP | NUMB | 0004H | |
| _CSTR | NUMB | 0008H | |
| _CT0 | NUMB | 0001H | |
| _CT1 | NUMB | 0002H | |
| _CXA | NUMB | 0080H | |
| _DAVALUE | NUMB | 0025H | |
| _DESTRW | NUMB | 002FH | |
| _DIGCNT | NUMB | 002BH | |
| _DRDY | NUMB | 0005H | |
| _FLAGS0 | NUMB | 002DH | |
| _FLAGS1 | NUMB | 002EH | |
| _I2CBUF | NUMB | 0031H | |
| _I2CCNT | NUMB | 0030H | |
| _IDLE | NUMB | 0040H | |
| _KEYCNT | NUMB | 0029H | |
| _KEYPTR | NUMB | 0028H | |
| _MASTER | NUMB | 0001H | |
| _MASTRQ | NUMB | 0040H | |
| _PULCNT | NUMB | 002AH | |
| _RDAT | NUMB | 0007H | |
| _SPKRLVL | NUMB | 002CH | |
| _STP | NUMB | 0002H | NOT USED |
| _STR | NUMB | 0003H | |
| _T1RUN | NUMB | 0010H | NOT USED |
| _TIMERH | NUMB | 0024H | |
| _TIMERL | NUMB | 0023H | |
| _TMPR0 | NUMB | 001FH | |
| _TMPR1 | NUMB | 0020H | |
| _TMPR2 | NUMB | 0021H | |
| _TMPR3 | NUMB | 0022H | |
| _TMPTR0 | NUMB | 0026H | |
| _TMPTR1 | NUMB | 0027H | |
| _XSTP | NUMB | 0001H | |
| _XSTR | NUMB | 0002H | NOT USED |

What is claimed is:

1. A telephone test instrument, comprising:
a housing adapted to be hand-held by a telephone technician;
a receiver disposed in said housing;
a transmitter disposed in said housing;
circuit means, disposed in said housing and within which said receiver and transmitter are connected, for establishing communication with a telephone circuit, said circuit means including a microprocessor; and
data entry means for entering data to said microprocessor, said data entry means including a plurality of dual-function keys mounted on said housing and connected so that actuation of said keys is detected by said microprocessor, and said data entry means also including indicia means integrated with said keys and said housing for labeling said keys with the dual functions each of said keys is adapted for selecting.

2. An instrument as defined in claim 1, further comprising data output means, mounted on said housing, for visually outputting data from said microprocessor to the telephone technician without an alphabetical or numerical display.

3. An instrument as defined in claim 1, wherein:
said circuit means further includes: a dial pulse signaling circuit; and a tone signaling circuit; and
said microprocessor is connected to said dial pulse signaling circuit and said tone signaling circuit for alternatively controlling the operation thereof so that, for said dial pulse signaling circuit, the speed of transmitting pulses through said dial pulse signaling circuit and the break between said pulses are variable and further so that, for said tone signaling circuit, the generation of one or two tones and the frequency thereof are variable.

4. An instrument as defined in claim 1, further comprising means for connecting said circuit means to receive energization from the telephone circuit.

5. An instrument as defined in claim 1, wherein:
said instrument further comprises an energy supply; and
said circuit means further includes means, responsive to said microprocessor, for connecting said circuit means to receive energization from said energy supply.

6. An instrument as defined in claim 5, further comprising means for connecting said circuit means to receive energization from the telephone circuit.

7. An instrument as defined in claim 6, wherein said means for connecting said circuit means to receive energization from the telephone circuit and said means for connecting said circuit means to receive energization from said energy supply cooperatively operate to energize said circuit means first from the telephone circuit up to a predetermined maximum current and thereafter from said energy supply.

8. An instrument as defined in claim 5, wherein:
said energy supply is rechargeable; and
said circuit means further includes means, responsive to said microprocessor, for providing a recharging current to said rechargeable energy supply from the telephone circuit.

9. An instrument as defined in claim 1, wherein said circuit means further includes means for communicating a signal representative of loop current to said microprocessor for measurement thereby while said circuit means and said receiver and transmitter are connected to the telephone circuit.

10. An instrument as defined in claim 9, wherein said circuit means further includes means, responsive to said microprocessor, for signaling the loop current measurement to the telephone technician without an alphabetical or numerical display.

11. An instrument as defined in claim 1, wherein:
said instrument further comprises a loudspeaker disposed in said housing; and
said circuit means further includes:
means, connected to said loudspeaker and responsive to said microprocessor, for actuating said loudspeaker at a selected volume level; and
means, responsive to said microprocessor, for connecting said receiver to said means for actuating said loudspeaker at a selected volume level.

12. An instrument as defined in claim 1, wherein said circuit means further includes memory means, connected to said microprocessor, for storing a plurality of 27-digit numbers entered into said microprocessor.

13. An instrument as defined in claim 1, wherein said circuit means further includes:
first hold current circuit means, responsive to said microprocessor, for selectably passing a current to hold the telephone circuit; and
second hold current circuit means, responsive to said microprocessor, for selectably passing, mutually exclusively of said first hold current circuit, a current to hold the telephone circuit.

14. A telephone test instrument, comprising:
a portable housing;
a receiver disposed in said housing;
a transmitter disposed in said housing;
a loudspeaker disposed in said housing; means for connecting said instrument to a telephone circuit;
a hold circuit disposed in said housing and connected to said means for connecting;
a hybrid circuit disposed in said housing and connected to said transmitter;
first switch means, disposed on said housing, for selectably connecting said hybrid circuit to either said hold circuit or said means for connecting;
a monitor circuit disposed in said housing and connected to said means for connecting;
a selectably energizable amplifier disposed in said housing and connected to said loudspeaker;
second switch means, disposed on said housing, for selectably connecting said amplifier to either said hybrid circuit or said monitor circuit;
third switch means, disposed in said housing, for selectably connecting said receiver to either said second switch means or said amplifier;
fourth switch means, disposed in said housing, for energizing said amplifier and operating said third switch means;
a programmed data processor disposed in said housing, said processor including means for operating said fourth switch means;
an energy supply disposed in said housing;
a recharging circuit disposed in said housing and connected to said means for connecting, said hold circuit, said energy supply and said processor;
means, disposed in said housing and connected to said hold circuit, for selectably communicating a telephone number by pulse or by tone in response to said processor;
a loop current detection circuit disposed in said housing and connected to said means for connecting and said processor; and
data entry means, disposed on said housing and connected to said processor, for entering data, including commands, into said processor.

15. A telephone test instrument, comprising:
a portable housing adapted to be hand-held by a telephone technician;
means, disposed in said housing, for making voice frequency transmissions and operational tests of trunk circuits and subscriber lines in a telephone network, work, said means including:

means for connecting said test instrument to a telephone circuit;

a rechargeable battery; and means, connected to said means for connecting and to said rechargeable battery, for recharging said battery from the telephone circuit.

16. A telephone test instrument, comprising:

means for connecting said test instrument to a telephone circuit;

a rechargeable energy supply;

means, connected to said means for connecting and to said rechargeable energy supply, for recharging said energy supply from the telephone circuit;

means, connected to said means for connecting, for energizing said instrument from the telephone circuit with a current up to a predetermined current load; and means, connected to said energy supply, for connecting said energy supply to energize said instrument with additional current in response to said instrument requiring current above the predetermined current 17. A telephone test instrument, comprising:

means for connecting said test instrument to a telephone circuit;

a rechargeable energy supply; and means, connected to said means for connecting and to said rechargeable energy supply, for recharging said energy supply from the telephone circuit, wherein said means for recharging includes:

means for determining loop current drawn through said instrument;

means for selectably conducting a recharging current to said energy supply from the telephone circuit; and means for operating said means for selectably conducting in response to said means for determining loop current.

18. An instrument as defined in claim 17, wherein said means for operating includes:

means for preventing said means for selectably conducting from conducting a recharging current in response to said means for determining determining the loop current has fallen below a first predetermined magnitude; and means for enabling said means for selectably conducting to conduct a recharging current in response to said means for determining determining the loop current has risen above a second predetermined magnitude.

19. A telephone test instrument, comprising:

means for connecting said test instrument to a telephone circuit;

a rechargeable battery;

means, connected to said means for connecting and to said rechargeable battery, for recharging said battery from the telephone circuit;

means for measuring a voltage produced by said battery; and means, responsive to said means for measuring, for signaling the magnitude of the voltage measurement without an alphabetical or numerical display.

20. A telephone test instrument, comprising:

means for connecting said test instrument to a telephone circuit;

a rechargeable energy supply;

means, connected to said means for connecting and to said rechargeable energy supply, for recharging said energy supply from the telephone circuit;

a voice communication circuit operable in either a monitor mode or a talk mode;

voice communication circuit switch means for selectably connecting said voice communication circuit to said means for connecting in either the monitor mode or the talk mode;

energy supply switch means for selectably connecting said energy supply to provide energy to said instrument; and a data processor connected to said voice communication circuit switch means and said energy supply switch means and programmed for operating said energy supply switch means to connect said energy supply to provide energy to said instrument in response to said voice communication circuit switch means connecting said voice communication circuit to said means for connecting in the talk mode.

21. An instrument as defined in claim 20, further comprising means for actuating said data processor to operate said energy supply switch means to connect said energy supply to provide energy to said instrument when said voice communication circuit switch means connects said voice communication circuit to said means for connecting in the monitor mode.

22. A telephone test instrument, comprising:

means for connecting said test instrument to a telephone circuit;

a rechargeable energy supply;

means, connected to said means for connecting and to said rechargeable energy supply, for recharging said energy supply from the telephone circuit;

a primary hold circuit connected to said means for connecting; and wherein said means for recharging includes:

a secondary hold circuit connected to said means for connecting;

a recharging circuit connected to said secondary hold circuit and said energy supply; and a data processor programmed for activating said secondary hold circuit and said recharging circuit and for concurrently deactivating said primary hold circuit when said energy supply is to receive a recharging current.

23. A telephone test instrument, comprising: means for connecting said test instrument to a telephone circuit;

an internal energy supply;

means, connected to said means for connecting, for energizing said instrument from the telephone circuit with a current up to a predetermined current load; and means, connected to said energy supply, for connecting said energy supply to energize said instrument with additional current in response to said instrument requiring current above the predetermined current load.

24. A telephone test instrument, comprising:

a portable housing adapted to be hand-held by a telephone technician:

means, disposed in said housing, for making voice frequency transmissions and operational tests of trunk circuits and subscriber lines in a telephone network, said means including:

means for connecting said test instrument to a telephone circuit;
an internal battery;
means for measuring a voltage produced by said battery; and
light-emitting means, responsive to said means for measuring, for signaling the voltage measurement without an alphabetical or numerical display.

25. A telephone test instrument, comprising:
means for connecting said test instrument to a telephone circuit;
an internal energy supply;
a voice communication circuit operable in either a monitor mode or a talk mode;
voice communication circuit switch means for selectably connecting said voice communication circuit to said means for connecting in either the monitor mode or the talk mode;
energy supply switch means for selectably connecting said energy supply to provide energy to said instrument; and
a data processor connected to said voice communication circuit switch means and said energy supply switch means and programmed for operating said energy supply switch means to connect said energy supply to provide energy to said instrument in response to said voice communication circuit switch means connecting said voice communication circuit to said means for connecting in the talk mode.

26. An instrument as defined in claim 25, further comprising means for activating said data processor to operate said energy supply switch means to connect said energy supply to provide energy to said instrument when said voice communication circuit switch means connects said voice communication circuit to said means for connecting in the monitor mode.

27. A method of testing a telephone circuit, comprising:
connecting a telephone test instrument to a telephone circuit, which test instrument includes a voice communication circuit and a test circuit;
energizing at least the test circuit with energy from the telephone circuit; and
testing the telephone circuit with the test circuit energized from the telephone circuit.

28. A method as defined in claim 27, further comprising:
additionally energizing at least the test circuit with energy from a rechargeable energy supply within the test instrument; and
selectively recharging the energy supply with a recharging current from the telephone circuit.

29. A method as defined in claim 28, further comprising:
measuring a voltage produced from the energy supply; and
serially flashing a light to correspond to the numerical value of the measured voltage.

30. A method as defined in claim 28, wherein said step of selectively recharging the energy supply includes:
preventing flow of a recharging current from the telephone circuit in response to a loop current flowing through the telephone circuit and test instrument decreasing below a first predetermined magnitude; and
enabling flow of a recharging current from the telephone circuit in response to the loop current increasing above a second predetermined magnitude.

31. A method as defined in claim 28, wherein said step of selectively recharging the energy supply includes periodically determining with a programmed data processor within the test instrument whether to recharge the energy supply.

32. A telephone test instrument, comprising:
a receiver;
a transmitter;
means for connecting said receiver and said transmitter to a telephone circuit; and
means for measuring loop current through said test instrument, said means for measuring connected to said means for connecting so that loop current is measured while said receiver and transmitter are connected to the telephone circuit.

33. An instrument as defined in claim 32, further comprising means, responsive to said means for measuring loop current, for signaling a loop current measurement without an alphabetical or numerical display.

34. An instrument as defined in claim 32, wherein said means for measuring loop current includes:
a resistor connected to said means for connecting so that loop current flows through said resistor;
means, connected to said resistor, for providing a sensing voltage in response to the magnitude of loop current flowing through said resistor; and
means for computing the magnitude of the loop current in response to the sensing voltage.

35. An instrument as defined in claim 34, wherein said means for computing includes:
an analog-to-digital converter connected to said means for providing a sensing voltage; and
a programmed data processor connected to said analog-to-digital converter.

36. An instrument as defined in claim 35, further comprising two light emitting diodes operated by said programmed data processor to signal the magnitude of a loop current measurement.

37. An instrument as defined in claim 35, wherein said means for providing a sensing voltage includes a Zener diode having an anode connected to said resistor and having a cathode connected to said analog-to-digital converter.

38. A telephone test instrument, comprising:
a housing;
an electrically conductive hook connected to said housing;
means, retained by said housing, for connecting said instrument to a telephone circuit; and
a switch mounted on said housing, said switch including two terminals, one of said terminals connected to said hook and the other of said terminals connected to said means for connecting so that the telephone circuit is electrically grounded in response to touching said hook to an electrical ground and closing said switch.

39. A telephone test instrument operable in either a loudspeaker-on mode or a loudspeaker-off mode, comprising:
a housing;
a receiver disposed in said housing;
a loudspeaker disposed in said housing;
means for operating said receiver at a base level in response to a signal received by said test instrument over a telephone circuit during the
means for operating said loudspeaker in response to a signal received by said test instrument over the telephone circuit during the loudspeaker-on mode; and means for operating said receiver at a level not less than the base level during the loudspeaker-on mode.

40. An instrument as defined in claim 39, wherein:

said means for operating said loudspeaker includes amplifier means, connected to said loudspeaker, for providing an output signal to which said loudspeaker is responsive; and said means for operating said receiver at a level not less than the base level includes means for connecting said receiver to said amplifier means so that said receiver is responsive to said output signal of said amplifier means during the loudspeaker-on mode.

41. A telephone test instrument, comprising:

means for connecting said test instrument to a telephone circuit;

a voice communication circuit connected to said means for connecting, said voice communication circuit including a receiver and a transmitter;

a loudspeaker;

amplifier means, connected to said voice communication circuit and said loudspeaker, for driving said loudspeaker;

first switch means for selectably connecting said receiver so that said receiver is driven either directly by said voice communication circuit or by said amplifier means; and second switch means for selectably energizing said amplifier means and operating said first switch means so that said receiver is driven by said amplifier means when said amplifier means is energized.

42. An instrument as defined in claim 41, further comprising third switch means, responsive to said second switch means, for connecting a resistor across said transmitter when said amplifier means is energized.

43. A telephone test instrument, comprising:

a receiver;

a transmitter;

circuit means for connecting said receiver and transmitter to tip and ring lines of a telephone circuit so that loop current of the telephone circuit flows through said instrument, said circuit means including:

a positive temperature coefficient resettable fuse;

a triac connected to said fuse so that said fuse and said triac are connected in series across the tip and ring lines of the telephone circuit in response to connection of said instrument to the tip and ring lines; and means, connected to said triac, for activating said triac to be conductive in response to a predetermined magnitude of loop current flowing through said instrument so that the loop current flows through said series connected fuse and triac.

44. An instrument as defined in claim 43, wherein:

said circuit means further includes an instrument operating circuit connected in parallel to said triac, said operating circuit including a resistor through which the loop current flows during selected operation of said operating circuit; and said means for activating said triac includes an opto-coupled triac connected to said resistor and to said triac connected in series with said fuse.

* * * * *

UNITED STATES PATENT AND TRADEMARK OFFICE
CERTIFICATE OF CORRECTION

PATENT NO. : 5,025,466

DATED : June 18, 1991

INVENTOR(S) : William R. Hilligoss et al

Page 1 of 2

It is certified that error appears in the above-identified patent and that said Letters Patent is hereby corrected as shown below:

Column 93, line 23, after "current", insert --load.--.
Column 96, line 66, after "the", insert --loudspeaker-off mode;--.
Between columns 78 and 79, insert the following text as shown on the attached page.

Signed and Sealed this

Twenty-second Day of December, 1992

Attest:

DOUGLAS B. COMER

Attesting Officer

Acting Commissioner of Patents and Trademarks

```
07C1 D0E0        1766            POP     ACC
07C3 D0D0        1767            POP     PSW
07C5 D2AF        1768            SETB    EA                      ;enable interrupts
07C7 22          1769            RET
                 1770    ;*****************************
                 1771    ; I2C Bus subroutines        *
                 1772    ;*****************************
                 1773    ; Send Ack bit 0 then Receive 8 bits
07C8             1774    I2SAR8:
07C8 759900      1775            MOV     I2DAT,#0                ;send Ack
07CB             1776    I2SAR82:
07CB 309EFD      1777            JNB     I2CON._ATN,$            ;loop until ATN
07CE 309D11      1778            JNB     I2CON._DRDY,I2RCVR      ;go if fault
                 1779    ; Receive 8 bits
07D1             1780    I2RCV8:
07D1 7808        1781            MOV     R0,#8                   ;set bit count for address
07D3             1782    I2RCV8A:
07D3 E4          1783            CLR     A                       ;clear byte accumulator
07D4             1784    RBITLP:
07D4 4599        1785            ORL     A,I2DAT                 ;include the bit, clear ATTN
07D6             1786    RBITRL:
07D6 23          1787            RL      A                       ;data enters by way of msb
07D7 309EFD      1788            JNB     I2CON._ATN,$            ;wait for ATTN flag
07DA 309D05      1789            JNB     I2CON._DRDY,I2RCVR      ;go if fault
07DD D8F5        1790            DJNZ    R0,RBITLP               ;loop if not 7 yet
07DF A29F        1791            MOV     C,I2CON._RDAT           ;get 8th bit, do not clear ATTN
07E1 33          1792            RLC     A                       ;include the 8th bit
07E2             1793    I2RCVR:
07E2 22          1794            RET
                 1795    ; Get Byte from Buffer and Send it
07E3             1796    I2XMTB:
07E3 E7          1797            MOV     A,@R1                   ;load byte to send
07E4 09          1798            INC     R1                      ;inc. address
                 1799    ; Send 8 bits and wait for Ack
07E5             1800    I2XMT8:
07E5 7808        1801            MOV     R0,#8                   ;start bit count
07E7             1802    XBITLP:
07E7 F599        1803            MOV     I2DAT,A                 ;set xmit mode and send bit
07E9             1804    XBITRL:
07E9 23          1805            RL      A                       ;rotate left one bit
07EA 309EFD      1806            JNB     I2CON._ATN,$            ;wait for attention
07ED 309D08      1807            JNB     I2CON._DRDY,XMT8R       ;go if fault
07F0 D8F5        1808            DJNZ    R0,XBITLP               ;loop if not all out
                 1809    ; Switch to Receive Mode for Ack bit
07F2 7598A0      1810            MOV     I2CON,#_CDR+_CXA
                 1811    ; Wait for Ack
07F5 309EFD      1812            JNB     I2CON._ATN,$
07F8             1813    XMT8R:
07F8 22          1814            RET
                 1815    ;
07F9             1816    END_PROG:
0800             1817            ORG     800H
0800 FFFFFFFF    1818            DB      0FFH,0FFH,0FFH,0FFH,0FFH,0FFH,0FFH,0FFH
0804 FFFFFFFF
0808 FFFFFFFF    1819            DB      0FFH,0FFH,0FFH,0FFH,0FFH,0FFH,0FFH,0FFH
080C FFFFFFFF
                 1820            END

ASSEMBLY COMPLETE, 0 ERRORS FOUND
```